(12) United States Patent
Kaku

(10) Patent No.: US 7,835,571 B2
(45) Date of Patent: Nov. 16, 2010

(54) BACKGROUND REPLACING APPARATUS, BACKGROUND REPLACING PROGRAM, AND BACKGROUND REPLACING METHOD

(75) Inventor: Toshihiko Kaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1129 days.

(21) Appl. No.: 10/589,251

(22) PCT Filed: Mar. 10, 2006

(86) PCT No.: PCT/JP2006/304764

§ 371 (c)(1),
(2), (4) Date: Aug. 14, 2006

(87) PCT Pub. No.: WO2006/095860

PCT Pub. Date: Sep. 14, 2006

(65) Prior Publication Data

US 2008/0226273 A1  Sep. 18, 2008

(30) Foreign Application Priority Data

| Mar. 10, 2005 | (JP) | ............................. 2005-067933 |
| Mar. 11, 2005 | (JP) | ............................. 2005-069783 |
| Mar. 14, 2005 | (JP) | ............................. 2005-071009 |
| Mar. 29, 2005 | (JP) | ............................. 2005-095173 |

(51) Int. Cl.
*G06K 9/00* (2006.01)

(52) U.S. Cl. ........................ 382/165; 382/173; 382/199; 382/286

(58) Field of Classification Search ................. 382/162, 382/163, 164, 165, 199, 173, 286; 348/586
See application file for complete search history.

(56) References Cited

U.S. PATENT DOCUMENTS 5,937,104 A  8/1999  Henderson et al.

(Continued)

FOREIGN PATENT DOCUMENTS

EP  0756419 A1  1/1997

(Continued)

*Primary Examiner*—Phuoc Tran
(74) *Attorney, Agent, or Firm*—Sughrue Mion, PLLC

(57) ABSTRACT

There are provided a background replacing apparatus, a background replacing program, and a background replacing method, which are capable of creating a background replaced image in which a background of a photographic image is naturally replaced with a desired background. The background replacing apparatus has an image obtaining section 710 that obtains a plurality of photographic images obtained through photography of a common subject under a plurality of photographic conditions, and a replacement processing section 730. In the replacement processing section, a background area of the photographic image is discriminated from other areas in accordance with the photographic images obtained by the image obtaining section 710, and a mixing ratio of a subject color and a background color, and the subject color are presumed in other areas excepting the background area in the photographic image, and a background of the photographic image obtained by the image obtaining section 710 is replaced with a different background using the subject color and the mixing ratio, which are presumed.

41 Claims, 41 Drawing Sheets

U.S. PATENT DOCUMENTS

| | | | |
|---|---|---|---|
| 5,986,771 A | 11/1999 | Henderson et al. | |
| 6,134,346 A | 10/2000 | Berman et al. | |
| 6,301,382 B1 * | 10/2001 | Smith et al. | 382/162 |
| 6,490,006 B1 | 12/2002 | Monjo | |
| 7,508,455 B2 * | 3/2009 | Liu et al. | 348/587 |
| 2003/0086018 A1 | 5/2003 | Berman et al. | |

FOREIGN PATENT DOCUMENTS

| | | |
|---|---|---|
| EP | 1100262 A1 | 5/2001 |
| JP | 8-065705 A | 3/1996 |
| JP | 10-210340 A | 8/1998 |
| JP | 10-257518 A | 9/1998 |
| JP | 2000-030040 A | 1/2000 |
| JP | 2000-224410 A | 8/2000 |
| JP | 2003-058873 A | 2/2003 |
| JP | 2004-282167 A | 10/2004 |
| WO | 94/26057 A1 | 11/1994 |

* cited by examiner

M2  M3  M1

M2  M3  M1

BACKGROUND REPLACING APPARATUS, BACKGROUND REPLACING PROGRAM, AND BACKGROUND REPLACING METHOD

TECHNICAL FIELD

The present invention relates to a background replacing apparatus for replacing a background of a photographic image with another background to create a background replaced image, a background replacing program that causes a computer to operate as the background replacing apparatus, when the background replacing program is incorporated into the computer and is executed, and a background replacing method of replacing a background of a photographic image with another background to create a background replaced image.

BACKGROUND ART

Hitherto, photo studio and the like perform a photographic work using a background curtain. However, for such a photographic work, there is used a large background curtain to provide a sufficient background, and there is a need to prepare a wide photographic working space. Further, exchanges of the background curtain take a great deal of time, and as a result, it involves a high cost of photographic work.

Thus, in order that a person can enjoy photography with ease, it is desired to develop a small type of photographic system without need of a large background curtain and a wide photographic working space, as needed for the conventional photographic work. According to such a small type of photographic system, there is performed a photographic work before some provisional background instead of the background curtain as mentioned above. Therefore, there is considered an application of background replacing processing, in which a background of a photographic image is replaced with a background desired by a custom, to the photographic image obtained through photography.

As an example of technology as to the background replacing processing, for example, there is known processing referred to as chromakey processing in which photography is carried out through an arrangement of background panel coated with blue and the like back the subject, and in a photographic image obtained through the photography, a portion of the same color as the background panel and a portion of the different color from the background panel are distinguished from one another in form of a background area of the photographic image and a subject area, respectively, so that the portion, which is discriminated as the background area of the photographic image, is replaced with a desired background.

According to the chromakey processing, in the event that a shadow of the subject of the photographic image is formed on the background panel, it would happen that the shadow disturbs a distinction between the subject area and the background area. In view of the foregoing, in the event that a photograph of an image of interest of the chromakey processing is taken, there is proposed technology that as the background, a background panel of a panel light emission is used, so that a photography is carried out in a state that the shadow of the subject on the background panel is negated by light emitted from the background panel (for example, cf. Japanese Patent Application Laid Open Gazette Tokukai 2000-224410 (pages 3-10, FIG. 3)). Japanese Patent Application Laid Open Gazette Tokukai 2000-224410 further discloses chromakey processing wherein when a portion, which is discriminated as a subject area, is synthesized with a desired background, a color tone of the portion discriminated as the subject area is controlled to a color tone according to the color tone of the desired background, so that there is created a composite image in which the subject looks as it naturally matches for the desired background.

Further, there is proposed technology that two photographic images are obtained through performing photography under two lighting conditions of a state in which a lighting directed to the subject turns on at a place where the back of the subject opens, for example, out of doors, and a state in which the lighting turns off, and in those two photographic images, a portion that is different in luminance and a portion that is same in luminance are distinguished as a subject area and a background area of the photographic images, respectively, so that the portion discriminated as the background area of the photographic images is replaced with a desired background (for example, cf. Japanese Patent Application Laid Open Gazette Tokukai Hei 10-210340 (pages 2-3, FIG. 1)).

By the way, for example, in the event that photography is carried out taking a person as the subject, it often happens that the photography is carried out in a state that a background appears through hairs and scarves of the woman as the subject. Thus, it often happens that the background appears through a part of the subject on the photographic image. In the event that as to the photographic image as mentioned above, the background is replaced in accordance with technologies disclosed in Japanese Patent Application Laid Open Gazette Tokukai 2000-224410 (pages 3-10, FIG. 3) and Japanese Patent Application Laid Open Gazette Tokukai Hei 10-210340 (pages 2-3, FIG. 1), and general chromakey processing, it often happens that there is created unnatural background-replaced images such as an image in which a part of the edge of the subject together with the background is replaced by another background, and an image in which the old background before replacement appears through a part of the subject.

DISCLOSURE OF THE INVENTION

In view of the foregoing, it is an object of the present invention to provide a background replacing apparatus capable of naturally replacing a background of a photographic image with a desired background to create a background replaced image, a background replacing program that causes a computer to operate as the background replacing apparatus, when the background replacing program is incorporated into the computer and is executed, and a background replacing method capable of naturally replacing a background of a photographic image with a desired background to create a background replaced image.

To achieve the above-mentioned object, the present invention provides a first background replacing apparatus comprising:

an image obtaining section that obtains a plurality of photographic images generated through photography of a common subject under a plurality of photographic conditions;

an area discriminating section that discriminates among a subject area, a background area, and a boundary area of the photographic image in accordance with at least one of the photographic images obtained by the image obtaining section;

a mixing ratio determining section that determines a mixing ratio of a subject color to a background color in the boundary area; and a background replacing section that replaces a background of the photographic image obtained by the image obtaining section with a different background in accordance with three areas of the subject area, the background area, and the boundary area, which are discriminated by the area discriminating section, and the mixing ratio determined by the mixing ratio determining section.

According to a photographic image offering such a state that a background appears through a part of a subject, in many cases, an image portion offering such the state is constructed of pixels each having a mixed color of a color of the subject and a color of the background appearing at the back of the subject. Hence, simply replacing the background area of the photographic image by an image of a different background would retain the color of the background on the image portion as mentioned above. The reason why an image, in which a background is replaced in accordance with the chromakey processing and the like, is unnaturally seen for a person is due to this.

According to the first background replacing apparatus of the present invention, the area discriminating section discriminates among a subject area, a background area, and a boundary area of the photographic image in accordance with at least one of the photographic images obtained by the image obtaining section, the mixing ratio determining section determines a mixing ratio of a subject color to a background color in the boundary area, and the background replacing section replaces a background of the photographic image obtained by the image obtaining section with a different background in accordance with three areas of the subject area, the background area, and the boundary area, which are discriminated by the area discriminating section, and the mixing ratio determined by the mixing ratio determining section. Thus, there is created an image that causes a person to recognize the state that a background after replacement appears through a part of a subject. In effect, according to the background replacing apparatus of the present invention, it is possible to create a background replaced image in which the background is naturally replaced by a background of a client wish.

In the first background replacing apparatus according to the present invention as mentioned above, it is preferable that the area discriminating section discriminates among the subject area, the background area, and the boundary area of the photographic image in accordance with a predetermined different point between the subject and the background in the photographic conditions.

For example, in the photographic condition that the subject is photographed in the backlight, there exists an apparent distinction addressed as luminous intensity between the subject and the background. According to the background replacing apparatus of the present invention, it is possible to readily distinguish the subject area, the background area, and the boundary area of the photographic image in accordance with such a distinction.

In the first background replacing apparatus according to the present invention as mentioned above, it is preferable that the area discriminating section discriminates the photographic image between a subject-side area and a background-side area in accordance with a predetermined different point between the subject and the background in the photographic conditions, and at least one of the subject-side area and the background-side area is reduced so as to be treated as the subject area and the background area, and an area between the subject area and the background area is treated as the boundary area.

In the first background replacing apparatus according to the present invention as mentioned above, it is preferable that the area discriminating section discriminates the photographic image between a subject-side area and a background-side area in accordance with a predetermined different point between the subject and the background in the photographic conditions, and the subject-side area is reduced so as to be treated as the subject area, and an area portion excepting the subject area, of the subject-side area before reduction, is treated as whole or part of the boundary area.

In the first background replacing apparatus according to the present invention as mentioned above, it is preferable that the area discriminating section discriminates the photographic image between a subject-side area and a background-side area in accordance with a predetermined different point between the subject and the background in the photographic conditions, and the background-side area is reduced so as to be treated as the background area, and an area portion excepting the background area, of the background-side area before reduction, is treated as whole or part of the boundary area.

According to the background replacing apparatus of the present invention as mentioned above, after the photographic image is once discriminated between a subject-side area and a background-side area in accordance with a predetermined different point between the subject and the background in the photographic conditions, both or one of those areas is reduced, so that there is set up a suitable boundary area in such a manner that a portion offering a state that the background appears through a part of the subject, which may be seen at the vicinity of the boundary between the subject and the background in the photographic image, is surely included in the boundary area. This feature makes it possible to surely suppress the above-mentioned unnaturalness.

In the first background replacing apparatus according to the present invention as mentioned above, it is acceptable that the area discriminating section discriminates among the subject area, the background area, and the boundary area of the photographic image in accordance with one of the photographic images obtained by the image obtaining section, and the background replacing section replaces a background of a photographic image, which is different from the photographic image used for discrimination of areas by the area discriminating section, of the photographic images obtained by the image obtaining section.

As the typical example of the background replacing apparatus as mentioned above, there is raised an apparatus in which there are obtained a first photographic image having a great different point between a subject and a background in the single photographic image, for example, a back light photographic image that is obtained through a back light photography, and a second photographic image that is obtained through a photography of the subject common to the first photographic image under photographic conditions that a clear photograph of the subject can be obtained, and first, the subject, the subject area, the background area, and the boundary area in the first photographic image are distinguished from one another in accordance with said great different point, and then the distinction is applied to the second photographic image.

In the first background replacing apparatus according to the present invention as mentioned above, it is preferable that the mixing ratio determining section presumes the subject color and the mixing ratio in the boundary area of the photographic image; and the background replacing section replaces the background of the photographic image with the different background using the subject color and the mixing ratio, which are presumed by the mixing ratio determining section.

The mixing ratio of the subject color to the background color in the boundary area of the photographic image corresponds to a degree of an appearance of the background in a state that the background appears through a part of the subject. According to the background replacing apparatus of the present invention as mentioned above, there is presumed the subject color as well as mixing ratio, and thus it is possible to determine a suitable mixed color and thereby creating a natural background replaced image.

In the first background replacing apparatus according to the present invention as mentioned above, it is preferable that the mixing ratio determining section presumes the subject color using colors in the subject area as candidates for the subject color.

According to the background replacing apparatus of the preferable form of the invention as mentioned above, as the candidates for the subject color, there is used the respective color of the subject area, which is deemed to include a color close to the subject color with high probability, and thus it is possible to presume the subject color with great accuracy.

In the first background replacing apparatus according to the present invention as mentioned above, it is preferable that the mixing ratio determining section presumes the subject color and the mixing ratio on individual points in the boundary area, and presumes the subject color on assumption that the subject color lines up on a straight line basis with the background color and a color of the associated point in a predetermined color space.

It is considered that a mixed color of two colors is lined up on a straight-line basis in the two colors that are the base of the mixed color in a color space, for example, R (red) G (green) B (blue) color space. According to the background replacing apparatus of the preferable form of the invention as mentioned above, the subject color is presumed taking the background color, and the color of the associated point that is the mixed color of the background color and the subject color, as being known, and taking the color lined up with those two colors on a straight-line basis as candidates, and thus it is possible to presume the subject color with great accuracy.

In the first background replacing apparatus according to the present invention as mentioned above, it is preferable that the mixing ratio determining section presumes the subject color and the mixing ratio on individual points in the boundary area, and presumes the subject color, using colors in the subject area as candidates for the subject color, in such a manner that of the candidates, a candidate, which lines up on a straight line basis with the background color and a color of the associated point in a predetermined color space, and is closest to the color of the associated point, is presumed as the subject color.

Colors of the individual points are colors in which the subject color is mixed with the background color, and thus it is expected that the colors of the individual points and the subject color have similarity in some extent. According to the first background replacing apparatus of the present invention as mentioned above, the candidate closest to the colors of the individual points is presumed as the subject color, and thus it is possible to presume the subject color with great accuracy.

In the first background replacing apparatus according to the present invention as mentioned above, it is preferable that the mixing ratio determining section presumes the subject color and the mixing ratio on individual points in the boundary area, and presumes the mixing ratio in accordance with a ratio of a mutual distance among the background color, a color of the associated point, and the subject color, in a predetermined color space.

According to the background replacing apparatus of the present invention as mentioned above, it is possible to readily presume the mixing ratio in accordance with a ratio of a mutual distance among the background color, the color of the associated point, and the subject color, in a predetermined color space, which is obtained through a simple computation.

In the first background replacing apparatus according to the present invention as mentioned above, it is preferable that the background replacing section replaces the background of the photographic image with the different background in such a manner that a color of the different background and the subject color presumed by the mixing ratio determining section are mixed at the mixing ratio presumed by the mixing ratio determining section.

According to a photographic image offering such a state that a background appears through a part of a subject, in many cases, a color of a portion offering such the state is a mixed color of the color of the background and the subject color. In this case, the mixing ratio of the mixed color reflects a state of appearance of the background appearing through a part of the subject. According to the first background replacing apparatus according to the present invention as mentioned above, a color of the different background and the subject color presumed by the mixing ratio determining section are mixed at the mixing ratio presumed by the mixing ratio determining section. This feature makes it possible to readily reproduce the state of appearance of the background appearing through a part of the subject, with the image after the replacement for the background.

In the first background replacing apparatus according to the present invention as mentioned above, it is preferable that the background replacing apparatus further comprises an image correcting section performs correction of the area discriminated by the area discriminating section in response to an operation, and causes the background replacing section to perform the background replacing based on a corrected area so that a background replaced image is corrected.

According to the background replacing apparatus of the preferred form of the present invention as mentioned above, even if the background replaced image once created is, for example, an unnatural image in which a part of green of the subject is replaced together with the background by a different background, it is possible to correct the unnatural background replaced image into a natural background replaced image in such a manner that the correction of the area discriminated by the area discriminating section is carried out, and for example, the image portion, which includes elements of both the background and the subject, is removed from the background area so that processing for the especial image portion is performed.

In the background replacing apparatus having the image correcting section according to the present invention as mentioned above, it is acceptable that the area discriminating section discriminates the photographic image between a subject-side area and a background-side area in accordance with a predetermined different point between the subject and the background in the photographic conditions, and the subject-side area and the background-side area are reduced by a predetermined reduction amount so as to be treated as the subject area and the background area, and the image correcting section alters the reduction amount on the area discriminating section in response to an operation, so that the subject area and/or the background area are corrected.

In the background replacing apparatus having the image correcting section according to the present invention as mentioned above, it is acceptable that the area discriminating section discriminates between the subject area and the background area in accordance with a discrimination basis based on a predetermined different point between the subject and the background in the photographic conditions, and the image correcting section alters the discrimination basis in response to an operation, so that the subject area and/or the background area are corrected.

According to the background replacing apparatus of the preferred form of the present invention as mentioned above, the subject area and/or the background area are not directly corrected, but parameters, such as the reduction amount and the discrimination basis, which are sensuously realizable for a person, are altered, and thus it is possible to easily correct the subject area and/or the background area.

To achieve the above-mentioned object, the present invention provides a second background replacing apparatus comprising:

an image obtaining section that obtains a plurality of photographic images generated through photography of a common subject under a plurality of photographic conditions;

an area discriminating section that discriminates a background area of the photographic image from other areas in accordance with at least one of the photographic images obtained by the image obtaining section;

a mixing state presuming section that presumes a mixing ratio of a subject color and a background color in other areas excepting the background area in the photographic image, and the subject color; and a background replacing section that replaces a background of the photographic image obtained by the image obtaining section with a different background using the subject color and the mixing ratio, which are presumed by the mixing state presuming section.

According to the second background replacing apparatus of the present invention, the area discriminating section discriminates a background area of the photographic image from other areas in accordance with at least one of the photographic images obtained by the image obtaining section, and the mixing state presuming section presumes a mixing ratio of a subject color and a background color in other areas excepting the background area in the photographic image, and the subject color. The mixing ratio corresponds to a degree of an appearance of the background in a state that the background appears through a part of the subject. According to the background replacing apparatus of the present invention as mentioned above, there is presumed the subject color as well as mixing ratio, and thus it is possible to determine a suitable mixed color and thereby creating a natural background replaced image. In effect, according to the background replacing apparatus of the present invention, it is possible to create a background replaced image in which the background is naturally replaced by a background of a client wish.

C17 In the second background replacing apparatus according to the present invention as mentioned above, it is preferable that the mixing state presuming section presumes the subject color using colors in the subject area as candidates for the subject color.

According to the background replacing apparatus of the present invention as mentioned above, as the candidates for the subject color, there is used the respective color of the photographic image, which is deemed to include a color close to the subject color with high probability, and thus it is possible to presume the subject color with great accuracy.

In the second background replacing apparatus according to the present invention as mentioned above, it is preferable that the mixing state presuming section presumes the subject color and the mixing ratio on individual points in other areas excepting the background area, and presumes the subject color on assumption that the subject color lines up on a straight line basis with the background color and a color of the associated point in a predetermined color space.

It is considered that a mixed color of two colors is lined up on a straight-line basis in the two colors that are the base of the mixed color in a color space, for example, R (red) G (green) B (blue) color space. According to the second background replacing apparatus of the present invention as mentioned above, the subject color is presumed taking the background color and the color of the individual points, which is the mixed color of the background color and the subject color, as being known, and taking the color lined up with those two colors on a straight-line basis as candidates, and thus it is possible to presume the subject color with great accuracy.

In the second background replacing apparatus according to the present invention as mentioned above, it is preferable that the mixing state presuming section presumes the subject color and the mixing ratio on individual points in other areas excepting the background area, and presumes the subject color, using colors in other areas excepting the background area as candidates for the subject color, in such a manner that of the candidates, a candidate, which lines up on a straight line basis with the background color and a color of the associated point in a predetermined color space, and is farthest from the color of the associated point, is presumed as the subject color.

It is considered that the other areas excepting the background area includes a color close to the subject color with high probability, and also includes additional color mixed at other mixing ratio between the subject color and a color of the individual points with high probability. According to the second background replacing apparatus of the present invention as mentioned above, the mixing state presuming section presumes a candidate, which is farthest from the color of the associated point, as the subject color in other areas excepting the background area. Thus, it is possible to avoid such an additional confusing color and the like, and thereby presuming the subject color with great accuracy.

In the second background replacing apparatus according to the present invention as mentioned above, it is preferable that the mixing state presuming section presumes the subject color and the mixing ratio on individual points in other areas excepting the background area, and presumes the mixing ratio in accordance with a ratio of a mutual distance among the background color, a color of the associated point, and the subject color, in a predetermined color space.

According to the background replacing apparatus of the present invention as mentioned above, it is possible to readily presume the mixing ratio in accordance with a ratio of a mutual distance among the background color, a color of the associated point, and the subject color, in a predetermined color space, which is obtained through a simple computation.

In the second background replacing apparatus according to the present invention as mentioned above, it is preferable that the background replacing section replaces the background of the photographic image with the different background in such a manner that a color of the different background and the subject color presumed by the mixing state presuming section are mixed at the mixing ratio presumed by the mixing state presuming section.

According to a photographic image offering such a state that a background appears through a part of a subject, in many cases, a color of a portion offering such the state is a mixed color of the color of the background and the subject color. In this case, the mixing ratio of the mixed color reflects a state of appearance of the background appearing through a part of the subject. According to the background replacing apparatus of the preferred form of the present invention as mentioned above, a color of the different background and the subject color presumed by the mixing ratio determining section are mixed at the mixing ratio presumed by the mixing ratio determining section. This feature makes it possible to readily reproduce the state of appearance of the background appearing through a part of the subject, with the image after the replacement for the background.

In the background replacing apparatus according to the present invention as mentioned above, it is preferable that the area discriminating section discriminates a background area of the photographic image from other areas in accordance with a ratio of luminous intensity among the plural photographic images.

As one way of distinguishing a background area of a photographic image from other area, there is considered, for example, a method of distinguishing the background area of the photographic image from other area in accordance with a difference in luminous intensity between the background and the subject in the photographic image. However, for example, in the event that the photographic image is photographed under the light illumination, there is no substantial difference in luminous intensity between the background and the subject. Thus, according to such a method, it happens that it is difficult to distinguish the background area from other area. According to the background replacing apparatus of the preferable form of the invention as mentioned above, distinguishing the background area of the photographic image from other area is performed in accordance with a ratio of luminous intensity among the plural photographic images. Thus, according to this distinguishing method, a preparation of a plurality of photographic images mutually different in luminous intensity of the background for instance makes it possible to preferably distinguish the background area of the photographic image from other area, since the background area is different from other area in a ratio of luminous intensity, even if there is no substantial difference in luminous intensity between the background and the subject in a sheet of photographic image.

In the background replacing apparatus according to the present invention as mentioned above, it is preferable that the background replacing apparatus further comprises a storage section that stores the subject color and the mixing ratio, which are presumed by the mixing state presuming section, and the a background replacing section replaces a background of the photographic image obtained by the image obtaining section with a different background using the subject color and the mixing ratio, which are stored in the storage section.

According to the background replacing apparatus of the preferred form of the present invention as mentioned above, for example, in the event that after a background is replaced once, the replaced background is replaced with another background, it is possible to save one trouble for computation of the subject color and the mixing ratio.

In the background replacing apparatus according to the present invention as mentioned above, as a first form, it is preferable that the background replacing apparatus further comprises a first parameter determining section that determines a correction parameter to be used for a color correction for the subject color in accordance with an image of said other area in which a color is replaced by the subject color presumed in the mixing state presuming section, and a first color correcting section that applies the color correction to the subject color, which is presumed by the mixing state presuming section, using the correction parameter determined by the first parameter determining section, wherein the background replacing section replaces the background of the photographic image obtained by the image obtaining section with a different background using the subject color subjected to the color correction by the first color correcting section and the mixing ratio.

In the background replacing apparatus according to the present invention as mentioned above, as a second form, it is preferable that the background replacing apparatus further comprises a second parameter determining section that determines a correction parameter to be used for a color correction for the subject color in accordance with the photographic image obtained by the image obtaining section, and a second color correcting section that applies the color correction to the subject color, which is presumed by the mixing state presuming section, using the correction parameter determined by the second parameter determining section, wherein the background replacing section replaces the background of the photographic image obtained by the image obtaining section with a different background using the subject color subjected to the color correction by the second color correcting section and the mixing ratio.

In the background replacing apparatus according to the present invention as mentioned above, as a third form, it is preferable that the background replacing apparatus further comprises a third parameter determining section that determines a correction parameter to be used for a color correction for the subject color to a parameter according to an operation, and a third color correcting section that applies the color correction to the subject color, which is presumed by the mixing state presuming section, using the correction parameter determined by the third parameter determining section, wherein the background replacing section replaces the background of the photographic image obtained by the image obtaining section with a different background using the subject color subjected to the color correction by the third color correcting section and the mixing ratio.

There is known a color correction addressed as a so-called set up in which the color shade and the white balance of a photographic image are corrected to the color shade and the white balance which are generally deemed to be preferable for a person. Apparently, in the replacement of a background on the photographic image which is subjected to the set up, it seems that a high picture quality of image, in which the background is replaced, can be obtained. However, the use of the photographic image subjected to the set up causes the mixing state presuming section to incorrectly perform the presumption of the subject color for the reason that for example, the gradation of the image is altered. Thus, there is a possibility that it is difficult to perform the replacement of the natural background. In the event that the set up is applied to the image after the background replacement, the color of the background for the replacement is inadvertently changed too. According to the background replacing apparatus of three types of preferred forms of the present invention as mentioned above, in any cases, the color correction is applied to the subject color which is presumed by the mixing state presuming section. Therefore, according to the background replacing apparatus of those three types of preferred forms of the present invention as mentioned above, the adoption of, for example, the set up as the color correction, makes it possible to execute the set up without having an effect on the color of the background for the replacement and the presumption of the subject color by the mixing state presuming section, and thereby obtaining a high picture quality of image in which a background is replaced. It is acceptable that the correction parameter to be used for the set up is determined in accordance with the image on the other area in which the color is replaced by the subject color, as the first form of the three types of preferred forms of the present invention as mentioned above, or it is determined in accordance with the photographic image, as the second form, or alternatively, it is determined in accordance with the user's operation, as the third form.

In the background replacing apparatus according to the present invention as mentioned above, it is preferable that the background replacing apparatus further comprises a fourth parameter determining section that determines a correction parameter to be used for a color correction for the subject color to a parameter according to the different background, and a fourth color correcting section that applies the color correction to the subject color, which is presumed by the mixing state presuming section, using the correction parameter determined by the fourth parameter determining section, wherein the background replacing section replaces the background of the photographic image obtained by the image obtaining section with a different background using the subject color subjected to the color correction by the fourth color correcting section and the mixing ratio.

According to the background replacing apparatus of the preferred form of the present invention as mentioned above, it is possible to perform the set up without having an effect on the presumption of the subject color and the color of the background for the replacement, and thereby obtaining a high picture quality of image in which a background is replaced. And in addition, for example, in the event that an evening scene is used as the different background, when there is performed the set up that the subject color is corrected to a color inclining to an orange color in accordance with the evening scene, it is possible to obtain an image in which the background is more naturally replaced.

In the background replacing apparatus according to the present invention as mentioned above, it is preferable that the background replacing section replaces a background of the photographic image using, as the different background, a background to which relation information representative of a relative positional relation in an image between the subject and the background is applied, and performs an replacement in such a manner that the relative relation in the background replaced image between the subject and the background is the same relative relation as the relative relation represented by the relation information.

According to the background replacing apparatus of the preferred form of the present invention as mentioned above, it is possible to perform a replacement of the background so that for example, position and size of the subject in the background replaced image are natural ones to the different background, and thereby obtaining an image in which the background is more naturally replaced.

To achieve the above-mentioned object, the present invention provides a third background replacing apparatus comprising:

an image obtaining section that obtains a plurality of photographic images generated through photography of a common subject under a plurality of photographic conditions mutually different in color of the background;

an area discriminating section that discriminates a background area of the photographic image from other areas in accordance with the photographic images obtained by the image obtaining section;

a mixing state presuming section that presumes a mixing ratio of the subject color to the background color, and the subject color, in other areas excepting the background area in the photographic image, in accordance with the plurality of photographic images; and a background replacing section that replaces a background of the photographic image obtained by the image obtaining section with a different background using the subject color and the mixing ratio, which are presumed by the mixing state presuming section.

According to the third background replacing apparatus of the present invention, the mixing state presuming section presumes a mixing ratio of the subject color to the background color, and the subject color, in other areas excepting the background area in the photographic image, in accordance with the plurality of photographic images. The mixing ratio corresponds to a degree of an appearance of the background in a state that the background appears through a part of the subject. According to the background replacing apparatus of the present invention as mentioned above, there is presumed the subject color as well as mixing ratio, and thus it is possible to determine a suitable mixed color and thereby creating a natural background replaced image. According to the background replacing apparatus of the present invention as mentioned above, the subject color and the mixing ratio are presumed in accordance with the plurality of photographic images, which are mutually different in the background color. Since those pluralities of photographic images are obtained through photography of the common subject, the subject color is common among those pluralities of photographic images. Thus, according to the background replacing apparatus of the present invention, it is possible to perform a presumption of the subject color and the mixing ratio using the unique and exact presuming scheme, in which for example, first, a single subject color is presumed in accordance with a plurality of presuming materials, such as a plurality of photographic images, and then the mixing ratio is presumed from the presumed subject color. In effect, according to the background replacing apparatus of the present invention, it is possible to create a background replaced image in which the background is naturally replaced by a background of a client wish.

In the third background replacing apparatus according to the present invention as mentioned above, it is preferable that the mixing state presuming section presumes, on assumption that the plurality of photographic images are equal to each other in terms of mixing state of the subject color and the background color, the subject color and the mixing ratio, the subject color and the mixing ratio.

According to the background replacing apparatus of the preferred form of the present invention as mentioned above, it is possible to consider that the mixing ratio in the mixed color is common among the plurality of photographic images. Thus, also regarding the mixing ratio, it is possible to perform a presumption of a single mixing ratio in accordance with the unique and exact presuming scheme, in which a single mixing ratio is presumed in accordance with a plurality of presuming materials, such as a plurality of photographic images.

In the third background replacing apparatus according to the present invention as mentioned above, it is preferable that the mixing state presuming section presumes the subject color and the mixing ratio on individual points in other area excepting the background area, determines straight lines each coupling in a predetermined color space the background color with a color of the associated point in each of the plurality of photographic images generated through photography of the common subject under a plurality of photographic conditions mutually different in color of the background, and presumes a color corresponding to an intersection of the straight lines as the subject color.

According to the third background replacing apparatus of the present invention as mentioned above, it is possible to mathematically uniquely determine a subject color, and then readily determine the mixing ratio from the subject color.

In the third background replacing apparatus according to the present invention as mentioned above, it is preferable that the image obtaining section obtains a plurality of photographic images generated through photography of the common subject under a plurality of photographic conditions mutually different in color-phase of the background.

According to the background replacing apparatus of the preferred form of the present invention as mentioned above, it is possible to presume the subject color and the mixing ratio with great accuracy.

In the third background replacing apparatus according to the present invention as mentioned above, it is preferable that the area discriminating section discriminates between a subject area and a boundary area of other areas excepting the background area in the photographic image; and the mixing state presuming section that presumes the subject color and the mixing ratio in the boundary area.

According to the background replacing apparatus of the preferred form of the present invention as mentioned above, the limit of the object for the presuming processing is restricted in the photographic image. This feature makes it possible to efficiently perform the presumption processing.

In the third background replacing apparatus according to the present invention as mentioned above, it is preferable that the area discriminating section discriminates the background area of the photographic image obtained by the image obtaining section from other areas in accordance with an amount of the change in color among the plurality of photographic images.

In the third background replacing apparatus according to the present invention as mentioned above, it is preferable that the area discriminating section discriminates the background area of the photographic image obtained by the image obtaining section from other areas in accordance with a difference of luminous intensity between the background and the subject.

Those features as mentioned above make it possible to readily implement the area discriminating section. According to the former feature in which the distinction of the areas is performed in accordance with an amount of the change in color, it is possible to perform the distinction of the areas using the photographic image as one used in the presumption for the subject color and the mixing ratio, and thereby saving the number of photographic images needed for the background replacing processing in its entirety. According to the latter feature in which the distinction of the areas is performed in accordance with the difference of luminous intensity between the background and the subject, there are needed the photographic image that obtained through photography of the subject under the photographic condition that luminous intensity of the background is different from the luminous intensity of the subject. On the other hand, it is possible to perform the distinction of the areas in accordance with only the photographic image, and thereby contributing to simplification of the distinction of the areas itself.

To achieve the above-mentioned object, the present invention provides a first background replacing program that causes a computer to operate as an apparatus, when the background replacing program is incorporated into the computer and is executed, the apparatus comprising:

an image obtaining section that obtains a plurality of photographic images generated through photography of a common subject under a plurality of photographic conditions;

an area discriminating section that discriminates among a subject area, a background area, and a boundary area of the photographic image in accordance with the photographic images obtained by the image obtaining section;

a mixing ratio determining section that determines a mixing ratio of a subject color to a background color in the boundary area; and a background replacing section that replaces a background of the photographic image obtained by the image obtaining section with a different background in accordance with three areas of the subject area, the background area, and the boundary area, which are discriminated by the area discriminating section, and the mixing ratio determined by the mixing ratio determining section.

To achieve the above-mentioned object, the present invention provides a second background replacing program that causes a computer to operate as an apparatus, when the background replacing program is incorporated into the computer and is executed, the apparatus comprising:

an image obtaining section that obtains a plurality of photographic images generated through photography of a common subject under a plurality of photographic conditions;

an area discriminating section that discriminates a background area of the photographic image from other areas in accordance with the photographic images obtained by the image obtaining section;

a mixing state presuming section that presumes a mixing ratio of the subject color and the background color, and the subject color, in other areas excepting the background area in the photographic image; and a background replacing section that replaces a background of the photographic image obtained by the image obtaining section with a different background using the subject color and the mixing ratio, which are presumed by the mixing state presuming section.

To achieve the above-mentioned object, the present invention provides a third background replacing program that causes a computer to operate as an apparatus, when the background replacing program is incorporated into the computer and is executed, the apparatus comprising:

an image obtaining section that obtains a plurality of photographic images generated through photography of a common subject under a plurality of photographic conditions in which colors of backgrounds are different from one another;

an area discriminating section that discriminates a background area of the photographic image from other areas in accordance with the photographic images obtained by the image obtaining section;

a mixing state presuming section that presumes a mixing ratio of the subject color and the background color, and the subject color, in other areas excepting the background area in the photographic image, in accordance with the plurality of photographic images; and a background replacing section that replaces a background of the photographic image obtained by the image obtaining section with a different background using the subject color and the mixing ratio, which are presumed by the mixing state presuming section.

According to the first to third background replacing programs of the present invention as mentioned above, it is possible to readily implement a background replacing apparatus capable of creating a background replaced image in which the background of the photographic image is naturally replaced with the desired background.

To achieve the above-mentioned object, the present invention provides a first background replacing method comprising:

an image obtaining step that obtains a plurality of photographic images generated through photography of a common subject under a plurality of photographic conditions;

an area discriminating step that discriminates among a subject area, a background area, and a boundary area of the photographic image in accordance with the photographic images obtained by the image obtaining step;

a mixing ratio determining step that determines a mixing ratio of a subject color to a background color in the boundary area; and a background replacing step that replaces a background of the photographic image obtained by the image obtaining step with a different background in accordance with three areas of the subject area, the background area, and the boundary area, which are discriminated by the area discriminating step, and the mixing ratio determined by the mixing ratio determining step.

To achieve the above-mentioned object, the present invention provides a second background replacing method comprising:

an image obtaining step that obtains a plurality of photographic images generated through photography of a common subject under a plurality of photographic conditions;

an area discriminating step that discriminates a background area of the photographic image from other areas in accordance with the photographic images obtained by the image obtaining step;

a mixing state presuming step that presumes a mixing ratio of a subject color and a background color, and the subject color, in other areas excepting the background area in the photographic image; and a background replacing step that replaces a background of the photographic image obtained by the image obtaining step with a different background using the subject color and the mixing ratio, which are presumed by the mixing state presuming step.

To achieve the above-mentioned object, the present invention provides a third background replacing method comprising:

an image obtaining step that obtains a plurality of photographic images generated through photography of a common subject under a plurality of photographic conditions;

an area discriminating step that distinguishes a background area of the photographic image from other areas in accordance with the photographic images obtained by the image obtaining step;

a mixing state presuming step that presumes a mixing ratio of a subject color and a background color, and the subject color, in other areas excepting the background area in the photographic image, in accordance with the plurality of photographic images; and a background replacing step that replaces a background of the photographic image obtained by the image obtaining step with a different background using the subject color and the mixing ratio, which are presumed by the mixing state presuming step.

According to the first to third background replacing methods of the present invention as mentioned above, it is possible to readily create the background replaced image in which the background is naturally replaced with the desired background.

The background replacing program storage medium includes all the aspects corresponding to those of the background replacing apparatus.

As mentioned above, according to the present invention, it is possible to create a background replaced image in which a background of a photographic image is naturally replaced with a desired background.

BEST MODE FOR CARRYING OUT THE INVENTION

Embodiments of the present invention will be described with reference to the accompanying drawings.

Figure 1:
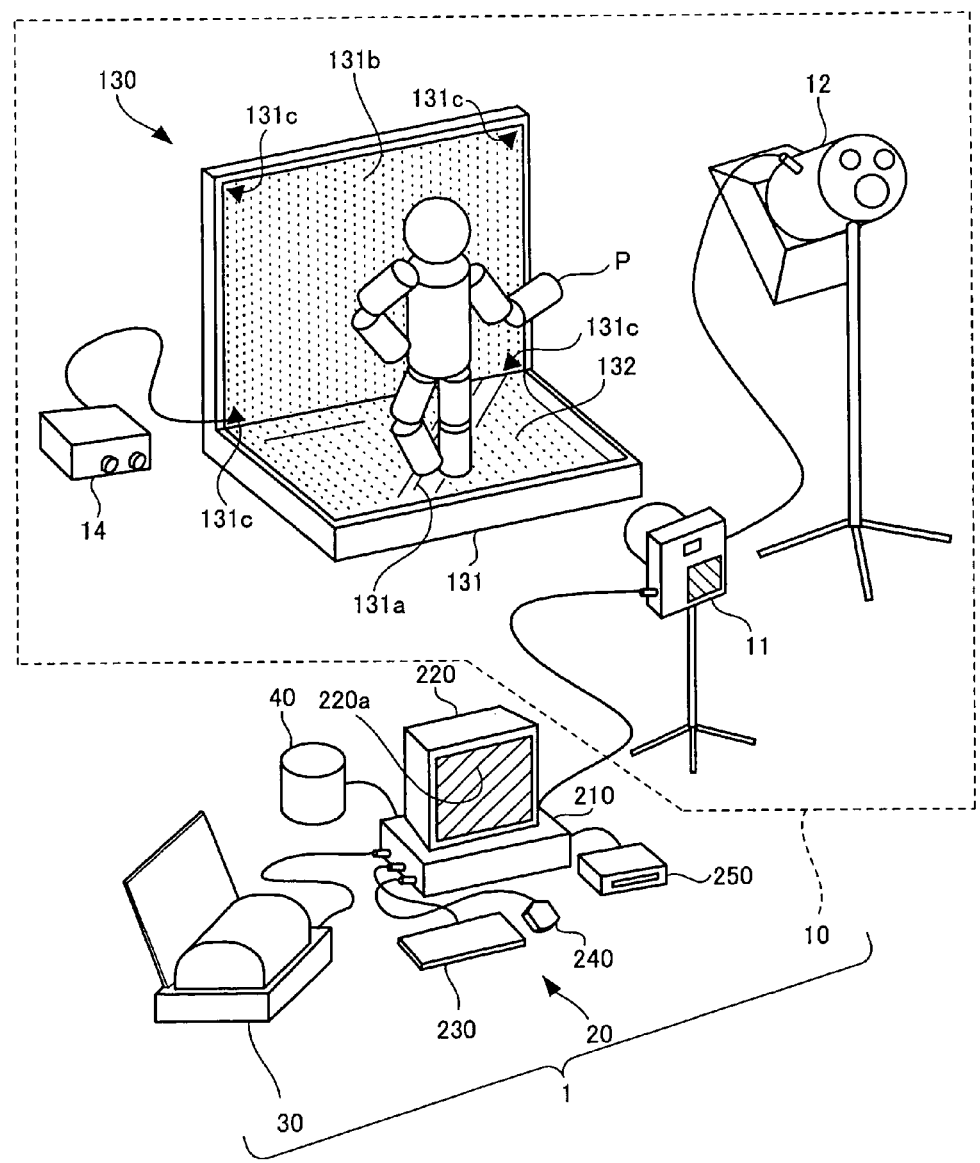
FIG. 1 is a construction view of an image taking system, to which an embodiment of a background replacing apparatus of the present invention is applied.

FIG. 1 is a construction view of an image taking system, to which an embodiment of a background replacing apparatus of the present invention is applied.

An image taking system 1 shown in FIG. 1 comprises: a photo-studio 10 for obtaining a photographic image through photography of the subject; a personal computer 20 that is operated in form of a first embodiment of a background replacing apparatus of the present invention, in which the subject of the photographic image is distinguished from the background, so that the background of the photographic image is replaced with a desired background to create a background replaced image; a printer 30; and a server 40. The photo-studio 10 comprises a digital camera 11, a flashlight emitting device 12, an EL (Electro-Luminescence) panel 130, and a power source 14 for driving the EL panel.

The digital camera 11 has a multi-page function, in which when an operator depresses a shutter button once, twice photography for a subject P is automatically carried out for a short time. A photographic image, which is obtained through a first photography, is temporarily stored in a memory of the digital camera 11. In the image taking system 1, the digital camera 11 is connected to the personal computer 20, and at the time point that a second photography is completed, a photographic image, which is obtained through the second photography, is directly transmitted to the personal computer 20. The digital camera 11 is also connected to the flashlight emitting device 12, so that the digital camera 11 transmits to the flashlight emitting device 12 a flashlight instruction signal to emit a flashlight for every photography.

According to the present embodiment, it is intended to contribute to saving space on the photo-studio 10, and thus the digital camera 11 will take a picture of the subject from a short distance looking down on the subject. As a result, there is a high possibility that a photographic image, which is obtained through photography by the digital camera 11, involves a so-called trapezoidal distortion in which a width of an image is more narrowed as it goes more downward. According to the present embodiment, the trapezoidal distortion is corrected by the personal computer 20.

Upon receipt of the flashlight instruction signal from the digital camera 11, the flashlight emitting device 12 emits flashlight to the subject P. There is a need for the flashlight emitting device 12 to be charged for every light emission, and it takes a time up to the subsequent light emission after once light emission. While the digital camera 11 transmits to the flashlight emitting device 12 the flashlight instruction signal every photography in twice photography, the flashlight emitting device 12 emits the flashlight at only the time of the first photography, and thus the flashlight emitting device 12 turns off at the time of the first photography, since it is not enough for charging. The flashlight, which is emitted from the flashlight emitting device 12, is high luminance of light such as about 2000 cd/m$^2$ in luminance of emitted light.

The EL panel 130 comprises: a cover member 131 having a loading plane 131$a$ for loading with the subject P and a rear plane 131$b$ located at the back of the subject P, which are transparent; and a dispersion type of EL device 132 that is housed in the cover member 131. A power source 14 serves as a power source for applying a driving voltage to the dispersion type of EL device 132. On the four corners of the rear plane 131$b$ of the cover member 131, there are provided four makers 131$c$ each indicating the range of the rear plane 131$b$. The four makers 131$c$ appear the photographic image together with the subject P, so as to be utilized for correction of the trapezoidal distortion for the photographic image.

The dispersion type of EL device 132 is a panel light emission light source, which is shaped as a sheet, wherein one in which fluorescent powder is dispersed in a binder having a high dielectric constant is interposed between two electrodes each shaped as a sheet in which as a substrate, a flexible plastic is adopted. The dispersion type of EL device 132 emits light when an AC voltage from the power source 14 is applied between the two electrodes.

The dispersion type of EL device 132 is a light source that is very thin such as several hundreds of μ meters to 1 millimeter in thickness, and is light. Thus, the dispersion type of EL device 132 can be readily installed in a place having no space in thickness, such as inside of the cover member 131. Further, the dispersion type of EL device 132 has various advantages in a property, such that generation of heat at the time of light emission is less on the order of 2% C, a response speed from a start of light emission up to the maximum luminance is high, the life of a light emission is substantially constant and thus the planning exchange of the device is possible, a local light emission is possible, it withstands impact and vibrations, and dissipation power is small such as 50 W/m$^2$ (at the time of the application of AC power of 50 Hz). Furthermore, the dispersion type of EL device 132 has an advantage in the economy such that the manufacturing cost is inexpensive since it is manufactured through a simple manufacturing process.

According to the general dispersion type of EL device, it is possible to adjust the luminescent color to various colors including white through further mixing of a plurality of fluorescent powders mutually different from one another in luminescent color at the time of the manufacture. To the contrary, according to the dispersion type of EL device 132 of the present embodiment, the fluorescent powders for the color adjustment are not mixed. As a result, the dispersion type of EL device 132 has two or more luminescence peaks during 400 nm to 530 nm in luminescence wavelength. This light is concerned with colors between blue and green, which are the original colors of the dispersion type of EL device. The dispersion type of EL device 132 of the present embodiment emits light of blue and green colors consisting of two or more luminescence peaks as mentioned above. The blue and green colors are complementary colors for a color of a person's skin, and therefore, according to the image taking system 1 of the present embodiment, when photography of a person is taken as the subject, it is possible to obtain a photographic image in which the background is blue and green colors, and thereby making it possible to distinguish the subject and the background in the photographic image with great accuracy. There is a tendency that the fluorescent powders for the color adjustment lower luminance of luminescent color. To the contrary, according to the dispersion type of EL device 132 of the present embodiment, such fluorescent powders for the color adjustment are not mixed, and thus the dispersion type of EL device 132 may emit light with the original luminance of the dispersion type of EL device.

The power source 14 can control the AC voltage to be applied to the dispersion type of EL device 132 in ranges of 50 Hz to 10 kHz in frequency and 40V to 300V in magnitude. The luminance of light emission of the dispersion type of EL device 132 is substantially proportional to the magnitude of the AC voltage to be applied to the dispersion type of EL device 132. According to the photo-studio 10 of the present embodiment, the AC voltage of the power source 14 is adjusted in ranges of 1.2 kHz to 1.5 kHz in frequency and 130V to 300V in magnitude, so that the luminance of light emission of the dispersion type of EL device 132 is adjusted in range of 500 cd/m$^2$ to 600 cd/m$^2$.

According to the photo-studio 10 of the present embodiment, photography by the digital camera 11 is carried out in a condition that the EL panel 130 always turns on. As mentioned above, the first photography is carried out in the state that the flashlight emitting device 12 emits flashlight, and the second photography is carried out in the state that the flashlight emitting device 12 turns off. Further, according to the photo-studio 10 of the present embodiment, the luminance of the flashlight emitted from the flashlight emitting device 12 is extremely higher as compared with luminance when the EL panel 130 turns on. As a result, according to the first photography, there is obtained a follow light photographic image, in which the subject P is clearly photographed, through photography in a follow light state that a flashlight, which is higher in luminance than the luminance of the EL panel 130, is projected from the side of the digital camera 11 to the subject P. According to the second photography to be carried out subsequent to the first photography, there is obtained a back light photographic image, in which an image of the subject P is biased to the shadow side and an image of the EL panel 130 is biased to the highlight side, through photography in a back light state that only light from the EL panel 130 is projected from the back to the subject P.

The personal computer 20 serves as the first embodiment of the background replacing apparatus of the present invention. The personal computer 20 applies image correction processing including the correction of the trapezoidal distortion to the two photographic images transferred from the digital camera 11, and in addition performs background replacing processing for creating a background replaced image in accordance with the corrected photographic images. The image correction processing and the background replacing processing will be described later.

The personal computer 20 comprises, on an external appearance, a main frame unit 210 having a flexible disk-mounting slot for mounting a flexible disk (FD) and a CD-ROM mounting slot for mounting a CD-ROM, the main frame unit 210 having access functions of accessing to the mounted FD and CD-ROM, an image display unit 220 for displaying an image on a display screen 220a in accordance with an instruction from the main frame unit 210, a keyboard 230 for inputting various sorts of information such as user's instruction and character information to the main frame unit 210 in accordance with a key operation, a mouse 240 for inputting an instruction according to, for example, an icon and the like, through designation of an optional position on the display screen 220a, the icon and the like being displayed on the position on the display screen 220a, and a media drive 250 on which a small type of storage media, which is used for storing photographic images in digital camera and the like, is mounted, the media drive 250 accessing the small type of storage media.

The printer 30 prints images transmitted from the personal computer 20. According to the image taking system 1, the printer 30 prints the background replaced image created through the background replacing processing by the personal computer 20.

The server 40 stores a plurality of sorts of backgrounds, which is used in the background replacing processing to be executed by the personal computer 20. The backgrounds stored in the server 40 may be displayed on the display screen 220a. According to the image taking system 1, it is possible to display on the display screen 220a backgrounds that are provided via input storage media such as the CD-ROM and the small type of storage media, as well as the backgrounds stored in the server 40. A customer can select a desired background from among the backgrounds displayed on the display screen 220a.

Next, there will be explained a flow of work in which an embodiment of a background replacing method of the present invention, which is carried out by the image taking system shown in FIG. 1, is applied. In the following figures, the same reference numbers as those of FIG. 1 denotes the same parts.

Figure 2:
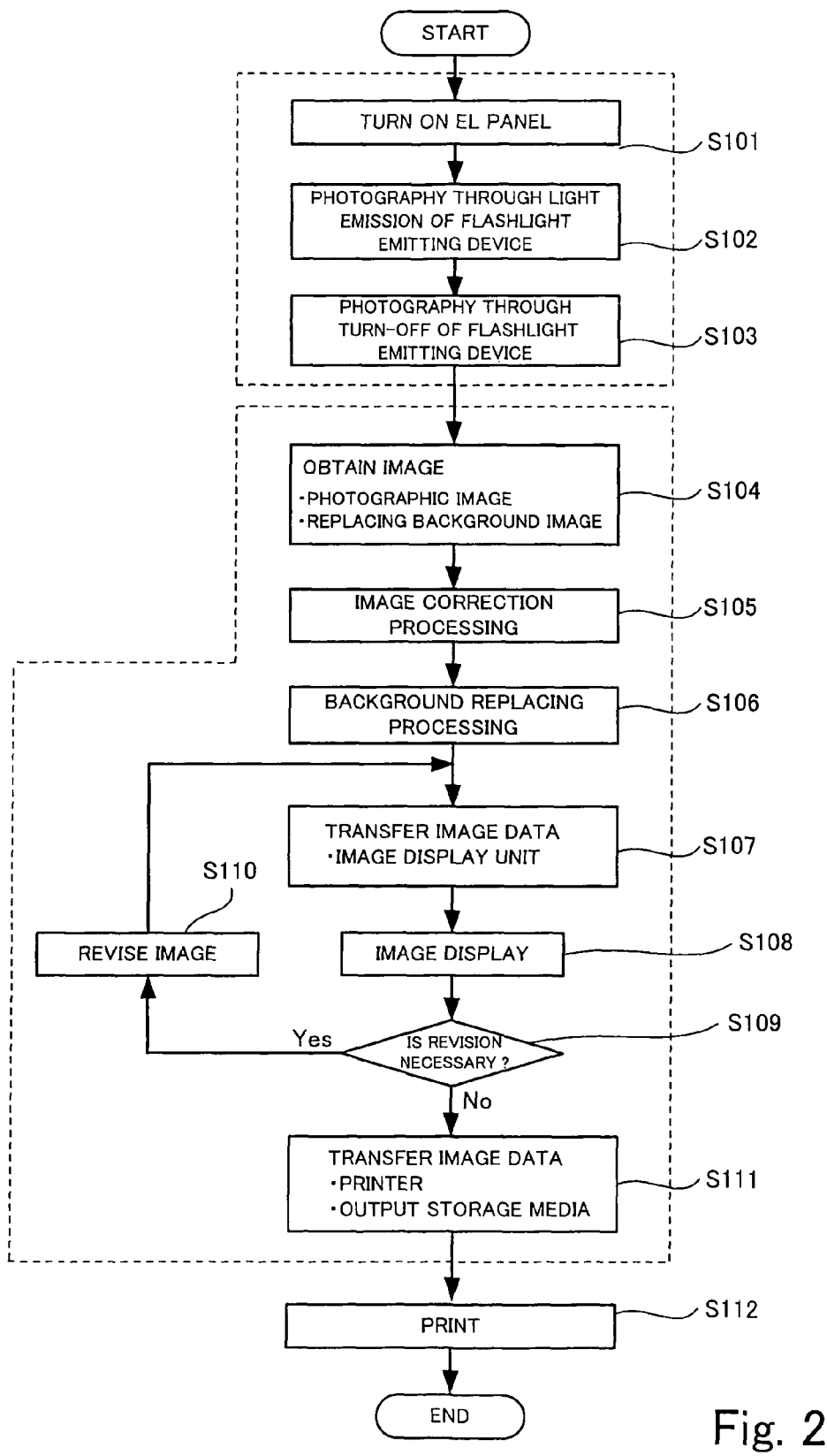
FIG. 2 is a flowchart useful for understanding a flow of work in which an embodiment of a background replacing method of the present invention, which is carried out by the image taking system shown in FIG. 1, is applied.

FIG. 2 is a flowchart useful for understanding a flow of work in which an embodiment of a background replacing method of the present invention, which is carried out by the image taking system 1 shown in FIG. 1, is applied.

The work shown in the flowchart of FIG. 2 is carried out on the assumption that in the photo-studio 10, the subject P, the digital camera 11 and the flashlight emitting device 12 are arranged at their suitable positions, respectively.

First, a voltage is applied from the power source 14 to the dispersion type of EL device 132 to turn on the EL panel 130 (step S101). Next, when an operator depresses a shutter button of the digital camera 11 after adjustments of focus and exposure, the photography for the subject P is carried out continuously twice. First, in the first photography, the flashlight emitting device 12 is in response to the instruction signal transmitted from the digital camera 11 to emit flashlight of higher luminance than the illumination of the EL panel 130, so that photography for the subject P is carried out in the state of the follow light by the flashlight (step S102). Subsequently, the second photography is carried out in a state that the flashlight emitting device 12 turns off, that is, in the back light state by the illumination of only the EL panel 130 (step S103). Two photographic images of the follow light photographic image and the back light photographic image, which are obtained through the step S102 and the step S103, respectively, are temporarily stored in a memory of the digital camera 11.

The processing of the step S101 to the step S103 as mentioned above is concerned with photographic processing by person's hands such as salesclerks of a photo studio, which is carried out in the photo-studio 10.

Next, there will be explained processing following step S104 of the flowchart of FIG. 2. Of the processing, which will be described hereinafter, processing of the step S104 to the step S110 corresponds to the first embodiment of a background replacing method of the present invention.

When the second photography is carried out through the processing of the step S103 and the storage of the photographic image obtained through the second photography into the memory of the digital camera 11 is completed, two photographic images obtained through twice photography, which are temporarily stored in the memory, are immediately transferred to the personal computer 20. In step S104, when a customer operates the personal computer 20, a desired background is read out from the server 40 or some input storage media. The obtaining processing for the photographic images and the backgrounds, which are executed in the step S104, corresponds to an example of the image obtaining step in the background replacing method of the present invention.

In step S105, the two photographic images are subjected to the image correction processing including the correction of the trapezoidal distortion, which will be described later.

In step S106, there is carried out a background replacing processing (it will be described later), in which a background replaced image is created in accordance with the corrected photographic images. Here, in the background replacing processing to be carried out in the step S106, examples of an area distinguishing process and a background replacing process in a background replacing method of the present invention are executed, respectively.

Next, image data representative of the background replaced image created in the background replacing processing (the step S106) is first transferred to the image display unit 220 (step S107). In the image display unit 220, the background replaced image is displayed on the display screen 220a in accordance with the transferred image data (step S108). On the display screen 220a, there is displayed a message inquiring of an operator of the personal computer 20 whether there is a need to correct the background replaced image now displayed on the display screen 220a (step S109). In the event that a replay to the message is indicative of a need of correction ("Yes" decision in the step S109), an image correction, which will be described later, is applied to the background replaced image (step S110). The image correction to be executed in the step S110 corresponds to an example of the image correction process in the background replacing method of the present invention.

The processing of the step S107 to the step S110 is repeated until the operator informs of no need of correction for the background replaced image displayed on the display screen 220a ("No" decision in the step S109). According to the present embodiment, this processing makes it possible to create finally natural background replaced image. Image data representative of the finally created background replaced image is transferred to at least one of the printer 30 and an output storage media of a customer's wish (step S111). In the event that the image data is transferred to the printer 30, the printer 30 prints the background replaced image in accordance with the image data (step S112).

As to details of various sorts of processing in the embodiment of the background replacing method of the present invention, of the step S104 to the step S110, they will be described in conjunction with functions of respective sections of the background replacing apparatus of the present invention.

The processing of the step S104 to the step S110 including the embodiment of the background replacing method of the present invention is executed in the personal computer 20. Hereinafter, there will be described the personal computer 20 and details of the processing to be executed in the personal computer 20.

First, there will be described an internal structure of the personal computer 20.

Figure 3:
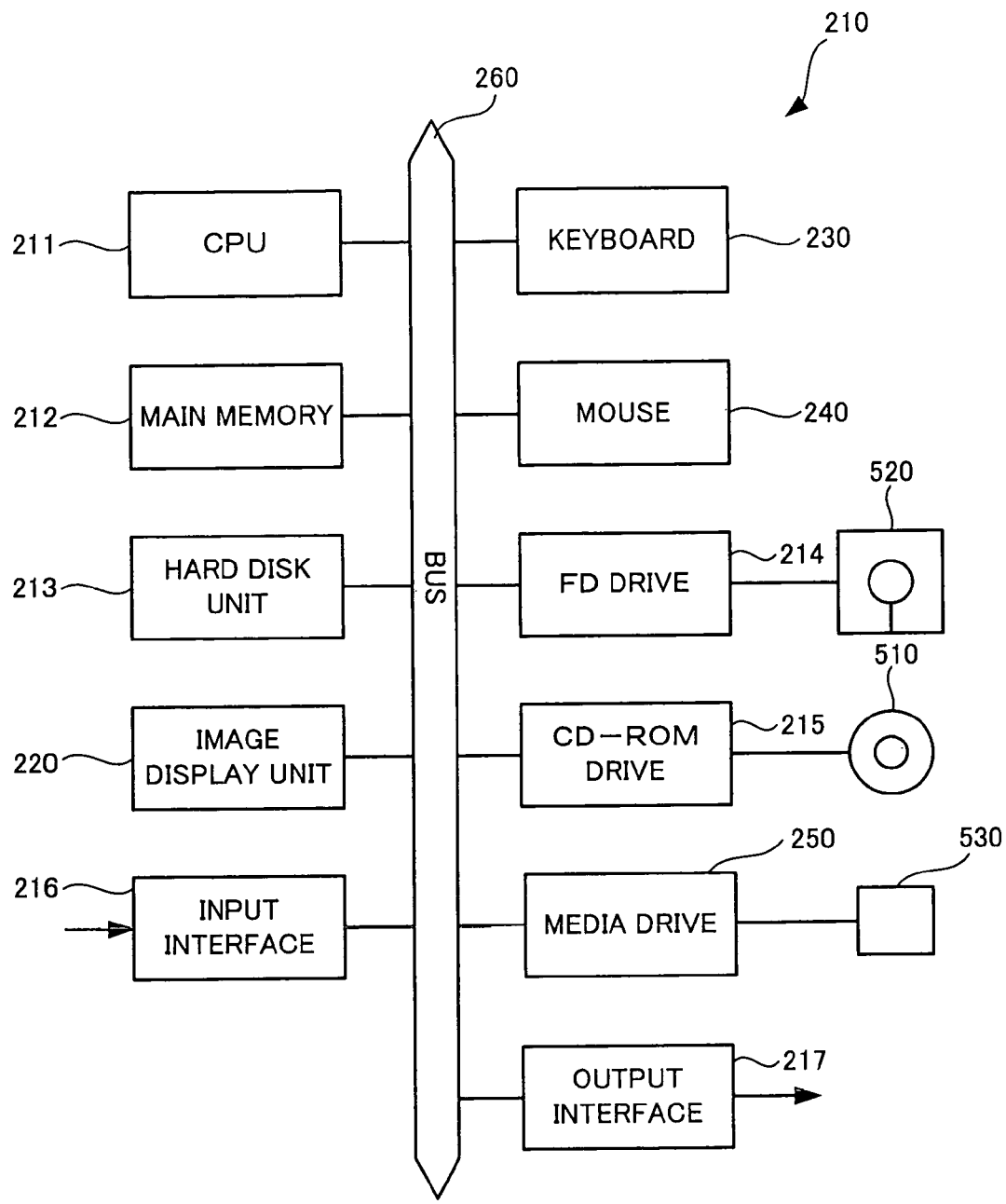
FIG. 3 is a hardware structural view of the personal computer shown in FIG. 1.

FIG. 3 is a hardware structural view of the personal computer shown in FIG. 1.

The main frame unit 210 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, a flexible disk (FD) drive 214 for accessing a flexible disk 520 mounted thereon, a CD-ROM drive 215 for accessing a CD-ROM 510 mounted thereon, an input interface 216 connected with the server 40 and the digital camera 11 shown in FIG. 1 to receive replacing backgrounds and photographic images from equipment such as the server 40 and the digital camera 11, and an output interface 217 connected with the printer 30 shown in FIG. 1 to output background replaced images. These various types of elements are connected via a bus 260 to the image display unit 220, the keyboard 230, the mouse 240, the media drive 250 for accessing a small type of storage media 530.

The CD-ROM 510 corresponds to an embodiment of a background replacing program storage medium storing a background replacing program, of the present invention, which causes the personal computer 20 to operate as an embodiment of the background replacing apparatus of the present invention.

When the CD-ROM 510 is mounted on the CD-ROM drive 215, the program stored in the CD-ROM 510 is up-loaded on the personal computer 20 so as to be stored in the hard disk unit 213. When the background replacing program installed in the hard disk unit 213 is activated, the personal computer 20 serves as the background replacing apparatus of the present invention.

Figure 4:
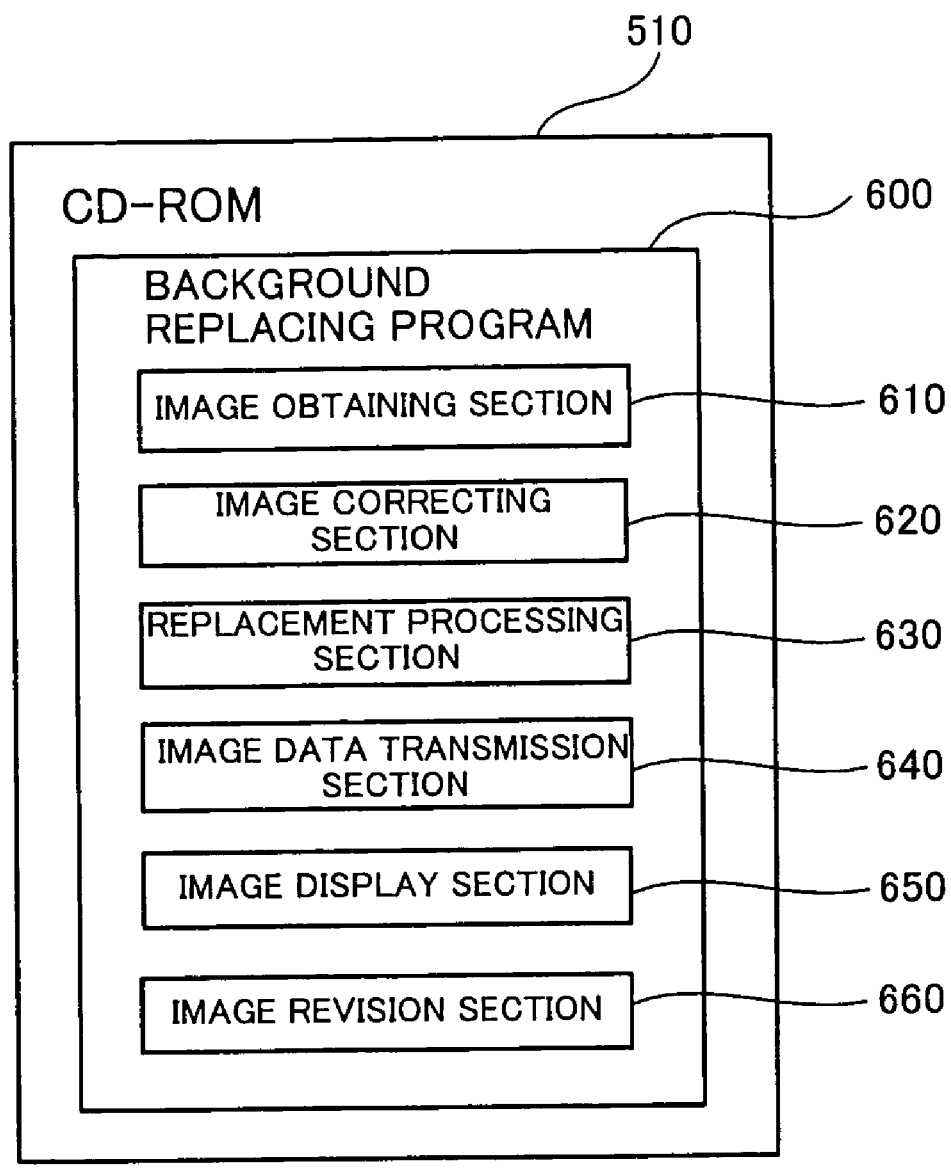
FIG. 4 is a view useful for understanding an embodiment of a background replacing program related to the present invention.

Next, there will be described an embodiment of a background replacing program related to the present invention, and an embodiment of a background replacing program storage medium storing the background replacing program, of the present invention FIG. 4 is a view useful for understanding an embodiment of a background replacing program storage medium of the present invention storing a background replacing program related to the present invention.

The CD-ROM 510 stores therein a background replacing program 600, and corresponds to an embodiment of a background replacing program storage medium of the present invention.

The background replacing program 600 comprises an image obtaining section 610, an image correcting section 620, a replacement processing section 630, an image data transmission section 640, an image display section 650, and an image revision section 660.

As to details of every element of the background replacing program 600, they will be described in conjunction with functions of respective sections of the background replacing apparatus of the present invention. In the following figures, the same reference numbers as those of FIG. 1, FIG. 3 and FIG. 4 denote the same parts.

Figure 5:
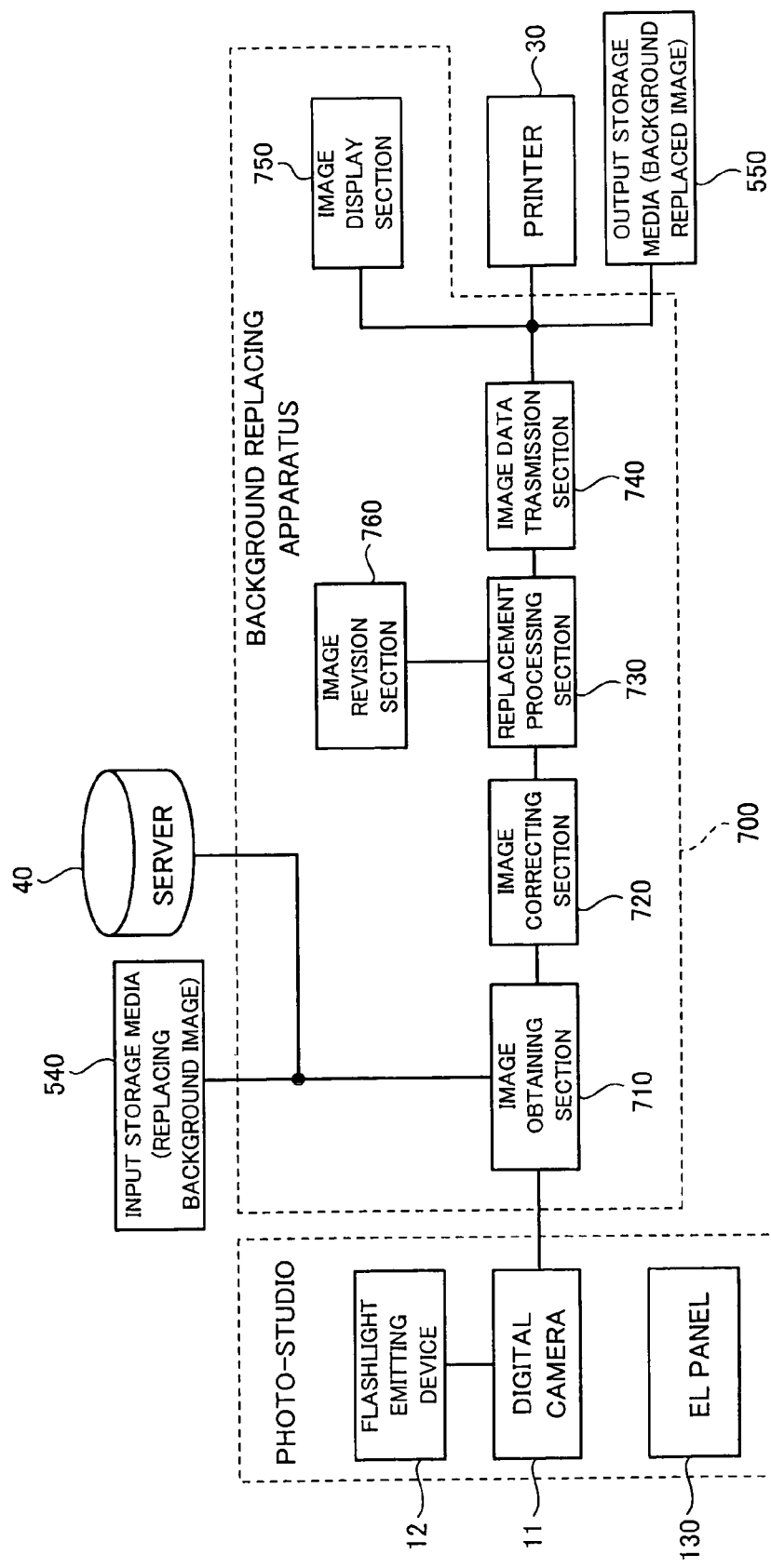
FIG. 5 is a functional block diagram of elements for operating the personal computer shown in FIG. 1 and FIG. 3 in form of an embodiment of a background replacing apparatus of the present invention, when the background replacing program shown in FIG. 4 is installed in the personal computer shown in FIG. 1 and FIG. 3.

FIG. 5 is a functional block diagram of elements for operating the personal computer shown in FIG. 1 and FIG. 3 in form of an embodiment of a background replacing apparatus of the present invention, when the background replacing program shown in FIG. 4 is installed in the personal computer shown in FIG. 1 and FIG. 3. FIG. 5 also shows: the photo-studio 10 comprising the digital camera 11, the flashlight emitting device 12, and the EL panel 130; the printer 30; and the server 40.

According to a background replacing apparatus 700 shown in FIG. 5, there is executed such background replacing processing that the digital camera 11 of the photo-studio 10 is used to obtain a follow light photographic image and a back light photographic image, which are photographed under the follow light and the back light, and a subject and a background in the follow light photographic image are distinguished from one another in accordance with the back light photographic image, so that the background is replaced by a desired background. The background replacing apparatus 700 comprises an image obtaining section 710, an image correcting section 720, a replacement processing section 730, an image data transmission section 740, an image display section 750, and an image revision section 760.

The image obtaining section 710 first receives from the digital camera 11 two photographic images, which are photographed by the digital camera 11. The image obtaining section 710 reads a background of a customer's wish from the server 40 or an input storage media 540 such as CD-ROM and small type of storage media. The image obtaining section 710 is substantially constructed in such a manner that the CPU 211 of the personal computer 20 controls the input interface 216, the FD drive 214, CD-ROM drive 215, and the media drive 250 in accordance with the image obtaining section 610 of the background replacing program 600. The image obtaining section 710 corresponds to an example of the image obtaining section of the background replacing apparatus of the present invention. The image obtaining section 710 executes an example of the image obtaining step in the background replacing method of the present invention.

The image correcting section 720 applies image correcting processing including the correction for the trapezoidal distortion, which will be described later, to the two photographic images received by the image obtaining section 710. The image correcting section 720 is substantially constructed in such a manner that the CPU 211 of the personal computer 20 operates in accordance with the image correcting section 620 of the background replacing program 600. As to details of the image correcting section 720, it will be described later in conjunction with details of the image correcting processing with reference to other figures.

The replacement processing section 730 performs a background replacement processing in such a manner that a background replaced image is created in accordance with the two photographic images subjected to the image correcting processing by the image correcting section 720. The replacement processing section 730 is substantially constructed in such a manner that the CPU 211 of the personal computer 20 operates in accordance with the replacement processing section 630 of the background replacing program 600. As to details of the replacement processing section 730, it will be described later in conjunction with details of the replacement processing with reference to other figures. The replacement processing section 730 corresponds to an example of one serving both as the area discriminating section and the background replacing section of the background replacing apparatus of the present invention.

The image data transmission section 740 transmits image data representative of the background replaced image created by the replacement processing section 730 to at least one of the printer 30 and an output storage media 550 of a customer's wish, and an image display section 750 of the background replacing apparatus 700. The image data transmission section 740 is substantially constructed in such a manner that the CPU 211 of the personal computer 20 controls the output interface 217, the FD drive 214, CD-ROM drive 215, and the media drive 250 in accordance with the image data transmission section 640 of the background replacing program 600.

The image display section 750 displays on the display screen 220a the background replaced image based on the image data transferred from the image data transmission section 740. The image display section 750 is substantially constructed in such a manner that the CPU 211 of the personal computer 20 controls the image display unit 220 in accordance with the image display section 650 of the background replacing program 600.

The image revision section 760 applies an image revision according to an operator's instruction, which will be described later, to the background replaced image displayed on the display screen 220a of the image display section 750. The image revision section 760 is substantially constructed in such a manner that the CPU 211 of the personal computer 20 operates in accordance with the image revision section 660 of the background replacing program 600. As to details of the image revision section 760, it will be described later with reference to other figures. The image revision section 760 corresponds to an example of the image revision section of the background replacing apparatus of the present invention. The image revision section 760 executes an example of the image revision step in the background replacing method of the present invention.

In the event that the printer 30 receives from the image data transmission section 740 the image data representative of the background replaced image that is finally completed, the printer 30 prints the background replaced image based on the image data. In the event that the output storage media 550 receives from the image data transmission section 740 the image data representative of the background replaced image, the image data is written into the output storage media 550. As a result, both the print sheet on which the background replaced image is printed and the output storage media 550 into which the image data representative of the background replaced image is written, or either one are provided in accordance with a customer's wish.

Next, hereinafter, there will be described details of the image correcting section 720 and the replacement processing section 730 shown in FIG. 5.

First, there will be described the image correcting section 720.

Figure 6:
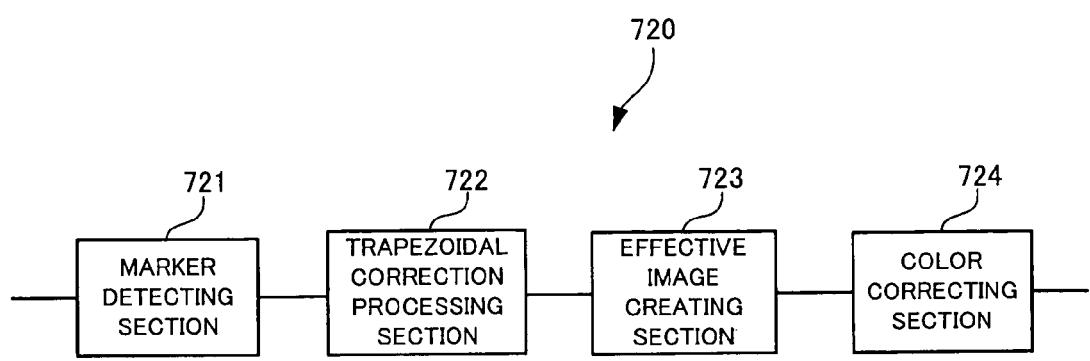
FIG. 6 is an explanatory view useful for understanding details of the image correcting section shown in FIG. 5.

FIG. 6 is an explanatory view useful for understanding details of the image correcting section shown in FIG. 5. In the following figures, the same reference numbers as those of FIG. 5 denotes the same parts.

The image correcting section 720 shown in FIG. 6 applies image correcting processing including the correction for the trapezoidal distortion to the follow light photographic image and the back light photographic image, which are received by the image obtaining section 710. The image correcting section 720 comprises a marker detection section 721, a trapezoidal correction processing section 722, an effective image creating section 723, and a color correcting section 724.

Hereinafter, there will be described functions of every element of the image correcting section 720 with reference to the follow light photographic image involving the trapezoidal distortion by way of example.

Figure 7:
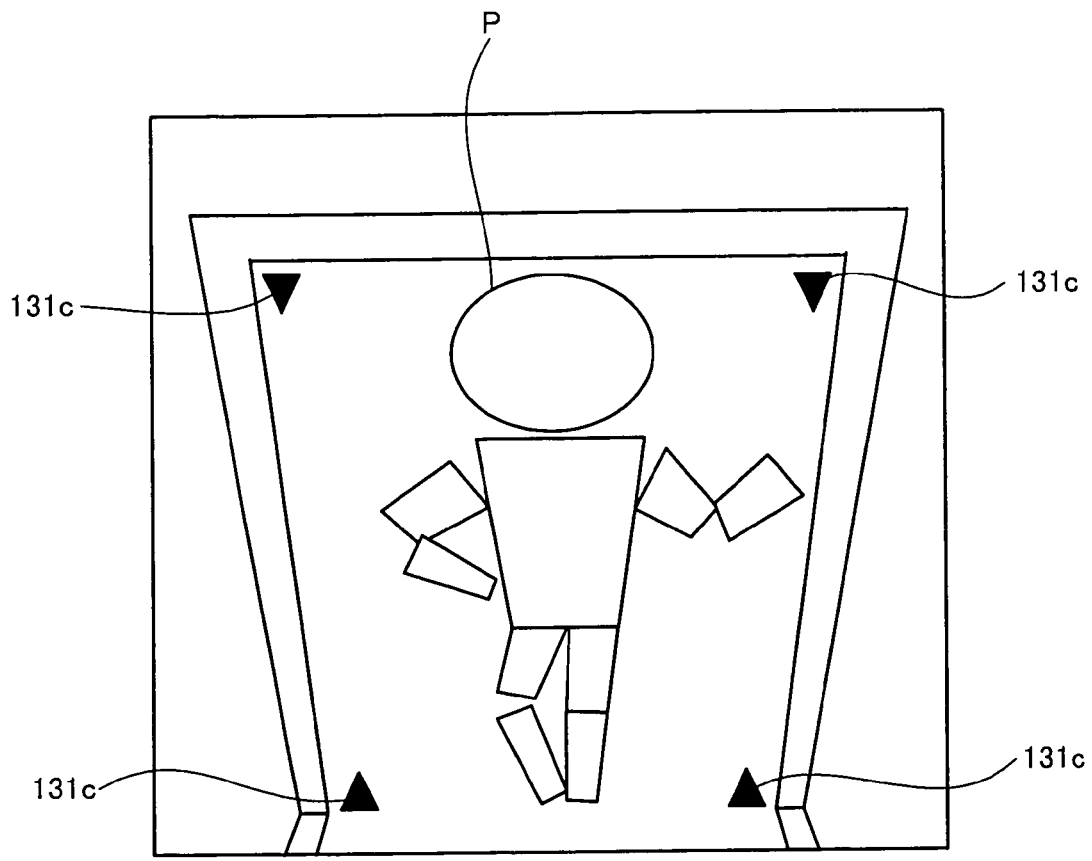
FIG. 7 is a typical illustration showing an example of a follow light photographic image involving a trapezoidal distortion.

FIG. 7 is a typical illustration showing an example of a follow light photographic image involving a trapezoidal distortion.

FIG. 7 typically shows a photographic image involving a trapezoidal distortion in which a width of an image is narrower as going down.

First, the marker detection section 721 detects four makers 131c appearing on the photographic image. Essentially, coupling of those four makers 131c ought to form a rectangle. However, according to the example of FIG. 7, coupling of those four makers 131c forms a trapezoid owing to the trapezoidal distortion.

The trapezoidal correction processing section 722 corrects a trapezoidal distortion in such a manner that a suitable deformation is applied to a photographic image in its entirety so that a figure, which is formed through coupling of the four makers 131c detected by the marker detection section 721, offers the essential rectangle.

Figure 8:
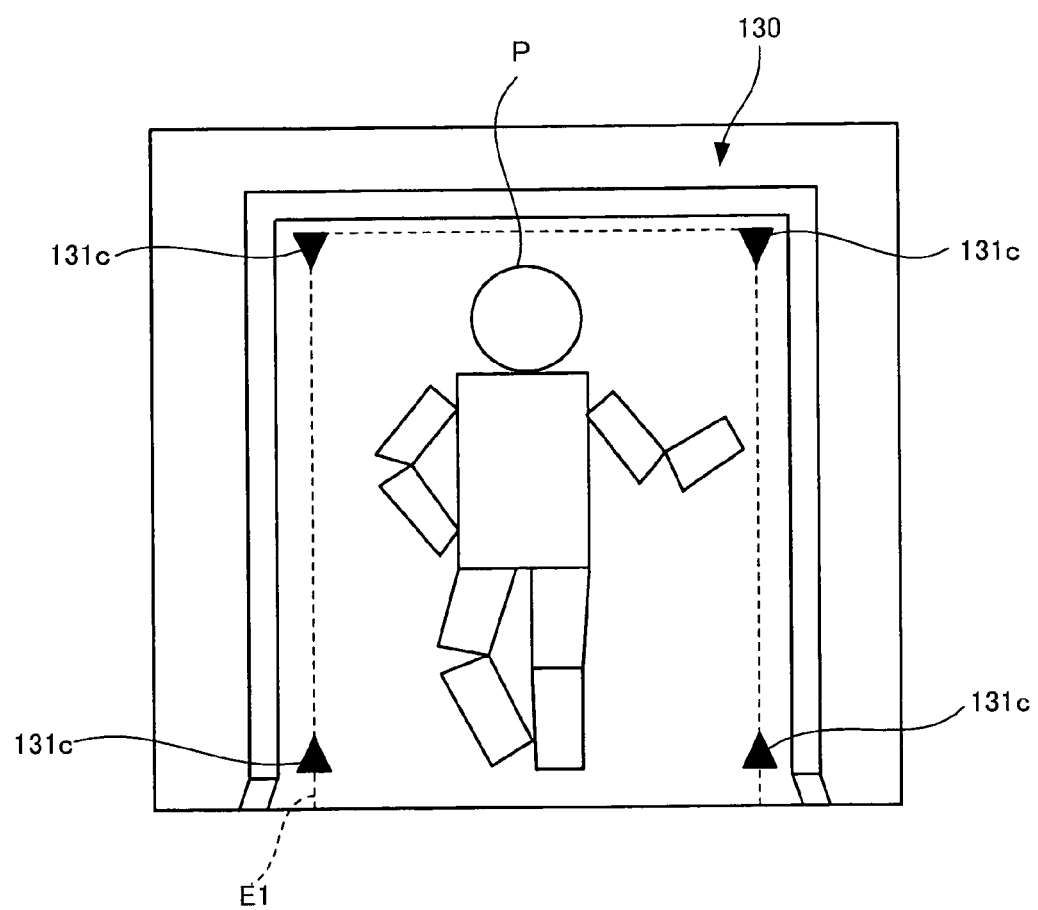
FIG. 8 is a typical illustration showing a state that the trapezoidal distortion of the follow light photographic image of FIG. 7 is corrected.

FIG. 8 is a typical illustration showing a state that the trapezoidal distortion of the follow light photographic image of FIG. 7 is corrected.

As the photographic image to be subjected to the background replacing processing, from the point of view that a distinction between the subject and the background can be easily made, it is preferable that the background is concerned with only the luminescent plane of the EL panel 130. However, according to the present embodiment, it is intended to contribute to saving space, and thus there is a limit in size of the EL panel 130. Accordingly, as seen in FIG. 7 and FIG. 8, there appears on the photographic image the unnecessary part other than the luminescent plane of the EL panel 130.

The effective image creating section 723 creates an effective image wherein an image outside of an effective limit E1, which is defined four makers 131c, is deleted from the photographic image that is subjected to the correction processing by the trapezoidal correction processing section 722.

Figure 9:
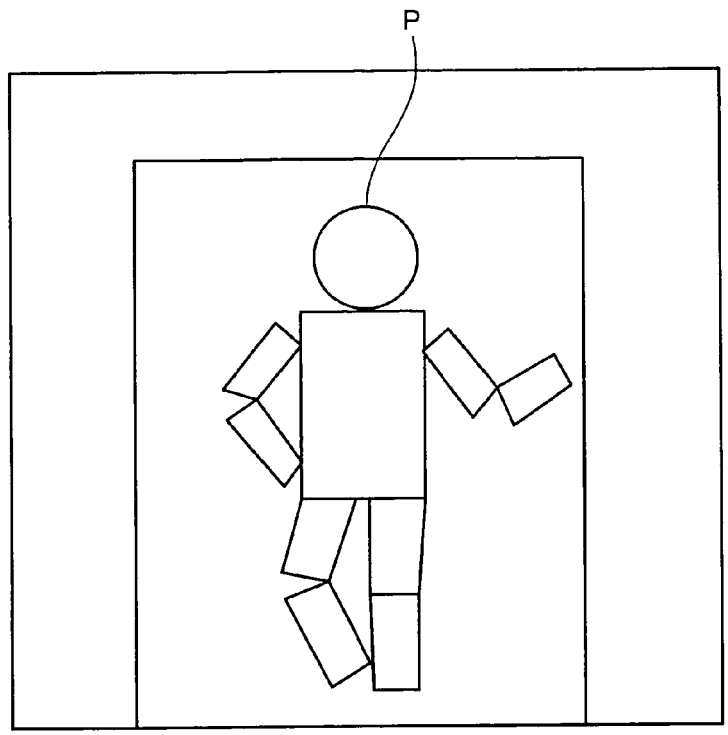
FIG. 9 is a typical illustration showing an effective image that is created in accordance with the follow light photographic image corrected in the trapezoidal distortion, shown in FIG. 8.

FIG. 9 is a typical illustration showing an effective image that is created in accordance with the follow light photographic image corrected in the trapezoidal distortion, shown in FIG. 8.

After the effective image creating section 723 creates an effective image wherein as shown in FIG. 9, the background of the subject P is concerned with only the luminescent plane of the EL panel 130, the color correcting section 724 applies to the effective image the color correcting processing, for example, a red eye correction for person's eyes, and a correction of color shade of the whole image into a preferable color shade.

The above description is concerned with the explanation as to the image correcting processing of the image correcting section 720 with reference to the follow light photographic image of FIG. 7 to FIG. 9. According to the present embodiment, the completely same processing as the image correcting processing, which is applied to the follow light photographic image, is applied also to the back light photographic image that is obtained together the follow light photographic image. However, in the back light photographic image, the subject appears with the complete black. Accordingly, the color correcting section 724 omits the processing for the back light photographic image.

Figure 10:
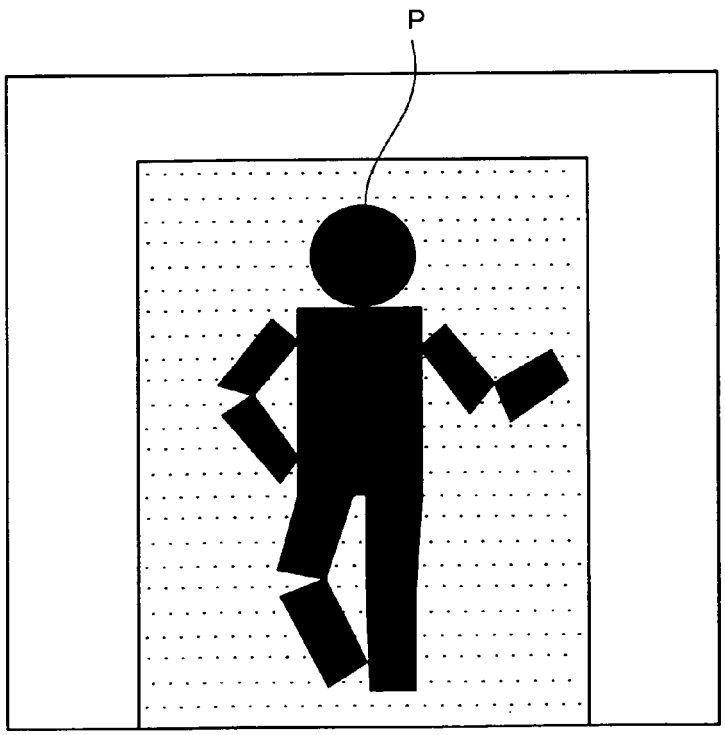
FIG. 10 is a typical illustration showing a corrected back light photographic image, which is subjected to image correction processing by the image correcting section of FIG. 6.

FIG. 10 is a typical illustration showing a corrected back light photographic image, which is subjected to image correction processing by the image correcting section of FIG. 6.

As seen from FIG. 10, there is obtained the corrected back light photographic image, in which an area of the subject P is biased to the shadow side and an area of the EL panel 130 as the background is biased to the highlight side. According to the follow light photographic image of FIG. 7 to FIG. 9, luminance of the light emission of the EL panel 130 is lower than luminance of the flashlight emitted from the flashlight emitting device 12. Therefore, while the luminescent plane of the EL panel 130 is photographed more whitish than the actual luminescent color, the back light photographic image of FIG. 10 is photographed with indigo blue that is the actual luminescent color of the EL panel 130.

Thus, according to the corrected back light photographic image of FIG. 10, the area of the subject P is quite different in brightness from the area of the background. Therefore, it is possible to readily discriminate between the subject P and the background. Further, according to the corrected back light photographic image, the position and the outline of the subject P in the image is substantially same as those in the corrected follow light photographic image. Hence, according to the present embodiment, the replacement processing section 730 of FIG. 5 distinguishes between the subject P and the background of the corrected back light photographic image, and the distinction is applied to the corrected follow light photographic image as it is. This feature makes it possible to distinguish between the subject P and the background of the corrected follow light photographic image. Further, the replacement processing section 730 replaces the background of the follow light photographic image by the background of a customer's wish to create a background replaced image.

Next, as to details of the replacement processing section 730, there will be described the background replacement processing from the discrimination between the subject and the background in the corrected back light photographic image up to the creation of the background replaced image.

As examples of the corrected follow light photographic image and corrected back light photographic image, the following images will be referred to.

Figure 11:
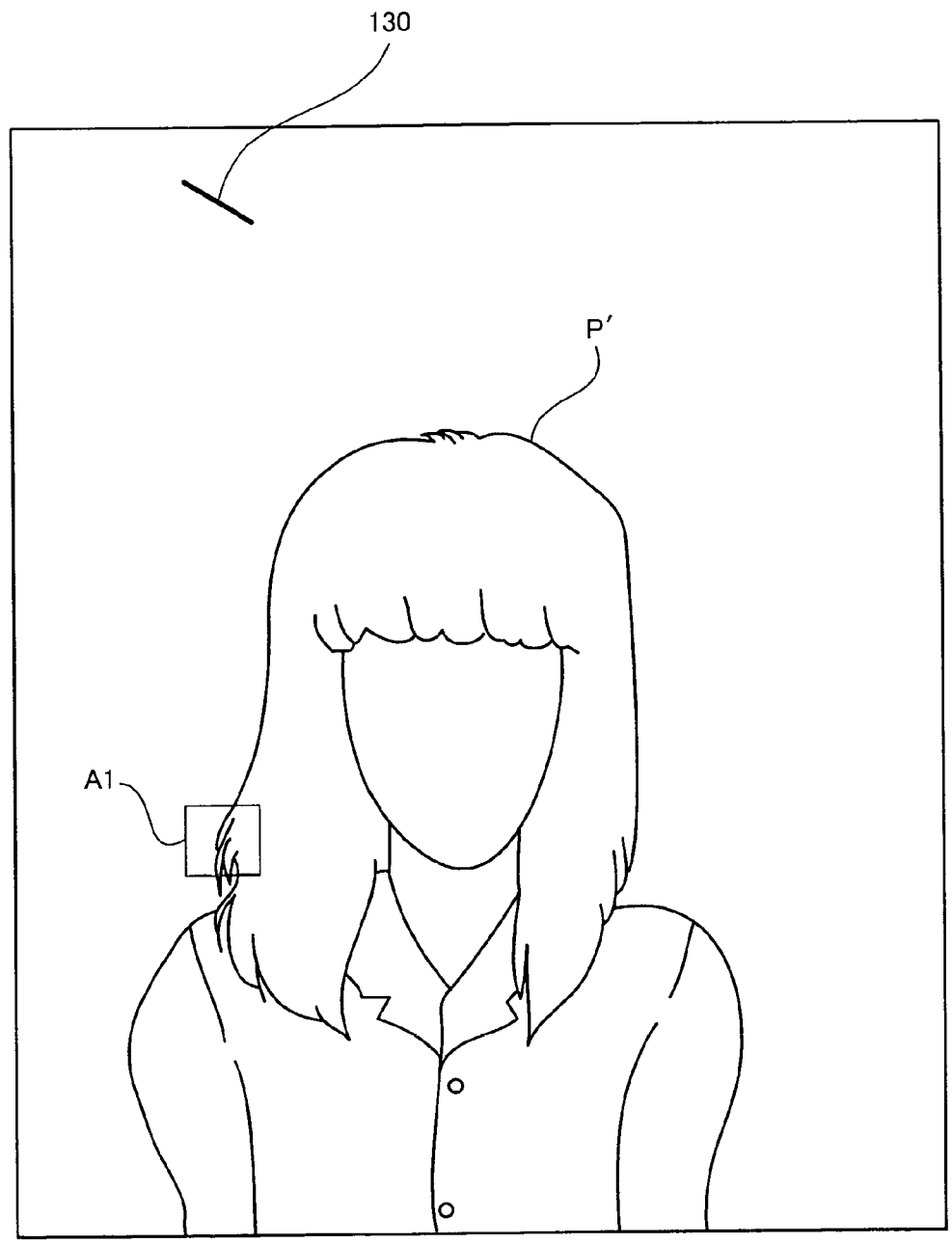
FIG. 11 is an illustration showing an example of the corrected follow light photographic image.
Figure 12:
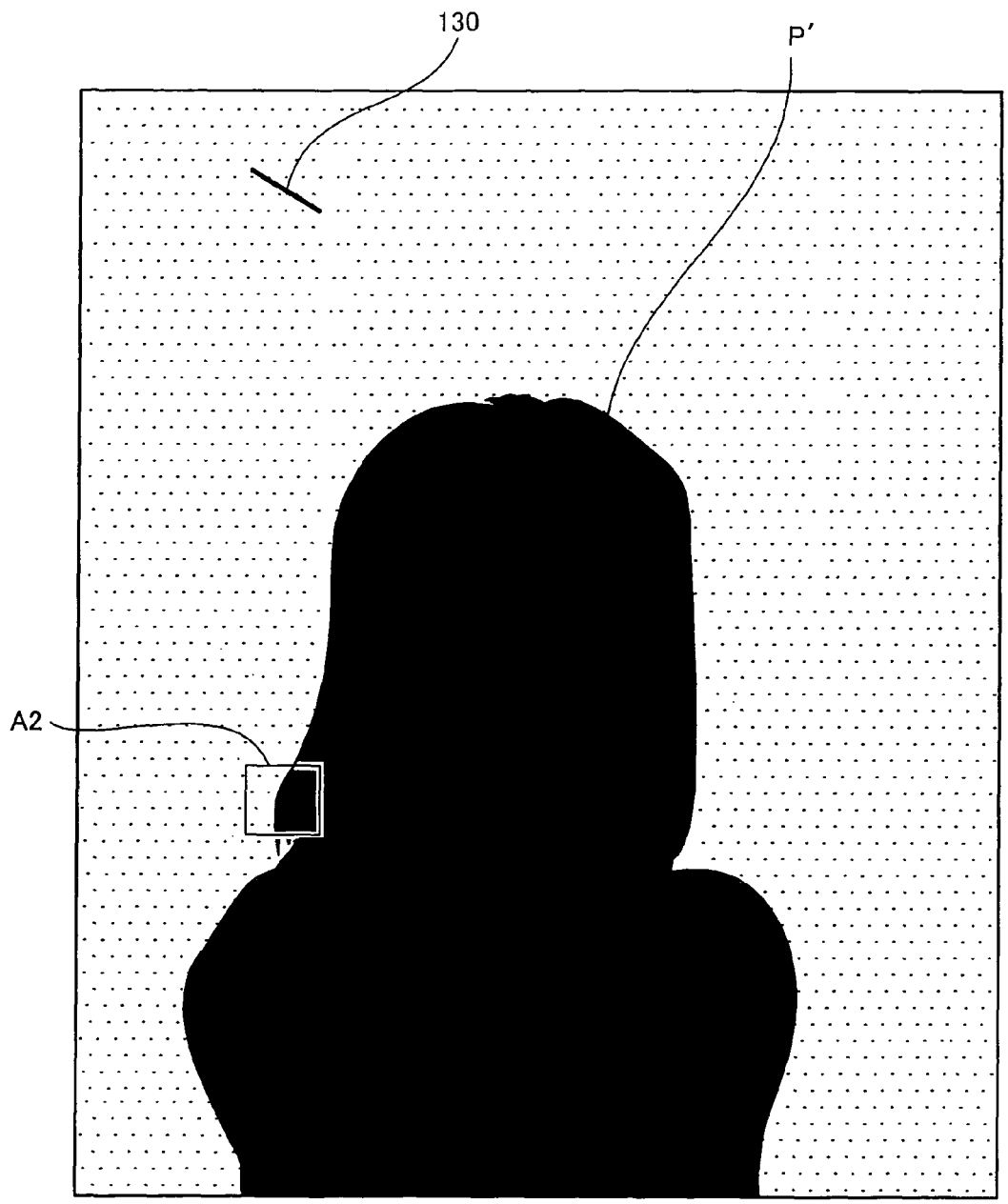
FIG. 12 is an illustration showing an example of the corrected back light photographic image.

FIG. 11 is an illustration showing an example of the corrected follow light photographic image. FIG. 12 is an illustration showing an example of the corrected back light photographic image.

FIG. 11 and FIG. 12 each show portraiture of a subject P'. The photographic image shown in FIG. 12 is one, which is photographed through the backlight. Thus, the area of the subject P' is biased to the shadow side, and the area of the EL panel 130 as the background is biased to the highlight side. Here, states of boundary periphery between the subject P' and the background will be shown with different figures with respect to an area A1 of FIG. 11 and an area A2 of FIG. 12 corresponding to the area A1 of FIG. 11.

Figure 13:
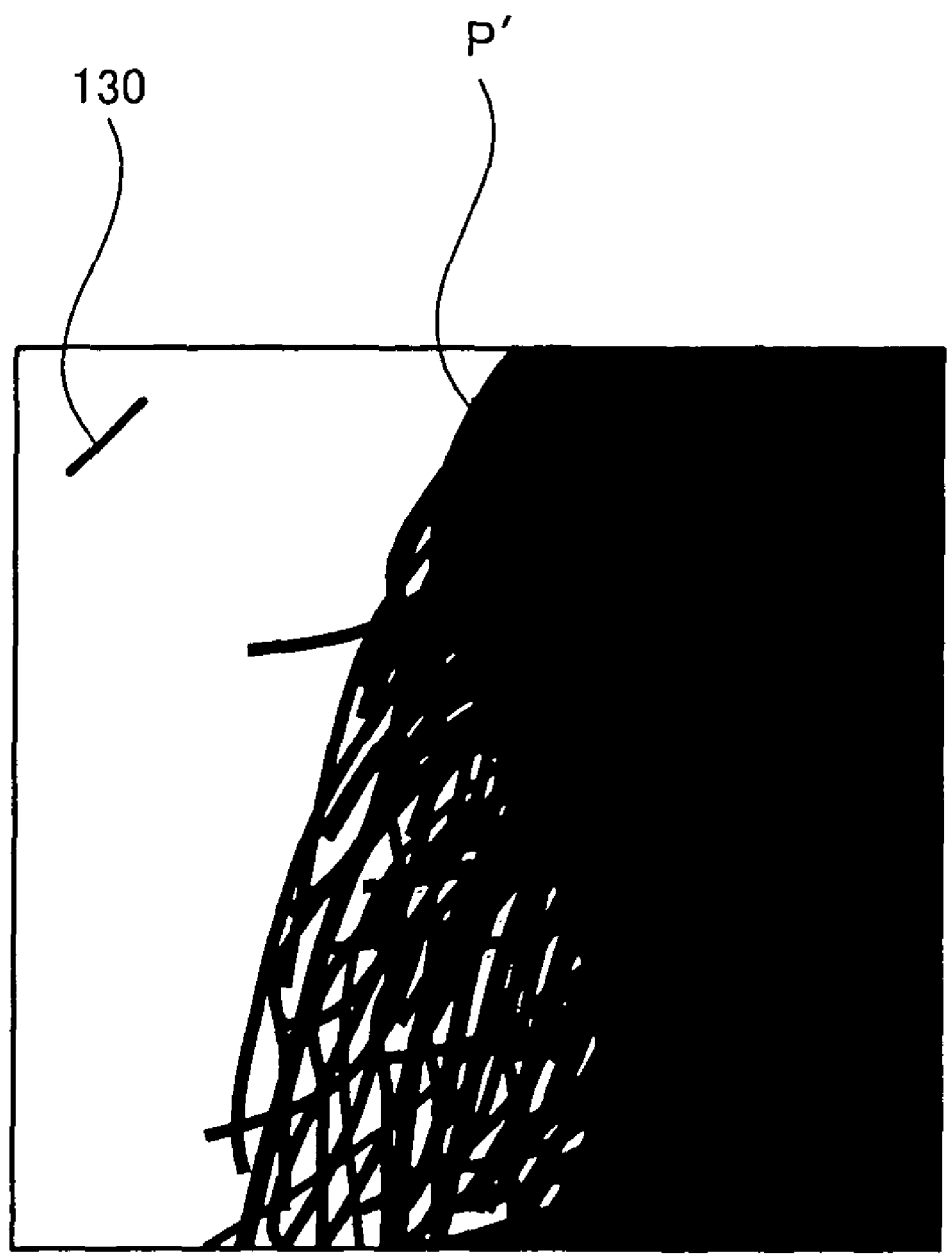
FIG. 13 is an enlarged view of the area A1 shown in FIG. 11.
Figure 14:
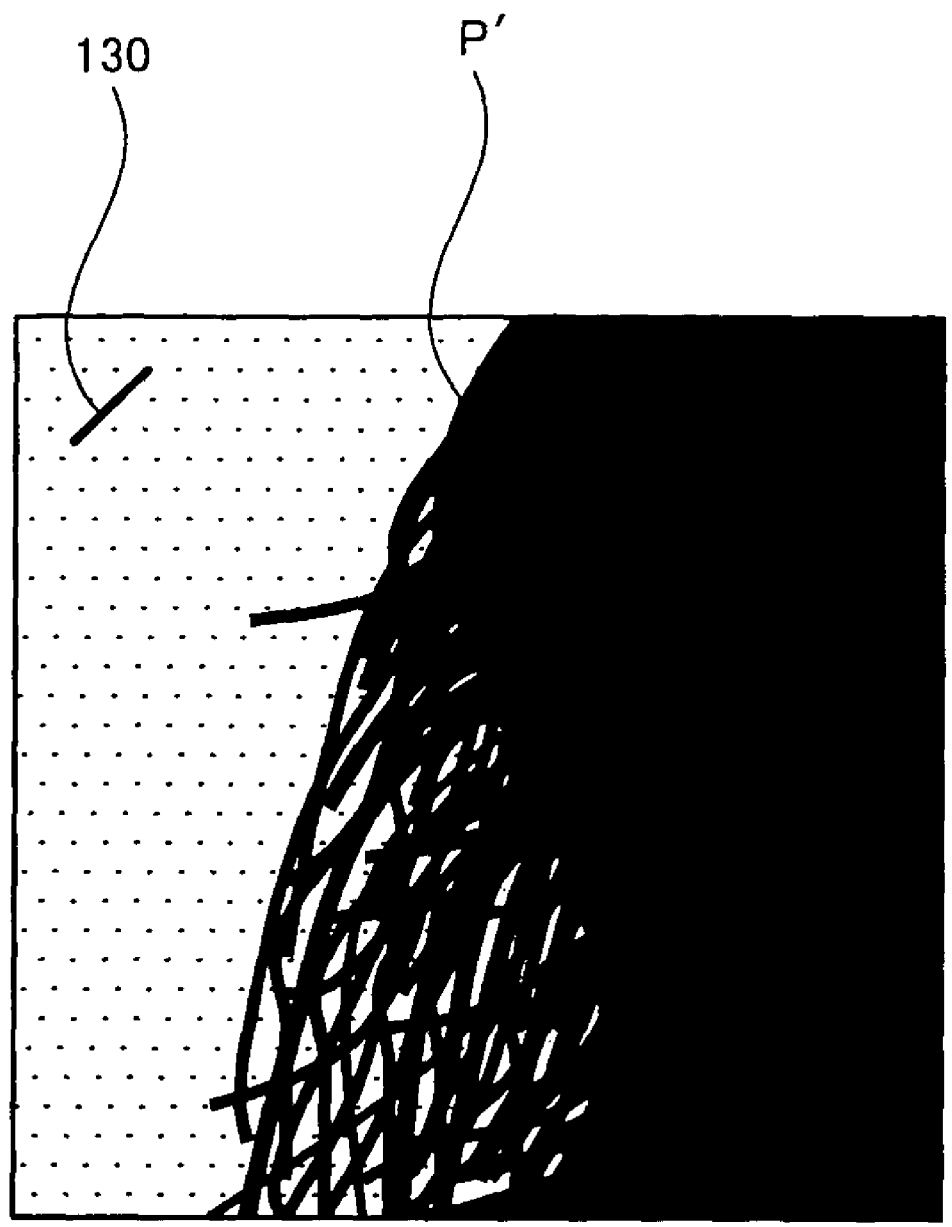
FIG. 14 is an enlarged view of the area A1 shown in FIG. 12.

FIG. 13 is an enlarged view of the area A1 shown in FIG. 11. FIG. 14 is an enlarged view of the area A1 shown in FIG. 12.

FIG. 13 and FIG. 14 show states that the EL panel 130 is seen through hair of the subject P'. Generally, it is often seen in a photographic image that there is a portion that a background appears through a part of the subject. Such a portion exists, as shown in the examples of FIG. 11 to FIG. 14, at the boundary periphery between the subject and the background of the photographic image.

For the sake of convenience, FIG. 13 and FIG. 14 each show an ideal state that a hair of a person is visible up to one. According to the actual photographic image, however, in view of a restriction of resolution, a pixel constituting an image is larger than the minute subject such as a piece of hair. Hence, for example, an image of a portion that the EL panel 130 is seen through hair of the subject, as shown in FIG. 13 and FIG. 14, is constructed by a combination of pixels having a combination color in which a color of the minute subject such as hair is combined with a color of a background that is seen through the minute subject. Therefore, on such a portion, it is impossible to simply perform a distinction between the subject and the background.

In order to replace the background of the corrected follow light photographic image, as shown in FIG. 11 for instance, with a background as a client wish, the replacement processing section 730 of FIG. 5 first discriminates the corrected follow light photographic image among a subject area, a background area, and a boundary area interposed between the subject area and the background area. The replacement processing section 730 retains the subject area of the corrected follow light photographic image, and replaces the background area by another background of a customer's wish.

At that time, a portion that a background appears through a part of the subject as shown in FIG. 13, that is, a portion constituted of pixels having a combination color in which a color of the minute subject and a color of the background are combined, can not be simply discriminated between the subject and the background, and thus the replacement processing section 730 discriminates that portion as the boundary area.

The replacement processing section 730 presumes, on the assumption that the whole pixels of the boundary area of the corrected follow light photographic image have the combination color as mentioned above, the subject color that is the base of a combination of colors of the pixels, and the background color, and in addition presumes the combination ratio of the subject color and the background color. It is noted that the actual boundary area includes pixels having only the background color and pixels having only the subject color as well as the pixels having the combination color. In the event that pixels of the processing object are the pixels having only the background color, the replacement processing section 730 presumes a combination ratio in which a ratio of the subject color to the colors of the pixels takes "0". In the event that pixels of the processing object are the pixels having only the subject color, the replacement processing section 730 presumes a combination ratio in which a ratio of the subject color to the colors of the pixels takes "1".

Thus, the replacement processing section 730 replaces the colors of the pixels of the boundary area by a combination color in which the presumed subject color is combined with the different background color of the customer's wish at the presumed combination ratio. According to this processing, the colors of the pixels having only the background color in the boundary area is replaced with the different background color, and the colors of the pixels having only the subject color is retained as it is, and the colors of the portion, in which the background appears through a part of the subject, is replaced by the combination color. As a result of the processing, even if the boundary area includes the portion that the background appears through a part of the subject, it is possible to create a natural background replaced image in which a different background of a customer's wish appears through a part of the subject.

Hereinafter, there will be described details of the replacement processing section 730.

Figure 15:
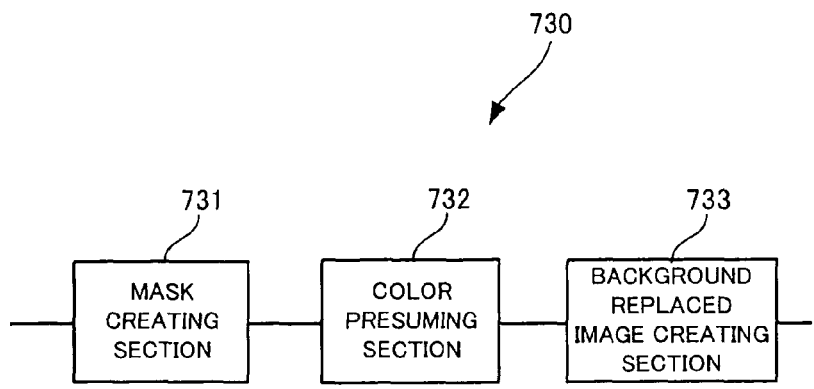
FIG. 15 is an explanatory view useful for understanding details of the replacement processing section shown in FIG. 5.

FIG. 15 is an explanatory view useful for understanding details of the replacement processing section shown in FIG. 5. In the following figures, the same reference numbers as those of FIG. 5 denotes the same parts.

The replacement processing section 730 executes the above-mentioned background replacement processing. The replacement processing section 730 comprises a mask creating section 731, a color presuming section 732, and a background replaced image creating section 733. The mask creating section 731 corresponds to an example of the area discriminating section of the background replacing apparatus of the present invention. A combination of the color presuming section 732 and the background replaced image creating section 733 corresponds to an example of the background replacing section of the background replacing apparatus of the present invention. The mask creating section 731 executes an example of the area discriminating step of the background replacing method of the present invention. A combination of the color presuming section 732 and the background replaced image creating section 733 executes an example of the background replacing step of the background replacing method of the present invention.

First, there will be explained outlines of those structural elements.

The mask creating section 731 creates, as to the corrected back light photographic image, a subject mask that defines a range in which only pixels of the subject color exist, and a background mask that defines a range in which only pixels of the background color exist. Those two masks are created with a gap in such a way that the pixels of the portion that the background appears through the subject, as shown in FIG. 14 for instance, are excluded from the ranges defined by those masks.

The color presuming section 732 applies the subject mask and the background mask, which are created by the mask creating section 731, to the corrected follow light photographic image, and first, in the follow light photographic image, recognizes the gap provided between those two masks, that is, the boundary area. The color presuming section 732 presumes, on the assumption that the colors of the whole pixels in the boundary area are the mixed color of the subject color and background color, the subject color that constitutes colors of the pixels, and the background color, and in addition presumes the combination ratio of the subject color and the background color.

The background replaced image creating section 733 retains, first, as to the corrected follow light photographic image, the area defined by the subject mask, and replaces the area defined by the background mask with another background of a customer's wish. Next, the background replaced image creating section 733 determines, as to each pixel of the boundary area, a combination color through a combination of the color of the background of a customer's wish and the subject color presumed in the color presuming section 732 at the combination ratio presumed in the color presuming section 732, and replaces the color of the respective pixel. This feature makes it possible to create a background replaced image in which the background of the corrected follow light photographic image is naturally replaced with another background of a customer's wish.

The image data transmission section 740 of FIG. 5 transmits image data representative of the background replaced image thus created to output devices and the output storage media 550 of FIG. 5.

Next, there will be explained details of the respective structural elements.

First, there will be explained details of the mask creating section 731.

Figure 16:
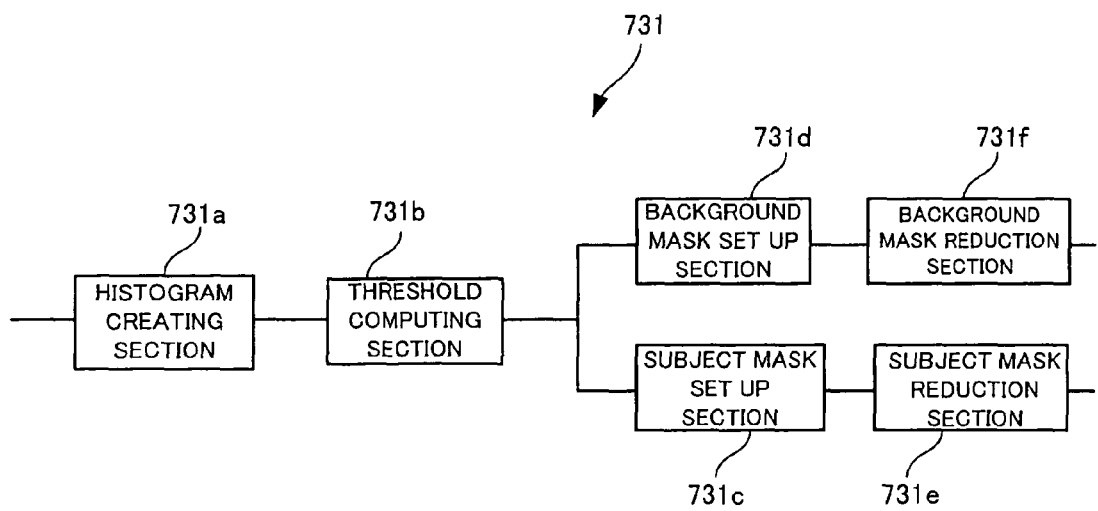
FIG. 16 is an explanatory view useful for understanding details of the mask creating section shown in FIG. 15.

FIG. 16 is an explanatory view useful for understanding details of the mask creating section shown in FIG. 15.

The mask creating section 731 comprises a histogram creating section 731a, a threshold computing section 731b, a subject mask set up section 731c, a background mask set up section 731d, a subject mask reduction section 731e, and a background mask reduction section 731f.

The histogram creating section 731a creates histograms as to luminous intensity of pixels constituting the corrected back light photographic image.

Figure 17:
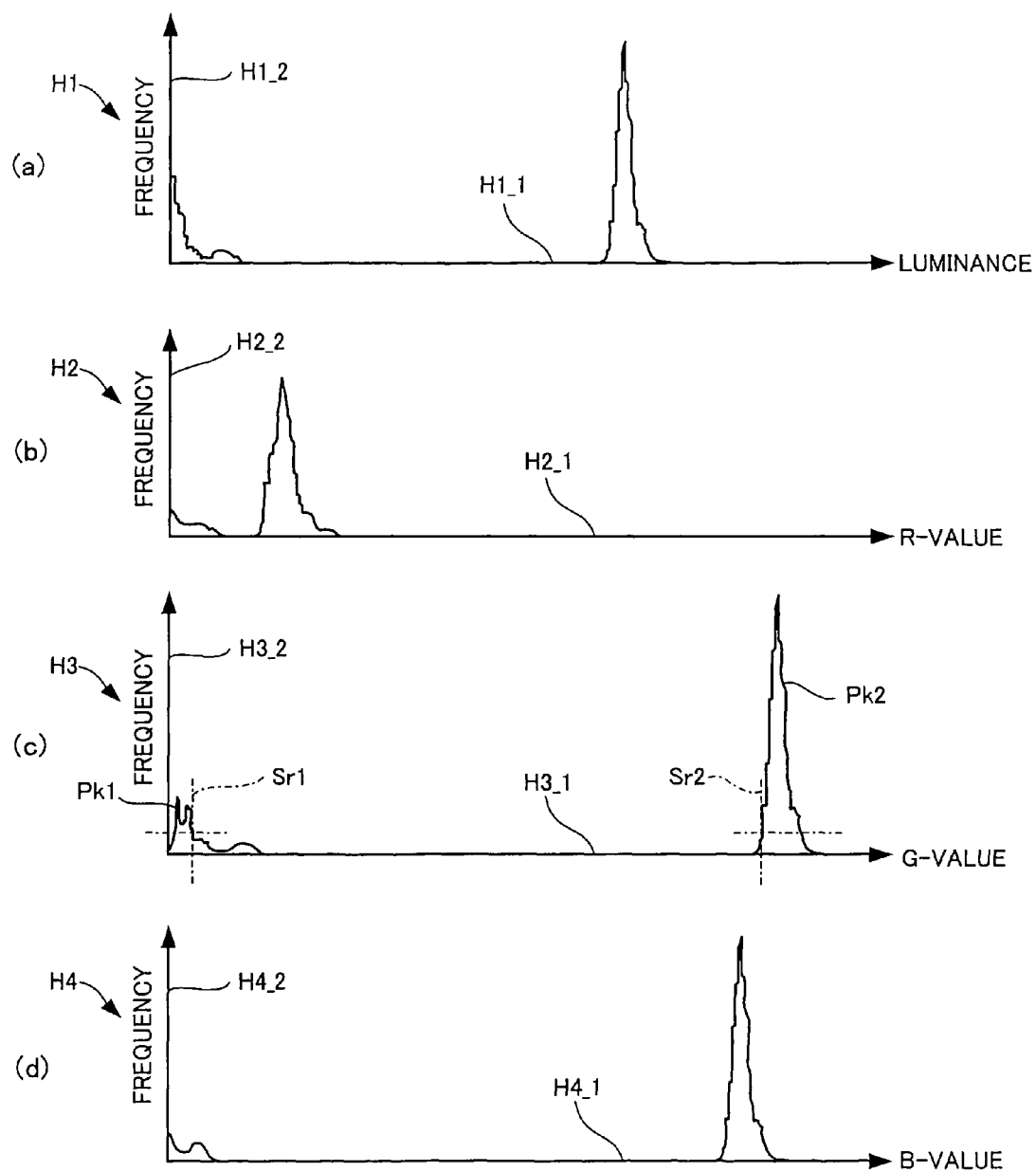
FIG. 17 is a view showing various examples of histograms as to luminous intensity of pixels constituting the corrected back light photographic image.

FIG. 17 is a view showing various examples of histograms as to luminous intensity of pixels constituting the corrected back light photographic image.

A part (a) of FIG. 17 shows a luminance histogram H1 in which luminance of pixels constituting the back light photographic image is divided into a large number of luminance ranges, and the number of pixels, which is divided into the associated luminance range, is expressed by frequency. In the luminance histogram H1, the horizontal axis H1_1 denotes luminance, and the vertical axis H1_2 denotes frequency.

According to the present embodiment, as to the follow light photographic image and the back light photographic image, colors of the pixels are expressed by coordinates on an RGB color space defining colors with three colors of R (red), G (green), and B (blue), that is, R-value, G-value, and B-value in the RGB color space. The R-value, the G-value, and the B-value, which are representative of colors of the pixels, reflect luminous intensity of their associated pixel. Thus, it is possible to create a histogram as to luminous intensity of the pixels constituting the back light photographic image using anyone of the R-value, the G-value, and the B-value.

A part (b) of FIG. 17 shows an R-value histogram H2 in which R-values of pixels constituting the back light photographic image are divided into a large number of ranges of R-values, and the number of pixels, which is divided into the associated range, is expressed by frequency. A part (c) of FIG. 17 shows a G-value histogram H3 in which G-values of pixels constituting the back light photographic image are divided into a large number of ranges of G-values, and the number of pixels, which is divided into the associated range, is expressed by frequency. A part (d) of FIG. 17 shows a B-value histogram H4 in which B-values of pixels constituting the back light photographic image are divided into a large number of ranges of B-values, and the number of pixels, which is divided into the associated range, is expressed by frequency. In the R-value histogram H2, the horizontal axis H2_1 denotes R-value, and the vertical axis H2_2 denotes frequency. In the G-value histogram H3, the horizontal axis H3_1 denotes G-value, and the vertical axis H3_2 denotes frequency. In the B-value histogram H4, the horizontal axis H4_1 denotes B-value, and the vertical axis H4_2 denotes frequency.

According to the present embodiment, with respect to the back light photographic image, the background of the subject appears with indigo blue that is the luminescent color of the EL panel 130. Thus, the G-value, of the R-value, the G-value and the B-value, most effectively reflects the luminous intensity of the pixels of the back light photographic image. Accordingly, the histogram creating section 731a of FIG. 16 is constructed so as to create the G-value histogram H3, which is shown in the part (c) of FIG. 17, of four histograms shown in FIG. 17.

In the G-value histogram H3, in a similar fashion to other three histograms, there appear two peaks Pk1 and Pk2 at the shadow side and the highlight side, respectively. The peak Pk1 of the shadow side appears through the division of the pixels of the subject area in the corrected back light photographic image. The peak Pk2 of the highlight side appears through the division of the pixels of the background area in the corrected back light photographic image.

The threshold computing section 731b shown in FIG. 16 computes two thresholds, as set forth below, in accordance with the two peaks Pk1 and Pk2 in the G-value histogram H3 created by the histogram creating section 731a of FIG. 16, respectively. As shown in the part (c) of FIG. 17, there is computed from the peak Pk1 of the shadow side a first threshold Sr1, which is the upper limit of the G-value where the frequency offers a predetermined value or more on the peak Pk1. And there is computed from the peak Pk2 of the highlight side a second threshold Sr2, which is the lower limit of the G-value where the frequency offers a predetermined value or more on the peak Pk2.

The subject mask set up section 731c shown in FIG. 16 sets up as an initial subject mask an area consisting of pixels where the G-value offers the first threshold Sr1 or less, of a plurality of pixels constituting the corrected back light photographic image. The background mask set up section 731d sets up as an initial background mask an area consisting of pixels where the G-value offers the second threshold Sr2 or more.

Thus, according to the present embodiment, there are set up two types of masks in accordance with two peaks Pk1 and Pk2 in the G-value histogram H3 created in histogram creating section 731a, respectively. In order to set up the two types of masks with great accuracy, it is desired that the two peaks Pk1 and Pk2 are sharp as much as possible. However, different from the present embodiment, for example, in a state that a photo studio is illuminated with a steady illumination, it may happen that a back light photographic image becomes a light image in its entirety. This brings about a possibility that it is difficult to obtain two sharp peaks in the G-value histogram.

Hereinafter, there will be explained a histogram capable of obtaining two sharp peaks in the light photo studio too, which is different from the histogram created in accordance with the present embodiment.

Figure 18:
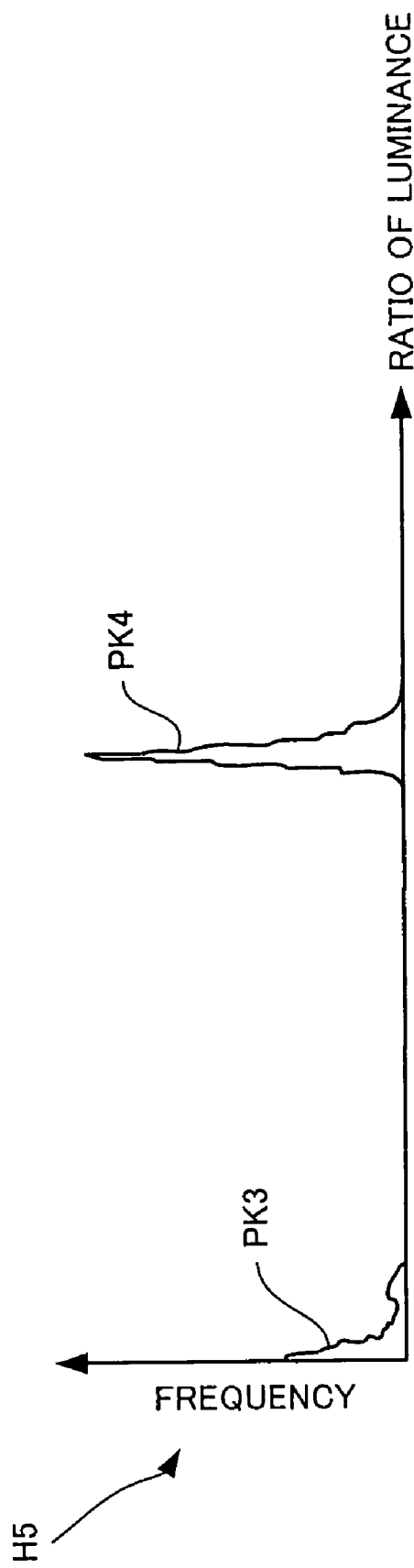
FIG. 18 is a view showing an example of a histogram different from the example of the histogram shown in FIG. 17.

FIG. 18 is a view showing an example of a histogram different from the example of the histogram shown in FIG. 17.

A histogram H5 shown in FIG. 18 is created using both the corrected follow light photographic image and the corrected back light photographic image, different from the example of the histogram shown in FIG. 17, in the manner as set forth below.

First, on all sets of pixels of the associated positions between those two corrected photographic images, there are computed ratios of luminance among sets of pixels. Next, the computed ratios of luminance among sets of pixels are divided into a large number of ranges. Thus, the histogram H5 is created in such a way that the number of divided sets on the individual range is expressed by frequency. In the histogram H5, a horizontal axis H5_1 denotes a ratio of luminance and a vertical axis H5_2 denotes frequency. The ratios of luminance among sets of pixels correspond to an example of "ratios of brightness among a plurality of photographic images" referred to in the present invention.

The ratios of luminance that is computed in accordance with a follow light photographic image and a back light photographic image, which are obtained through photography in a photo studio, are expressed by the following equations.

$$N1=(Ri \times Lt)/(Ri \times (Ls+Lt))=Lt/(Ls+Lt) \quad (1)$$

$$N2=(Ri \times Lt+Le)/(Ri \times (Ls+Lt)+Le) \quad (2)$$

Where Ls denotes luminance of flash of a flash light-emitting apparatus in the photo studio, Lt denotes luminance of light illumination that exists steadily in the photo studio, Ri denotes reflection factors for positions corresponding to respective pixels of a photographic image on the subject or the EL panel, Le denotes luminance of emitted light by the EL panel, N1 denotes a ratio of luminance on pixels corresponding to the subject area of the photographic image, and N2 denotes a ratio of luminance on pixels corresponding to the background area of the photographic image.

From the equation (1), it is understood that the ratio of luminance on the subject area offers the constant value, which is determined in accordance with the specifications of the independent apparatus in the photo studio, independent from the position in the subject area.

In the equation (2), Ri is the reflection factors on the EL panel. The reflection factors offer constant value on the EL panel independently of the position. Thus, from the equation (2), it is understood that the ratio of luminance on the background area also offers the constant value, which is determined in accordance with the specifications of the independent apparatus in the photo studio, independent from the position in the background area.

However, between the ratio of luminance on the subject area and the ratio of luminance on the background area, there is a difference owing to the luminance (Le) of emitted light by the EL panel. As a result, as shown in FIG. 18, on the histogram H5 as to the ratio, there appear two sharp peaks Pk3 and Pk4, which correspond to the subject area and the background area, respectively. Between the follow light photographic image and the back light photographic image, a difference in luminance on the subject area is larger than a difference in luminance on the background area. Thus, in the histogram H5 shown in FIG. 18, the peak Pk3 at the low ratio side corresponds to the background area, and the peak Pk4 at the high ratio side corresponds to the subject area.

In this manner, in the histogram H5 shown in FIG. 18, even if light illumination exists steadily in the photo studio, two sharp peaks always appear. Further, even if the luminance of the steady illumination varies, it would be understood from the equations (1) and (2) that the sharpness of the peaks does not vary, while the positions of the peaks vary.

The above description is concerned with the explanation of the histogram of the ration of the luminance. Now, let us return to the explanation of the image taking system 1 of the present embodiment.

As mentioned above, according to the image taking system 1 of the present embodiment, the initial subject mask and the initial background mask are set up in accordance with two peaks Pk1 and Pk2 in the G-value histogram H3 shown in part (c) of FIG. 17, respectively.

Figure 19:
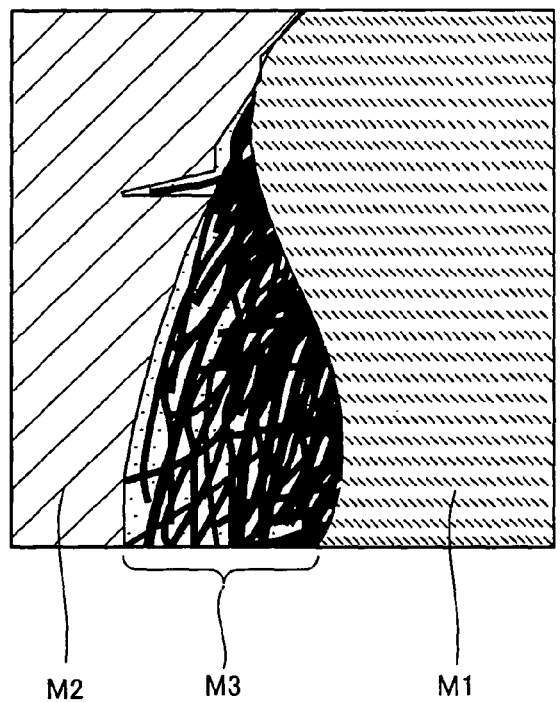
FIG. 19 is an illustration showing an area that is set up as an initial subject mask and an area that is set up as an initial background mask, in the enlarged view of the back light photographic image shown in FIG. 14.

FIG. 19 is an illustration showing an area that is set up as an initial subject mask and an area that is set up as an initial background mask, in the enlarged view of the back light photographic image shown in FIG. 14.

A hatching portion of the right side in FIG. 19 is a portion of hairs of the subject P' in the enlarged view of the back light photographic image shown in FIG. 14, in which the hairs are so concentrated that the background is not seen, and are greatly biased to the shadow side through the back light photography. The G-value of such a portion is less than the first threshold Sr1. As a result, the subject mask set up section 731c sets up the hatching portion of the right side in FIG. 19 as an initial subject mask M1.

A hatching portion of the left side in FIG. 19 is a portion of only the EL panel 130 of the background in the enlarged view of the back light photographic image shown in FIG. 14, in which the background is greatly biased to the highlight side. The G-value of such a portion exceeds the second threshold Sr2. As a result, the background mask set up section 731*d* sets up the hatching portion of the left side in FIG. 19 as an initial background mask M2.

On the other hand, a portion, which belongs to none of the hatching portions of the left side and the right side in FIG. 19, is a portion that the background appears through the hairs. The G-value of such a portion exceeds the first threshold Sr1 and is less than the second threshold Sr2. As a result, the portion, which belongs to none of the hatching portions of the left side and the right side in FIG. 19, is located between the initial subject mask M1 and the initial background mask M2, and remains in form of a boundary area M3.

Figure 20:
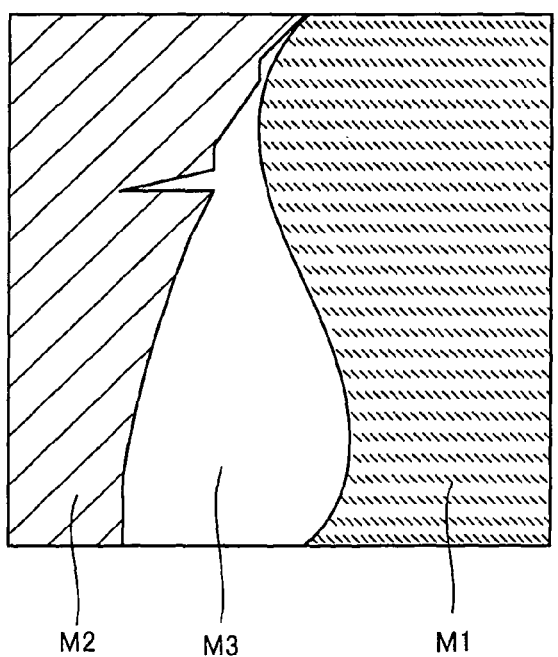
FIG. 20 is an illustration showing the initial subject mask and the initial background mask shown in FIG. 19.
Figure 21:
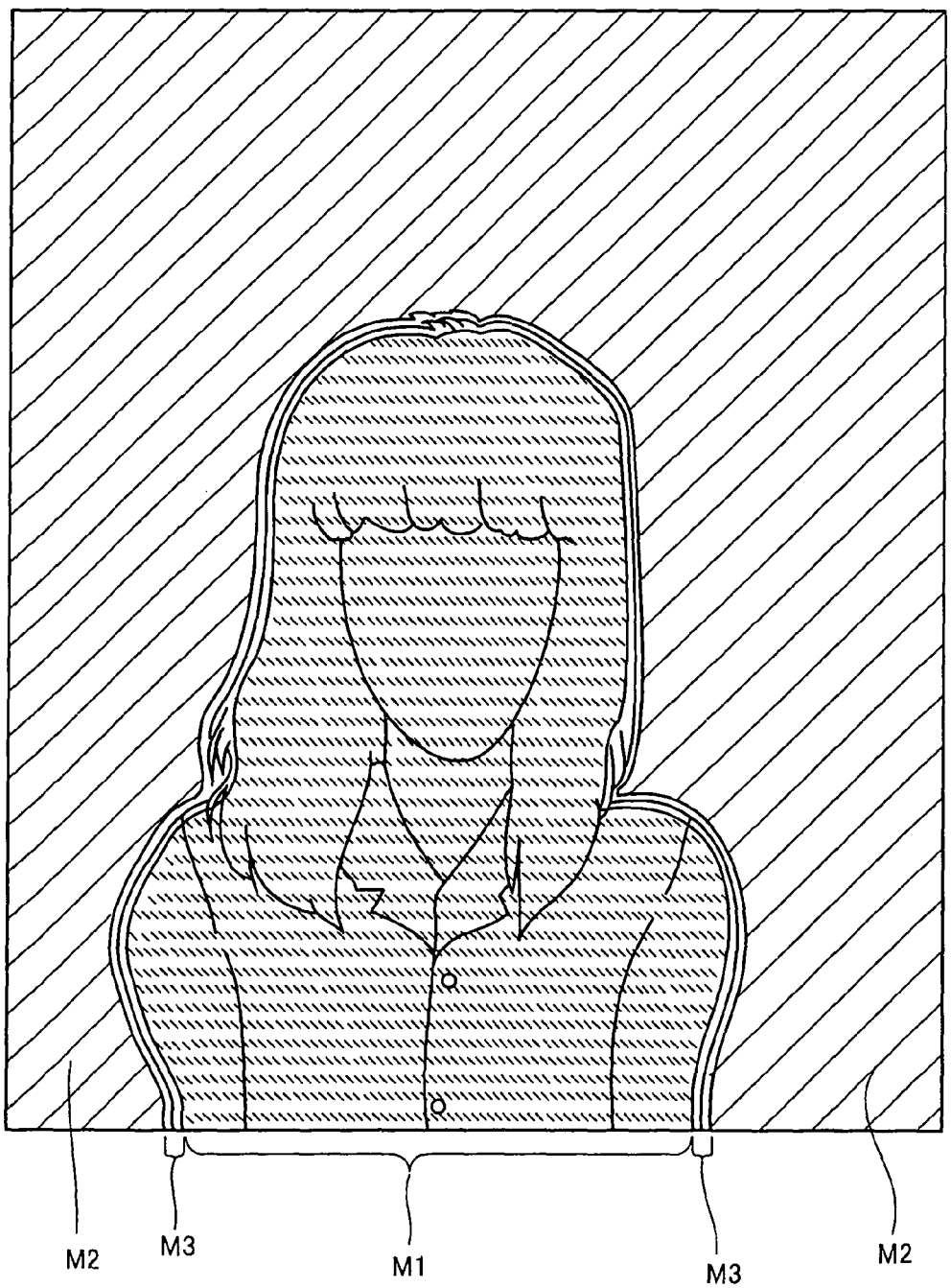
FIG. 21 is an illustration showing a state that the initial subject mask and the initial background mask are overlapped on the corrected follow light photographic image shown in FIG. 11 in its entirety.

FIG. 20 is an illustration showing the initial subject mask and the initial background mask shown in FIG. 19. FIG. 21 is an illustration showing a state that the initial subject mask and the initial background mask are overlapped on the corrected follow light photographic image shown in FIG. 11 in its entirety.

As shown in FIG. 20 and FIG. 21, the initial subject mask M1 is close to the initial background mask M2, so that the boundary area M3 is narrowed. As mentioned above, regarding the corrected back light photographic image, the position and outline of the subject in the image are substantially same as those of the corrected follow light photographic image. However, there is a possibility of an occurrence of somewhat discrepancy in position and outline of the subject between the follow light photographic image and the back light photographic image, owing to somewhat discrepancy in timing of the photography between the follow light photographic image and the back light photographic image. In such a case, the narrow boundary area M3 may involve such a possibility that regarding the corrected follow light photographic image shown, the portion that the background appears through a part of the subject, as shown in FIG. 13, is not completely included in the boundary area M3, and thus is included either one of the initial subject mask M1 and the initial background mask M2. In the event that the replacement of the background is performed in accordance with the initial subject mask M1 and the initial background mask M2 as mentioned above, there is a possibility of an occurrence of problems that the old background remains on the portion that the background appears through a part of the subject, or that portion is completely replaced by the new background, so that the subject has a chip in a part.

In order to avoid those problems, according to the present embodiment, the subject mask reduction section 731*e* shown in FIG. 16 reduces the initial subject mask M1 in a direction going away from the boundary area M3, and the background mask reduction section 731*f* reduces the initial background mask M2 in a direction going away from the boundary area M3. This feature makes it possible to expand the boundary area M3 so as to include much the portion that the background appears through a part of the subject.

Figure 22:
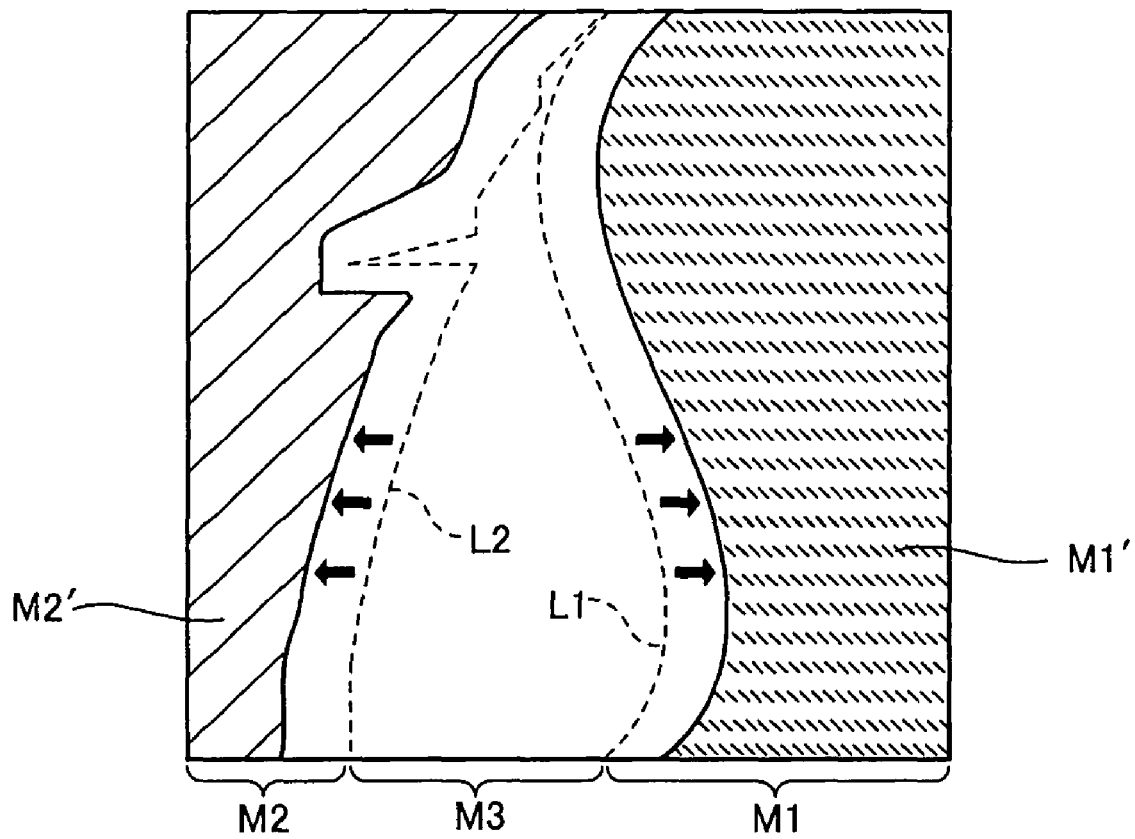
FIG. 22 is an illustration showing a state that the initial subject mask and the initial background mask shown in FIG. 20 are reduced in a direction going away from the boundary area, respectively.

FIG. 22 is an illustration showing a state that the initial subject mask and the initial background mask shown in FIG. 20 are reduced in a direction going away from the boundary area, respectively.

As seen from FIG. 22, the initial subject mask M1 is reduced in such a way that an outline L1 of the initial subject mask M1 is moved by the corresponding predetermined number of pixels in a direction going away from the boundary area M3. In a similar fashion, the initial background mask M2 is reduced in such a way that an outline L2 of the initial background mask M2 is moved by the corresponding predetermined number of pixels in a direction going away from the boundary area M3. According to the present embodiment, as a migration length of the outlines of two masks, there is adopted 5 pixels. Final subject mask M1' and final background mask M2' are completed through reduction of the masks as mentioned above.

Figure 23:
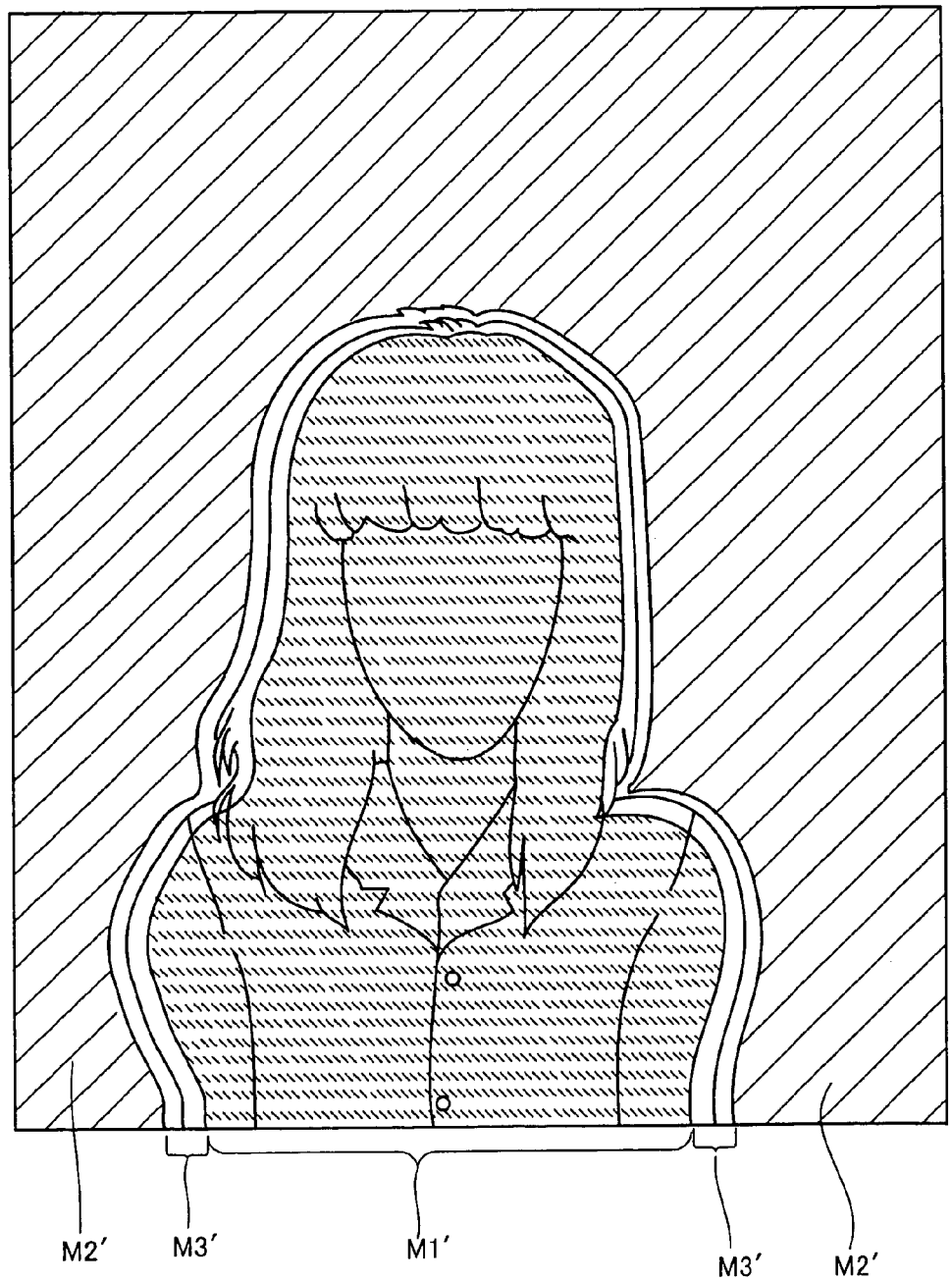
FIG. 23 is an illustration showing a state that the subject mask and the background mask, which are finally completed, are overlapped on the corrected follow light photographic image shown in FIG. 11 in its entirety.

FIG. 23 is an illustration showing a state that the subject mask and the background mask, which are finally completed, are overlapped on the corrected follow light photographic image shown in FIG. 11 in its entirety.

A gap between the subject mask M1' and the background mask M2', which are finally completed, that is, a final boundary area M3' is expanded by the corresponding 10 pixels as compared with the boundary area M3 shown in FIG. 21. As a result, as seen from FIG. 23, the final boundary area M3' includes much the portion that the background appears through a part of the subject. An area defined by the background mask M2', which is finally completed, corresponds to an example of the "background area of the photographic image" referred to in the resent invention. A combination of an area defined by the subject mask M1', which is finally completed, and the final boundary area M3' corresponds to an example of "another area excepting the background area of the photographic image".

The above-description is concerned with the description of the mask creating section 731 of the replacement processing section 730 shown in FIG. 15. Next, before explanation of details of the color presuming section 732 of the replacement processing section 730, there will be explained a mask creating section for creating a background mask and a subject mask in accordance with a method different from the present embodiment, which is different from the mask creating section 731.

For example, in the photo-studio 10 shown in FIG. 1, it would happen that a relative positional relation between the EL panel 130 and the digital camera 11 may cause the EL panel 130 to come out darker in the photographic image at the lower portion near feet of the subject as compared with the upper portion, brightness of the corrected back light photographic image, which will be used for creation of the mask, is uneven in a height direction. In such a case, it happens that the peak corresponding to the background area of the histogram shown in FIG. 17 is dispersed, and it is difficult to create a background mask with great accuracy. According to a mask creating section, which is different from the mask creating section 731 of the present embodiment, it is possible to cope with the problem as mentioned above. Hereinafter, there will be described such a mask creating section.

Figure 24:
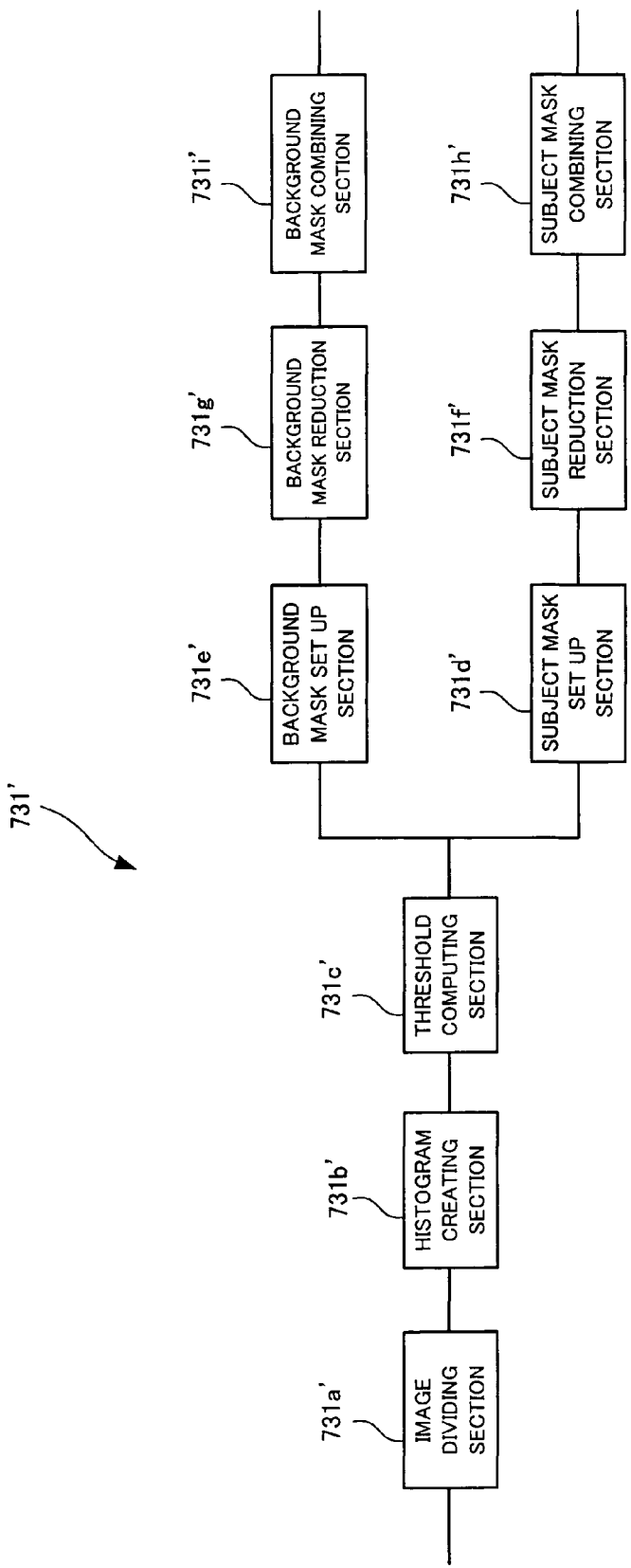
FIG. 24 is a view showing a mask creating section, which is different from the mask creating section 731 of the present embodiment.

FIG. 24 is a view showing a mask creating section, which is different from the mask creating section 731 of the present embodiment.

A mask creating section 731', which is different from the mask creating section 731, comprises an image dividing section 731*a*', a histogram creating section 731*b*', a threshold computing section 731*c*', a subject mask set up section 731*d*', a background mask set up section 731*e*', a subject mask reduction section 731*f*', a background mask reduction section 731*g*', a subject mask combining section 731*h*', and a background mask combining section 731*i*'.

The image dividing section 731*a*' divides the corrected back light photographic image in the manner as set forth below.

Figure 25:
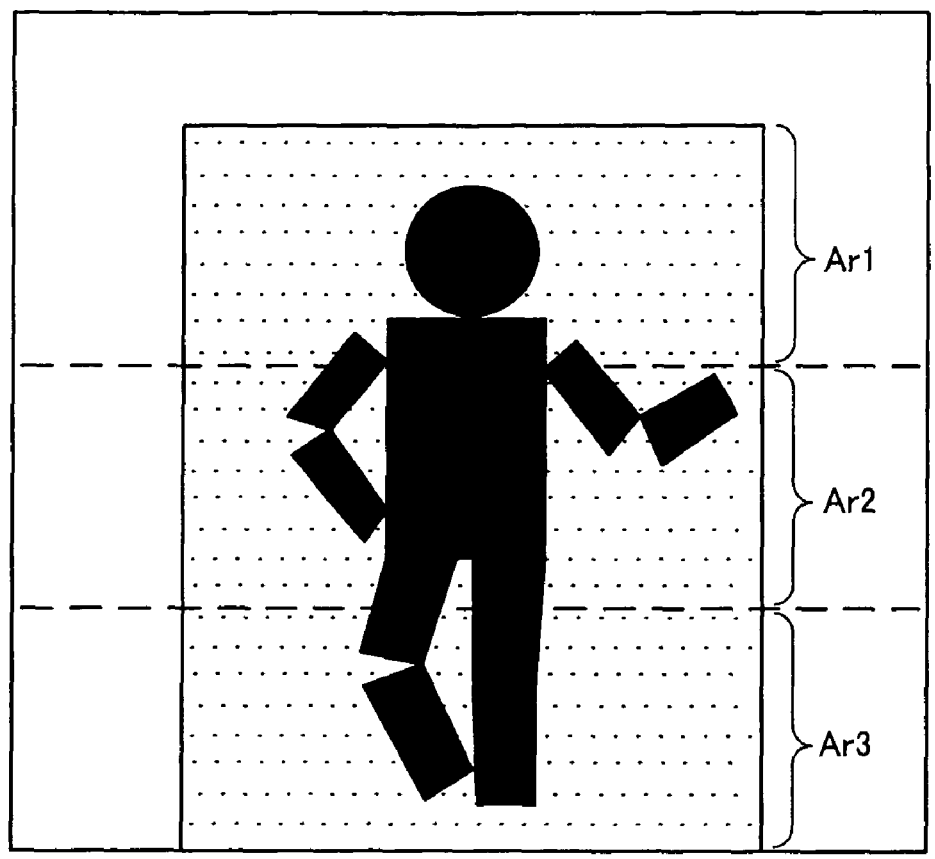
FIG. 25 is a view showing a state that the corrected back light photographic image is divided.

FIG. 25 is a view showing a state that the corrected back light photographic image is divided.

FIG. 25 shows a state in which the corrected back light photographic image is divided into three in a height direction. As mentioned above, unevenness of the corrected back light photographic image in luminous intensity appears in the height direction. Accordingly, in individual insides of three small areas Ar1, Ar2, and Ar3, which are obtained through the division in the height direction, the luminous intensity is relatively even.

The histogram creating section 731b' shown in FIG. 24 creates histograms on individual three small areas Ar1, Ar2, and Ar3.

Figure 26:
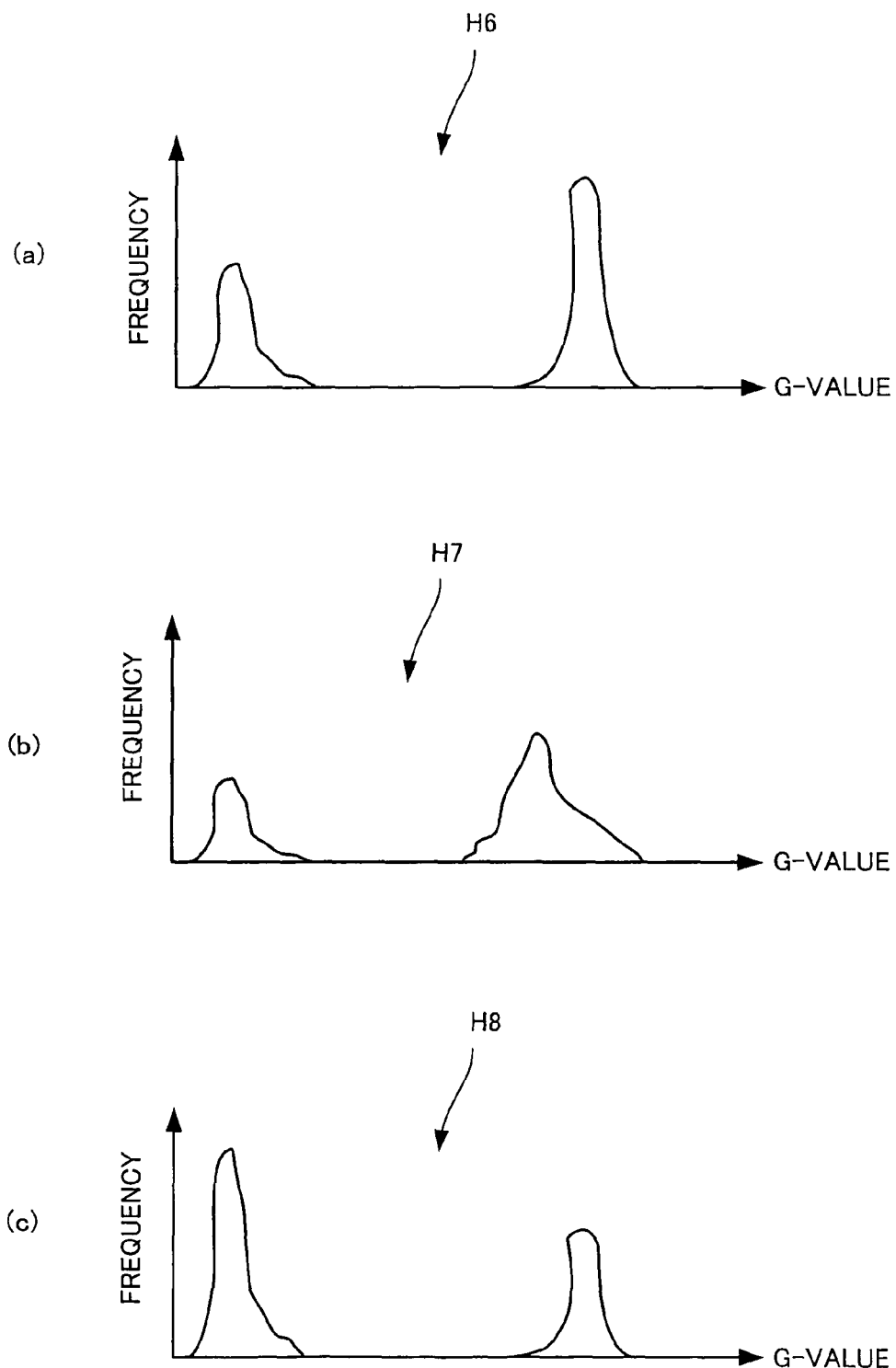
FIG. 26 is a view showing examples of the histograms, which are created on the three small areas Ar1, Ar2, and Ar3 shown in FIG. 25, respectively.

FIG. 26 is a view showing examples of the histograms, which are created on the three small areas Ar1, Ar2, and Ar3 shown in FIG. 25, respectively.

A part (a) of FIG. 26 shows a histogram H6 of G-value associated with the small areas Ar1 of the highest stage in the FIG. 25. A part (b) of FIG. 26 shows a histogram H7 of G-value associated with the small areas Ar2 of the middle stage in the FIG. 25. A part (c) of FIG. 26 shows a histogram H8 of G-value associated with the small areas Ar3 of the lowest stage in the FIG. 25. As shown in FIG. 26, in the histograms, which are created on the three small areas Ar1, Ar2, and Ar3, the peaks associated with the background areas appear with sharpness capable of being discriminated at the highlight side.

The threshold computing section 731c' shown in FIG. 24 computes a threshold for distinguish the subject area from other area and a threshold for distinguish the background area from other area, as mentioned above, on three histograms shown in FIG. 26.

The subject mask set up section 731d' and the background mask set up section 731e' perform set up of the initial subject mask and the initial background mask as mentioned above, using the thresholds computed in the threshold computing section 731c', on the three small areas Ar1, Ar2, and Ar3, respectively. The subject mask reduction section 731f' and the background mask reduction section 731g' reduce initial subject mask and the initial background mask set up on the three small areas Ar1, Ar2, and Ar3, respectively, to create the subject mask and the background mask as mentioned above.

The subject mask combining section 731h' combines the subject masks, which are created on the three small areas Ar1, Ar2, and Ar3, respectively, to complete the final subject mask associated with the back light photographic image in its entirety. In a similar fashion, the background mask combining section 731i' combines the background masks, which are created on the three small areas Ar1, Ar2, and Ar3, respectively, to complete the final background mask associated with the back light photographic image in its entirety.

According to the mask creating section 731' as mentioned above, the corrected back light photographic image is divided into small areas, which are relatively even in luminous intensity, and there are created subject masks and the background masks on the small areas. The created subject masks and the background masks are combined to complete the final subject masks and the background masks. This processing makes it possible to create a mask with great accuracy, even if the corrected back light photographic image to be used for creating the masks is uneven in luminous intensity in the height direction. According to the present embodiment, as the number of divisions where the corrected back light photographic image is divided into small areas, there are raised three divisions by way of examples. However, the number of divisions is not restricted to three.

Here, the explanation of the mask creating section 731' will be terminated, and let us return to the explanation of the replacement processing section 730 shown in FIG. 15. First, there will be explained details of the color presuming section 732 of the replacement processing section 730.

Figure 27:
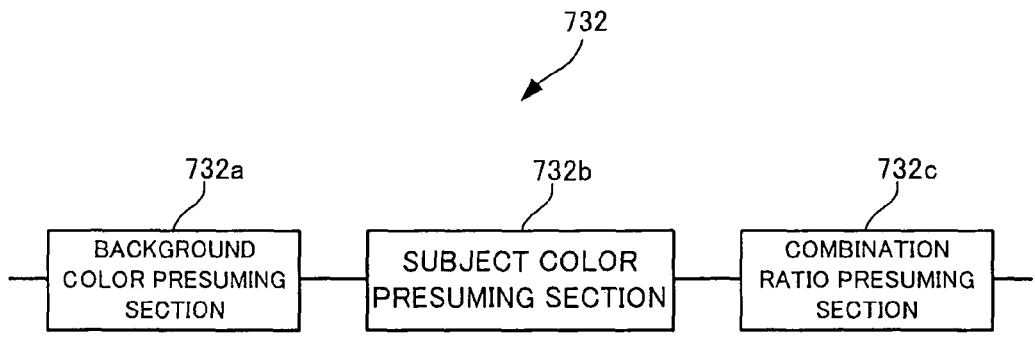
FIG. 27 is an explanatory view useful for understanding details of the color presuming section shown in FIG. 15.

FIG. 27 is an explanatory view useful for understanding details of the color presuming section shown in FIG. 15.

The color presuming section 732 comprises a background color presuming section 732a, a subject color presuming section 732b, and a combination ratio presuming section 732c.

First, there will be described the background color presuming section 732a.

Figure 28:
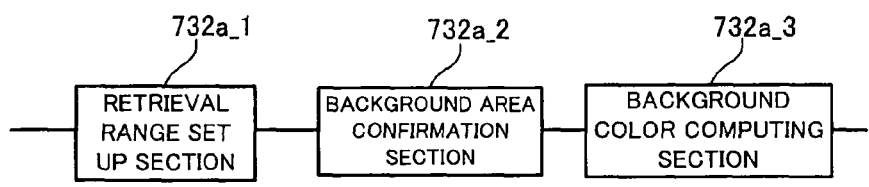
FIG. 28 is an explanatory view useful for understanding details of the background color presuming section shown in FIG. 27.

FIG. 28 is an explanatory view useful for understanding details of the background color presuming section shown in FIG. 27.

The background color presuming section 732a presumes, as to the respective pixels of the final boundary area in the corrected follow light photographic image, a background color constituting a color of the pixel. The background color presuming section 732a comprises a retrieval range set up section 732a_1, a background area confirmation section 732a_2, and a background color computing section 732a_3.

In order to presume a background color on a certain pixel in the boundary area, the background color presuming section 732a searches, from among pixels in the area defined by the background mask, a plurality of pixels located near the pixels in some extent, and determines an average color of colors of the plurality of pixels thus retrieved as a background color on the pixel.

The retrieval range set up section 732a_1 sets up a square-like shaped retrieval range on the pixel of presuming background as follows.

Figure 29:
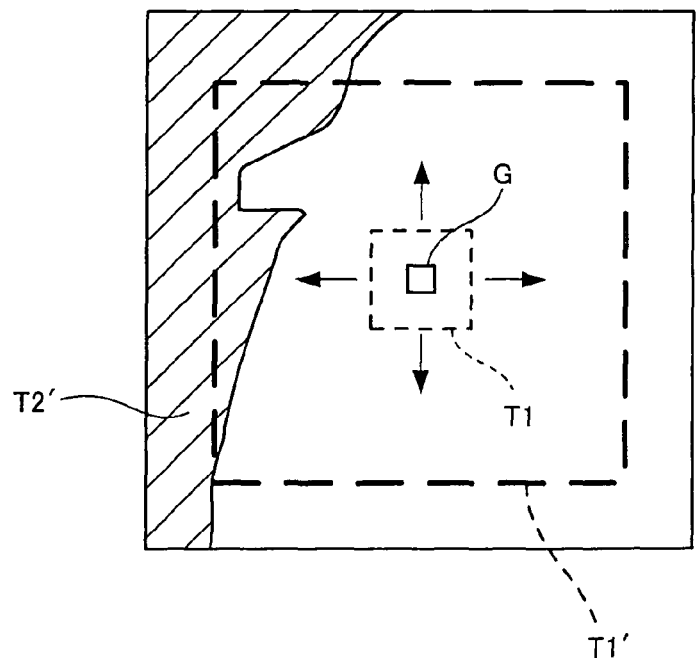
FIG. 29 is an illustration useful for understanding a state that when a background color is estimated on a certain pixel, a search range is set up on the pixel.

FIG. 29 is an illustration useful for understanding a state that when a background color is estimated on a certain pixel, a search range is set up on the pixel.

In order to set up a retrieval range on a certain pixel G in the boundary area, the retrieval range set up section 732a_1 gradually expands a retrieval range starting from a square-like shaped predetermined initial range T1 on the pixel G. The retrieval range set up section 732a_1 stops the expansion when the pixels in the area defined by the background mask M2' exceeds a predetermined number of pixels and are included in the retrieval range, and sets up a retrieval range T1' at that time as a retrieval range for the background presumption.

When the retrieval range set up section 732a_1 sets up the retrieval range T1', the background area confirmation section 732a_2 shown in FIG. 24 confirms the subsequent area in the corrected follow light photographic image as an area used for presuming the background color on the pixel G.

Figure 30:
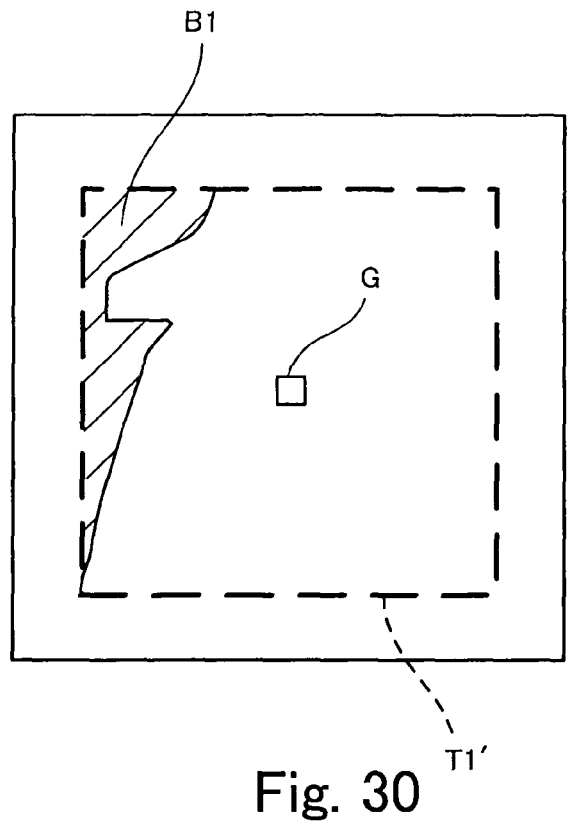
FIG. 30 is an illustration showing an example of an area used for presuming a background color on a certain pixel.

FIG. 30 is an illustration showing an example of an area used for presuming a background color on a certain pixel.

As seen from FIG. 30, as the area used for presuming the background color on the pixel G, there is confirmed an area B1 in the corrected follow light photographic image, which is the area defined by the background area, and is in the retrieval range T1' set up by the retrieval range set up section 732a_1.

Thus, when the area B1 used for presuming the background color on the pixel G is confirmed, the background color computing section 732a_3 shown in FIG. 28 computes the average color of a plurality of pixels in the area B1, that is, the respective average values of R-values, G-values, and B-values of the plurality of pixels. A color represented by the computing result is adopted as the background color on the pixel G.

The background color presuming section 732a performs the processing from the set up of the retrieval range to the computing of the average color on all the pixels in the boundary area of the corrected follow light photographic image.

Next, there will be explained the subject color presuming section 732b shown in FIG. 27.

Figure 31:
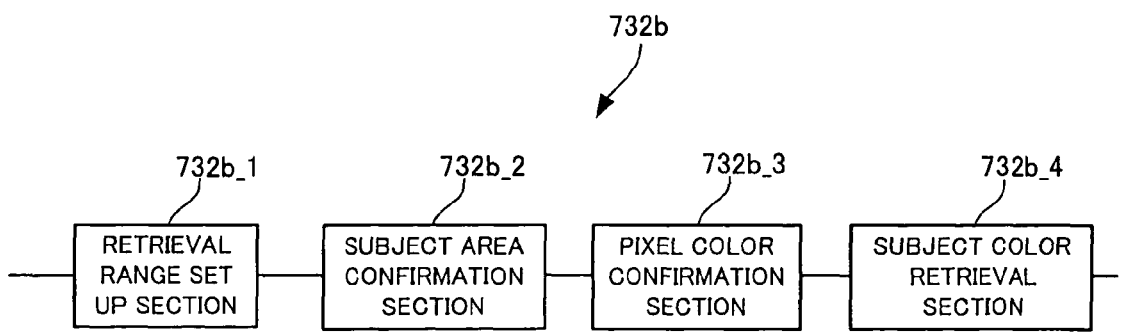
FIG. 31 is an explanatory view useful for understanding details of the subject color presuming section shown in FIG. 27.

FIG. 31 is an explanatory view useful for understanding details of the subject color presuming section shown in FIG. 27.

The subject color presuming section 732b presumes, as to the respective pixels of the final boundary area in the corrected follow light photographic image, a subject color constituting a color of the pixel. The subject color presuming section 732b comprises a retrieval range set up section 732b_1, a subject area confirmation section 732b_2, a pixel color confirmation section 732b_3 and a subject color retrieval section 732b_4.

In order to presume a subject color on a certain pixel in the boundary area, the subject color presuming section 732b searches, from among pixels in the area defined by the subject mask, a plurality of pixels located near the pixels in some extent, and searches a subject color on the pixel from among the plurality of pixels thus retrieved in accordance with a retrieval method which will be described later.

The retrieval range set up section 732b_1 sets up a square-like shaped retrieval range on the pixel of presuming the subject as follows.

Figure 32:
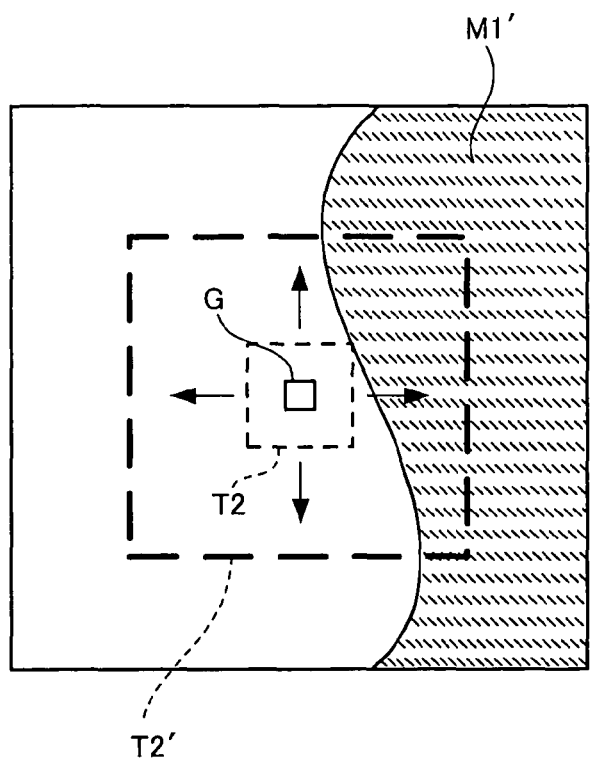
FIG. 32 is an illustration useful for understanding a state that when a subject color is presumed on a certain pixel, a search range is set up on the pixel.

FIG. 32 is an illustration useful for understanding a state that when a subject color is presumed on a certain pixel, a search range is set up on the pixel.

In order to set up a retrieval range on a certain pixel G in the boundary area, the retrieval range set up section 732b_1 gradually expands a retrieval range starting from a square-like shaped predetermined initial range T2 on the pixel G. The retrieval range set up section 732b_1 stops the expansion when the pixels in the area defined by the subject mask M1' exceeds a predetermined number of pixels and are included in the retrieval range, and sets up a retrieval range T2' at that time as a retrieval range for the subject presumption.

When the retrieval range set up section 732b_1 sets up the retrieval range T2', the subject area confirmation section 732b_2 shown in FIG. 31 confirms the subsequent area in the corrected follow light photographic image as an area used for presuming the subject color on the pixel G.

Figure 33:
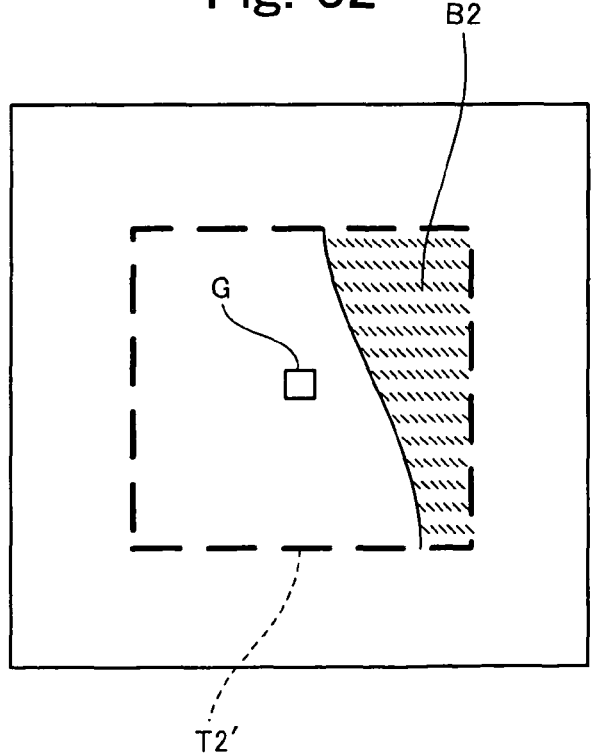
FIG. 33 is an illustration showing an example of an area used for presuming a subject color on a certain pixel.

FIG. 33 is an illustration showing an example of an area used for presuming a subject color on a certain pixel.

As seen from FIG. 33, as the area used for presuming the subject color on the pixel G, there is confirmed an area B2 in the corrected follow light photographic image, which is the area defined by the subject area, and is in the retrieval range T2' set up by the retrieval range set up section 732b_1.

Thus, when the area B2 used for presuming the subject color on the pixel G is confirmed, the pixel color confirmation section 732b_3 shown in FIG. 31 confirms a color of the pixel G, and then the subject color retrieval section 732b_4 shown in FIG. 31 retrieves the subject color on the pixel G from among a plurality of pixels in the area B2, in accordance with a retrieval method as set forth below.

Figure 34:
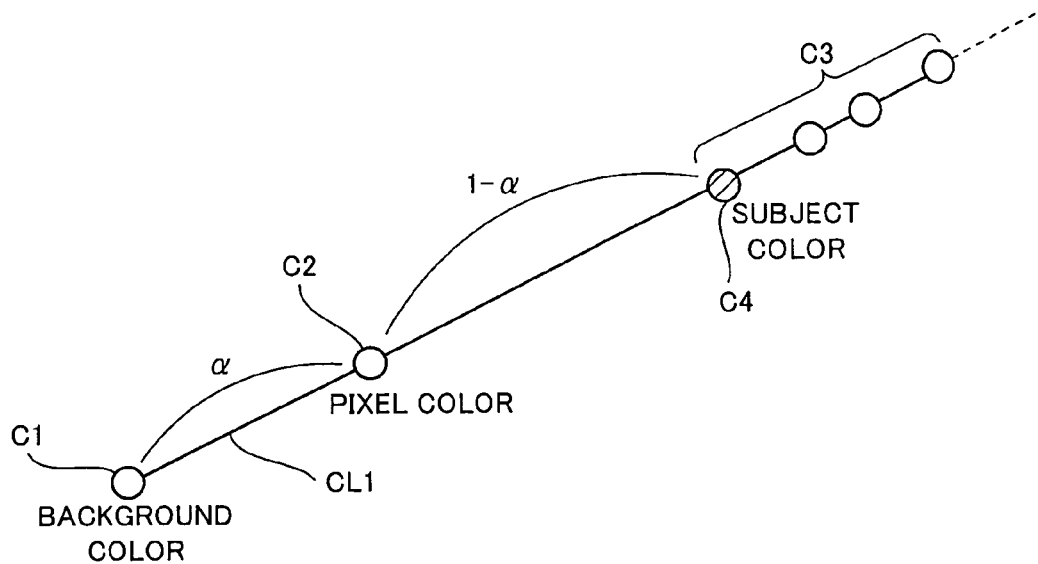
FIG. 34 is an illustration useful for understanding a method of searching a subject color on a certain pixel in a boundary area of the corrected follow light photographic image.

FIG. 34 is an illustration useful for understanding a method of searching a subject color on a certain pixel in a boundary area of the corrected follow light photographic image.

FIG. 34 shows, as to a certain pixel in a boundary area of the corrected follow light photographic image, a straight line CL1 coupling a background color C1 presumed by the background color presuming section 732a shown in FIG. 27 with a color C2 of the pixel, which is confirmed by the pixel color confirmation section 732b_3 shown in FIG. 31, on the RGB color space.

As mentioned above, as to the color of the pixel in the boundary area of the corrected follow light photographic image, there is a possibility that a background appears through a part of the subject at the time of photography, and the background color is combined with the subject color into a combination color. In the event that the color of the pixel to be retrieved in the subject color is such a combination color, the color C2 of the pixel, which is the combination color, the background color C1 as the base of the color C2, and the subject color are lined up on the RGB color space.

Thus, the subject color retrieval section 732b_4 shown in FIG. 31 first retrieves, from among colors of a plurality of pixels in the area B2, a color C3 lined up on the extended line of the straight line CL1.

In the event that there is a plurality of colors C3, there may be expected the highest possibility that the color closest to the color C2 of the pixel, on the extended line on the straight line CL1, is the base of the color C2 as well as the background color C1. Hence, in the event that there exists a plurality of colors C3 lined up on the extended line of the straight line CL1, the subject color retrieval section 732b_4 adopts the color closest to the color C2 of the pixel, from among those colors C3, as a subject color C4 on the pixel.

The subject color presuming section 732b performs the processing from the set up of the retrieval range to the retrieval of the subject color on all the pixels in the boundary area of the corrected follow light photographic image.

The above description is concerned with the explanation of the subject color presuming section 732b shown in FIG. 27. Next, there will be explained the combination ratio presuming section 732c shown in FIG. 27 with reference to FIG. 34.

The combination ratio presuming section 732c computes, as shown in FIG. 34, the ratio of the length of a line segment coupling on the RGB color space the background color C1 presumed by the background color presuming section 732a with the subject color C4 presumed by the subject color presuming section 732b to the length of a line segment coupling the background color C1 with the color C2 of the pixel, in form of a combination ratio α where the color C2 of the pixel is combined with the background color C1 and the subject color C4. The combination ratio presuming section 732c performs the computation of the combination ratio α on all the pixels in the boundary area of the corrected follow light photographic image.

The above description is concerned with the explanation of details of the color presuming section 732 of the replacement processing section 730 shown in FIG. 15. Next, there will be explained details of the background replaced image creating section 733 of the replacement processing section 730.

The background replaced image creating section 733 retains, as mentioned above, first, as to the corrected follow light photographic image, the area defined by the subject mask, and replaces the area defined by the background mask with another background of a customer's wish.

Next, the background replaced image creating section 733 determines, as to each pixel of the boundary area, a combination color through a combination of the color of the background of a customer's wish and the subject color presumed in the color presuming section 732 at the combination ratio presumed in the color presuming section 732.

Figure 35:
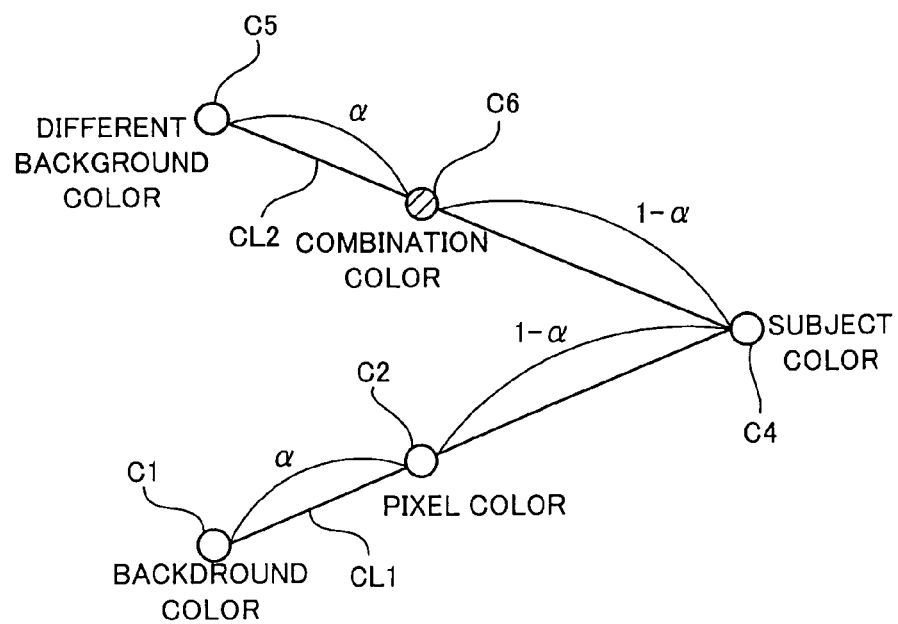
FIG. 35 is an illustration useful for understanding a scheme of a combination color on a certain pixel in a boundary area of the corrected follow light photographic image.

FIG. 35 is an illustration useful for understanding a scheme of a combination color on a certain pixel in a boundary area of the corrected follow light photographic image.

FIG. 35 shows a straight line CL1 coupling among the presumed background color C1, the color C2 of the pixel, and the presumed subject color C4, on the RGB color space, which is also shown in FIG. 34. The color C2 of the pixel is a point wherein a straight line coupling the background color C1 with the subject color C4 is divided in a ratio of the combination ratio α to (1−the combination ratio α). Thus, the background replaced image creating section 733 adopts, as shown in FIG. 35, a point wherein a straight line CL2 coupling another background color C5 with the presumed subject color C4 is divided in a ratio of the combination ratio α to (1−the combination ratio α), in form of a combination color C6.

When the combination color is determined on all the pixels of the boundary area in accordance with the method explained with reference to FIG. 35, the background replaced image creating section 733 replaces the color of all the pixels with the combination color determined on the respective pixel. As a result, there is completed a background replaced image in which the background of the corrected follow photographic image is replaced by another background of a customer's wish.

As seen from FIG. 23, the boundary area of the corrected follow photographic image includes the portion occupied by only the subject and the portion occupied by only the background as well as the portion that the background appears through a part of the subject. The color of the pixels of the portion occupied by only the subject is the color of the subject per se. Thus, even if the background is replaced by another background, there is a need to be maintained in color of the pixel. The color of the pixels of the portion occupied by only the background is the color of the background per se. Thus, when the background is replaced by another background, there is a need that a color of the pixel is completely replaced by the other background color.

According to the present embodiment, in the event that the pixels of the presuming object of the background color, the subject color and the combination ratio are concerned with pixels of the portion occupied by only the subject, a color of all most of the pixels in an area used for presuming the subject color on the associated pixel, such as the area B2 shown in FIG. 33, is the color of the subject per se that is the same as the color of the pixel of the presuming object. As a result, as to such a pixel, the combination ratio α offers approximately "1". When the background is replaced, the combination color is determined in accordance with the combination ratio α. Thus, it is possible to maintain the color of the subject per se, which is the color of the associated pixel.

On the other hand, in the event that the pixels of the presuming object of the background color, the subject color and the combination ratio are concerned with pixels of the portion occupied by only the background, the color of the associated pixel is the color of the background per se that is the same as the background color to be presumed on the pixel. As a result, as to such a pixel, the combination ratio α offers approximately "0". When the background is replaced, the color of the associated pixel is completely replaced with another background color in accordance with the combination ratio α.

In effect, according to the present embodiment, in the event that the pixels of the presuming object of the background color, the subject color and the combination ratio are concerned with pixels of the portion that the background appears through a part of the subject, the combination ratio α has a values between "0" and "1", and thus when the background is replaced, the subject color is combined with another background color to create a background replaced image.

Figure 36:
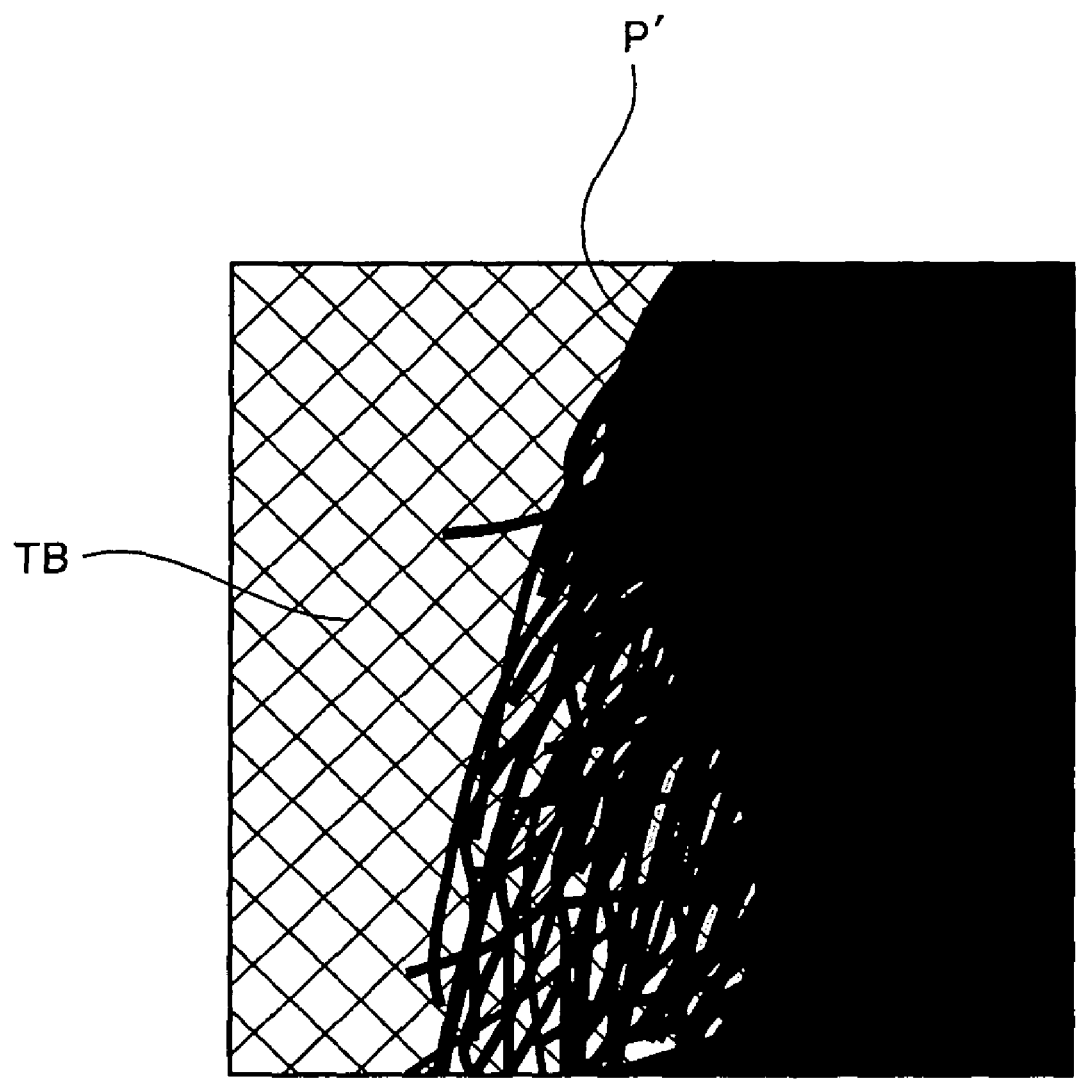
FIG. 36 is a view showing an example of a background replaced image.

FIG. 36 is a view showing an example of a background replaced image.

FIG. 36 shows an enlarged view in which the same portion as the area A1 shown in FIG. 11 is enlarged, in a background replaced image created through a replacement of the background of the corrected follow light photographic image shown in FIG. 11 by the different background.

The background replaced image created in the background replaced image creating section 733 is an image in which a color of the pixels in the boundary area is replaced by the combination color. Thus, as to the background replaced image, a person recognizes, as shown in FIG. 36, a state that a replaced different background TB is seen through hairs of the subject P'.

Now to repeatedly say, according to the present embodiment, the initial subject mask M1 and the initial background mask M2, which are created in accordance with the corrected back light photographic image, are reduced by the subject mask reduction section 731e and the background mask reduction section 731f shown in FIG. 16, respectively, by the corresponding 5 pixels in a direction going away from the boundary area so as to complete the subject mask M1' and the background mask M2'. This feature contributes to avoiding such the inconveniences that a portion that the background appears through a part of the subject in the photographic image is out of the boundary area, owing to the discrepancy in position and outline of the subject, which may occur between the corrected follow light photographic image and the corrected back light photographic image. However, in some situation of the subject at the time of photography, there is a case that the reduction by the corresponding 5 pixels is insufficient to compensate for the discrepancy in position and outline of the subject. In such a case, there will be raised problems that the old background remains at the portion that the background appears through a part of the subject, in the background replaced image displayed on the display screen 220a (cf. FIG. 1), or that the portion is replaced by the new background in its entirety, so that a part of the subject is chipped.

According to the present embodiment, in order to correct such unnatural portions of the background replaced image and obtain a finally natural background replaced image, there is provided the image revision section 760 (cf. FIG. 5).

Hereinafter, there will be explained details of the image revision section 760.

Figure 37:
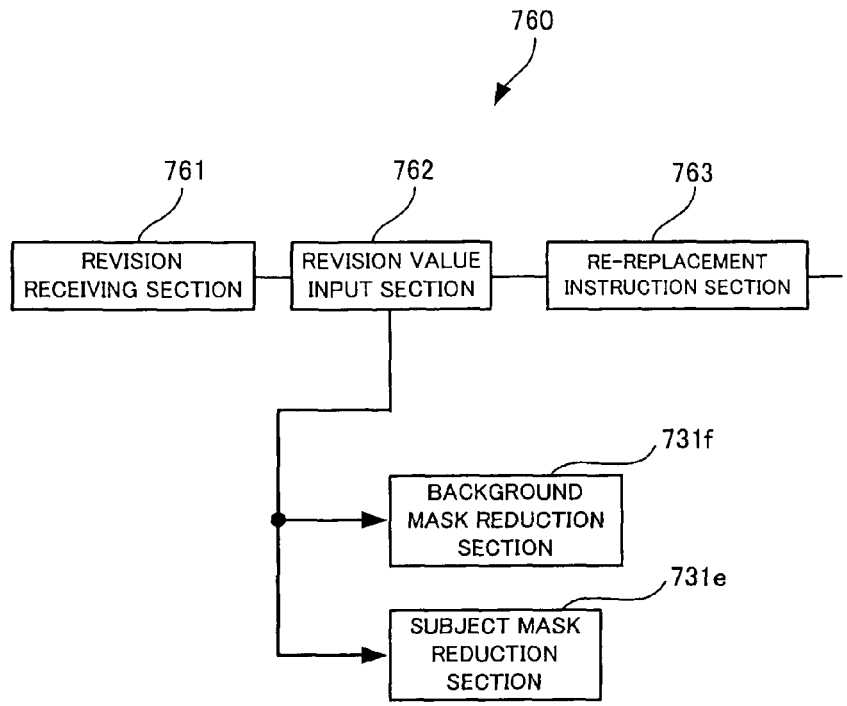
FIG. 37 is a view showing details of the image revision section 760 shown in FIG. 5.

FIG. 37 is an explanatory view useful for understanding details of the image revision section 760 shown in FIG. 5. In the following figures, the same reference numbers as those of FIG. 1 and FIG. 5 denote the same parts.

FIG. 37 shows the subject mask reduction section 731e and the background mask reduction section 731f also shown in FIG. 16 as well as the image revision section 760.

The image revision section 760 shown in FIG. 37 revises the unnatural portion of the background replaced image displayed on the display screen 220a. The image revision section 760 comprises a revision receiving section 761, a revision value input section 762, and a re-replacement instruction section 763.

As mentioned above, there are displayed, on the display screen 220a, a message inquiring as to whether there is a necessity for revision on the background replaced image, as well as the background replaced image. At that time, when an operator, who looks at the unnatural portion in the background replaced image, operates the keyboard 230 and the mouse 240 to indicate that there is a necessity for revision on the background replaced image, the revision receiving section 761 receives the operator's instruction.

When the revision receiving section 761 receives the operator's instruction for revision, the revision value input section 762 causes the display screen 220a to display an input image plane for inputting revision values as set forth below.

According to the present embodiment, instead of the reduction amount of the corresponding 5 pixels to the respective masks of the subject mask reduction section 731e and the background mask reduction section 731f also shown in FIG. 16, a new reduction amount is treated as the revision value, and this new reduction amount is set up to the value of 5 pixels or more.

This reduction amount is entered on the input image plane for revision values, which is displayed by the revision value input section 762, through operation of the keyboard 230 and the mouse 240 by an operator. The revision value input section 762 transfers the entered reduction amount to the subject mask reduction section 731e and the background mask reduction section 731f. The subject mask reduction section 731e and the background mask reduction section 731f reduce over again the initial subject mask M1 and the initial background mask M2 with the reduction amount transferred from the revision value input section 762 instead of 5 pixels, respectively. Thus, there are created new subject mask and background mask, which are narrower in width as compared with those concerned with the reduction amount of 5 pixels. As a result, the boundary area is expanded, so that the portion that the background appears through a part of the subject is much included in the boundary area as compared with a case where the reduction amount is 5 pixels.

The re-replacement instruction section 763 issues instructions of re-replacement processing for the background using the new subject mask and background mask to the respective portions of the replacement processing section 730.

The new background replaced image, which is created through the replacement processing, is displayed on the display screen 220a. The image revision by the image revision section 760 is repeated until the unnatural portion disappears from the background replaced image displayed on the display screen 220a.

As explained with reference to FIG. 1 to FIG. 37, according to the image taking system 1 of the present embodiment, first, the background and the subject in the corrected follow light photographic image are distinguished from one another in accordance with the corrected back light photographic image in which the background and the subject of the image are greatly different from one another in luminous intensity, so that the background and the subject of the image are distinguishable from one another without making a mistake. Hence, according to the image taking system 1 of the present embodiment, it is possible to suppress such an inconvenience that when the background of the corrected follow light photographic image is replaced by a different background, a part of the subject is erroneously replaced by a background, or an old background remains in the background replaced image, thereby creating a background replaced image in which the background is naturally replaced by a background of a client wish.

Further, according to the image taking system 1 of the present embodiment there is recognized a boundary area between the subject area and the background area in the corrected follow light photographic image. When the background is replaced, the color of the pixel in the boundary area is replaced by a combination color in which the different background color to be replaced is suitably combined with the subject color. Thus, even if there is such a portion that the background appears through a part of the subject, the replacement of the background makes it possible to create a natural background replaced image that a different background appears through a part of the subject.

Further, according to the image taking system 1 of the present embodiment, a revision is applied to a background replaced image in which a background is replaced by a desired background. This feature makes it possible to create the background replaced image in which a background is replaced more naturally.

In the above description, as an example of the image revision section in the background replacing apparatus, there is raised and explained the image revision section 760 that deals with the reduction amount on the initial subject mask and the initial background mask as the revision amount to the background replaced image. However, the present invention is not restricted to this embodiment. It is acceptable that the image revision section of the present invention is ones as set forth below.

Figure 38:
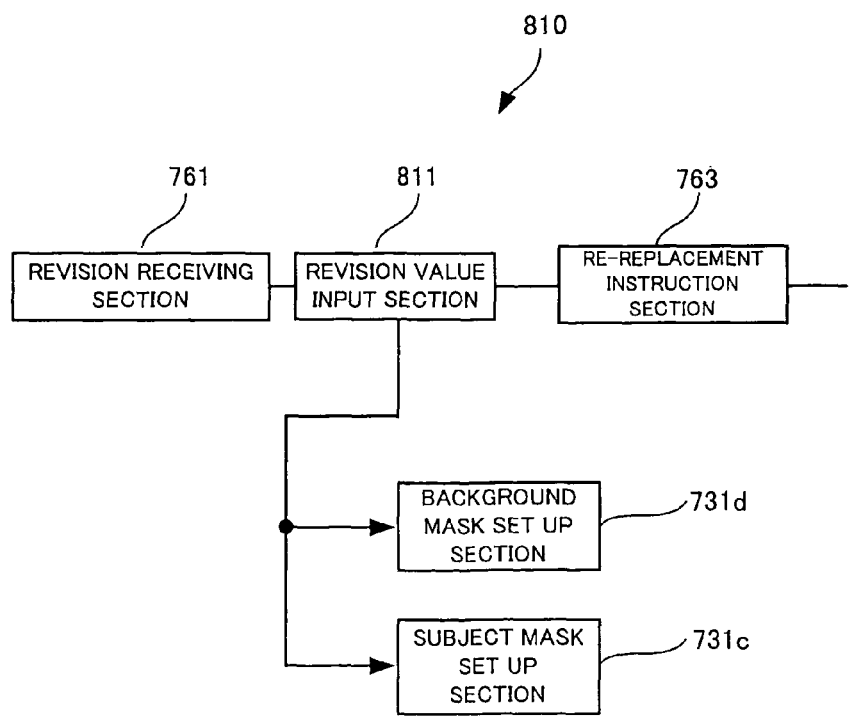
FIG. 38 is a view showing an image revision section which is different from the image revision section shown in FIG. 37.

FIG. 38 is an explanatory view useful for understanding details of another image revision section different from the image revision section shown in FIG. 37.

Hereinafter, there will be described different points from the image revision section 760 shown in FIG. 37. In FIG. 38, the same reference numbers as those of FIG. 37 denotes the same parts, and the redundant description will be omitted. In the following description, the G-value histogram H3 shown in the part (c) of FIG. 17 will be referred to.

An image revision section 810 shown in FIG. 38 has a revision value input section 811 as set forth below, different from the image revision section 760 shown in FIG. 38.

The initial subject mask and the initial background mask are set up, as mentioned above, in accordance with two thresholds Sr1 and Sr2, which are computed from the G-value histogram H3 created from the corrected back light photographic image. More in details, set up as the initial subject mask is an area consisting of pixels in which G-value offers the first threshold Sr1 or less, of a plurality of pixels constituting the corrected back light photographic image, and set up as the initial background mask is an area consisting of pixels in which G-value offers the second threshold Sr2 or more, of a plurality of pixels constituting the corrected back light photographic image.

According to the image revision section 810 shown in FIG. 38, treated as the revision values are new two thresholds instead of the two thresholds Sr1 and Sr2, which are computed from the G-value histogram H3, set up as the revision value for the initial subject mask is the threshold that is the first threshold Sr1 or less, and set up as the revision value for the initial background mask is the threshold that is the second threshold Sr2 or more. Two thresholds, which are treated as the revision values in the image revision section 810, correspond to an example of the "distinction reference" referred to in the present invention.

The revision value input section 811 causes the display screen 220a to display an input image plane. On the input image plane, those two thresholds are entered through an operator's operation of the keyboard 230 and the mouse 240. The revision value input section 811 transfers the entered two thresholds to the subject mask set up section 731c and the background mask set up section 731d, which are also shown in FIG. 16. Thus, there are set up new subject mask and background mask, which are expanded in a boundary area as compared with those concerned with the subject mask and the background mask set up using the first threshold Sr1 and the second threshold Sr2. As a result, the final two masks are also newly formed, so that the portion that the background appears through a part of the subject is much included in the boundary area as compared with a case where the original two initial masks are used.

In effect, the use of the image revision section 810 shown in FIG. 38 also makes it possible to obtain the same affect as the image revision section 760 that deals with the reduction amount.

According to the present embodiment, the retrieval range, which is set up when the subject color and the combination ratio α on a certain pixel in the boundary area are presumed, is a range on the pixel, and is a range that includes pixels of an area defined by the subject mask M1', the number of which pixels exceeds a predetermined number. Hence, the retrieval range is extended as a position of a pixel goes away from the area defined by the subject mask M1'. Hereinafter, there will be explained a method of setting up the retrieval range suppressing the expansion of the retrieval range as mentioned above, which is different from the present embodiment.

First, according to the different set up method, the presumption of the subject color and the combination ratio α is carried out from pixels closer to the area defined by the subject mask M1' in the boundary area.

Figure 39:
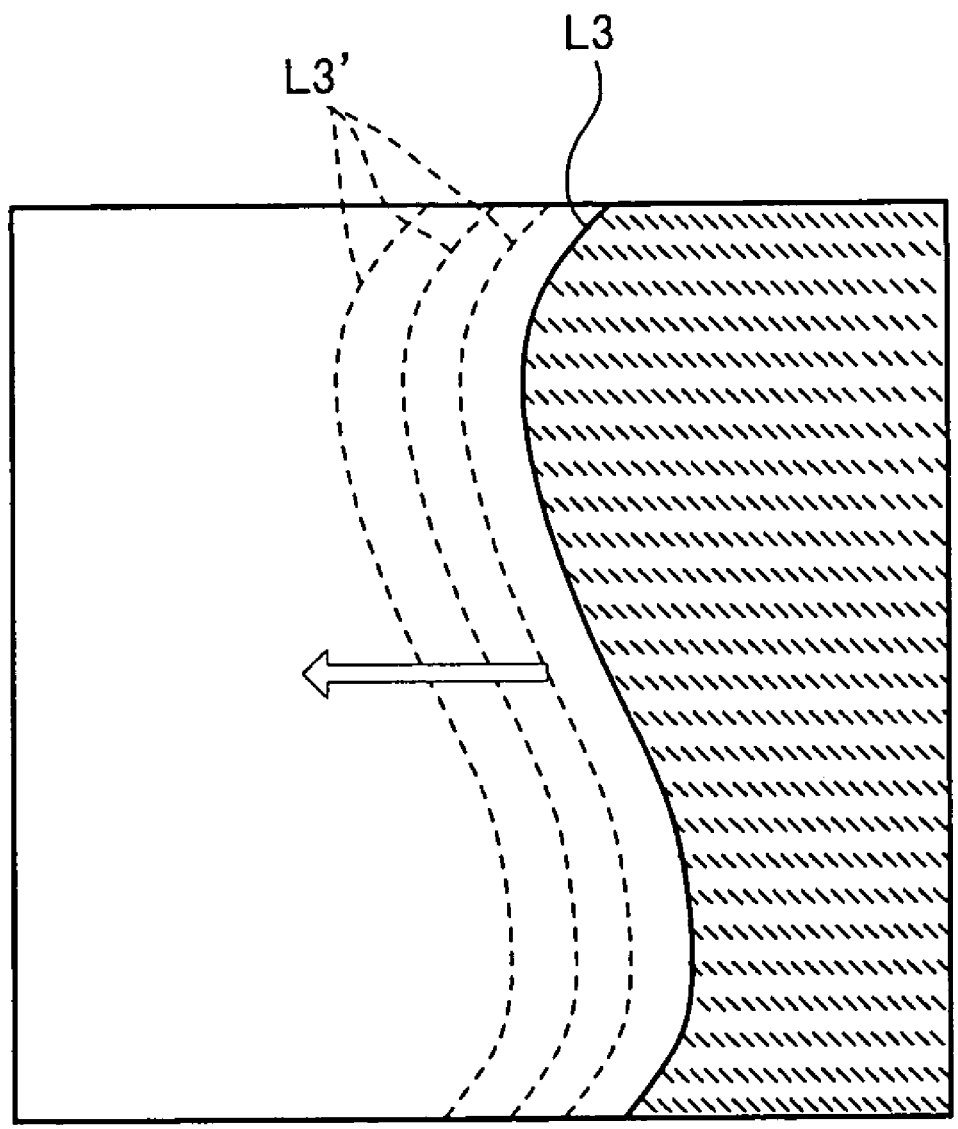
FIG. 39 is a typical illustration useful understanding a state that the presumption of the subject color and the combination ratio α is carried out from pixels closer to the area defined by the subject mask M1' in the boundary area.

FIG. 39 is a typical illustration useful understanding a state that the presumption of the subject color and the combination ratio α is carried out from pixels closer to the area defined by the subject mask M1' in the boundary area.

As shown in FIG. 39, according to the different set up method, the presumption of the subject color and the combination ratio α is carried out from the side of the outline L3 of the subject mask M1'. According to the different set up method, the pixels, which are presumed in the subject color, are regarded as the pixels in the area defined by the subject mask M1'. As a result, in the boundary area, there are formed apparent outlines (dotted lines L3') which are equal to the outline L3 of the subject mask M1'. The apparent outlines advance to the boundary area with the progress of the presumptions, as shown in FIG. 39.

According to the different set up method, setting up of the retrieval range is carried out using the apparent outlines (dotted lines L3') advanced to the boundary area.

Figure 40:
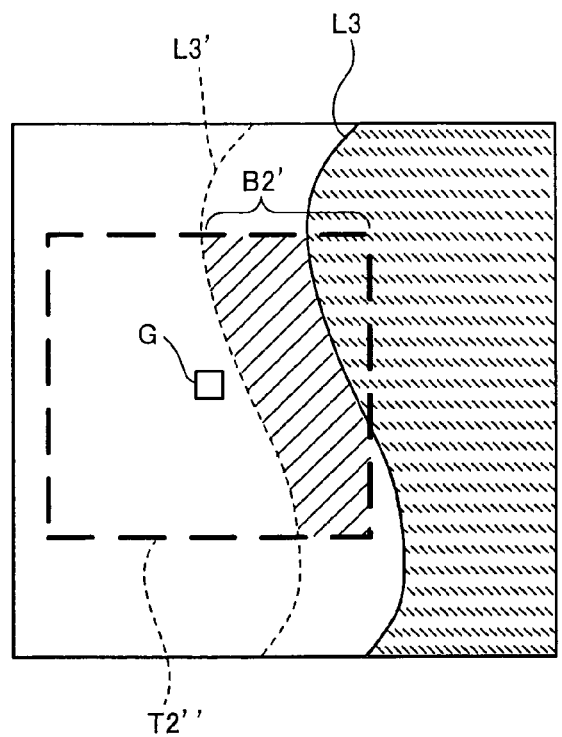
FIG. 40 is a typical illustration useful understanding a state that setting up of the retrieval range is carried out using the apparent outlines.

FIG. 40 is a typical illustration useful understanding a state that setting up of the retrieval range is carried out using the apparent outlines.

As shown in FIG. 40, according to the different set up method, as a retrieval range T2", there is set up a range that includes pixels of an area of the subject side starting from the apparent outline (dotted line L3'), the number of which pixels exceeds a predetermined number in the area of the subject side, on the pixel G in which the subject color and the combination ratio α are presumed. In an area B2' of the subject side starting from the apparent outline, in the retrieval range T2", the presumption of the subject color is carried out. In the presumption, the subject color, which is already presumed on pixels of the subject side starting from the apparent outline, is used as a candidate of the presumption.

In this manner, utilization for the presumption of the area B2' of the subject side starting from the apparent outline progressing in the boundary area whenever the presumption advances makes it possible to suppress the enlargement of the retrieval range on pixels of the positions apart from the outline L3 of the subject mask M1' too.

Incidentally, in the above description, as an embodiment of the background replacing apparatus according to the present invention, there is shown, by way of the example, the background replacing apparatus 700 in which created are two masks of the subject mask defining a range wherein the subject occupies in the corrected back light photographic image and the background mask defining a range wherein the background occupies in the corrected back light photographic image, and those two masks are used to perform a replacement of the background in the corrected follow light photographic image. However, the present invention is not restricted to this embodiment. As will be described hereinafter, for example, it is acceptable that a background replacing apparatus of the present invention creates only the background mask and uses only the background mask to perform a replacement of the background in the corrected follow light photographic image.

Hereinafter, there will be explained an example of a background replacing method using only the background mask. It is noted that the background mask is created in the same manner as a creation of the background mask by the mask creating section 731 shown in FIG. 15, and thus the redundant explanation for the creation of the background mask will be omitted.

In the background replacement using only the background mask, first, there is created a non-background mask, which defines an area excepting an area defined by the background mask on the corrected follow light photographic image, in accordance with the background mask. The area defined by the non-background mask is a combination area of an area defined by the subject mask and the boundary mask. On all the pixels in the area defined by the non-background mask, there is performed a presumption of the background color, the subject color and the combination ratio of those colors. It is noted that the background mask is presumed in the same manner as a presumption of the background mask by the background color presuming section 732*a* shown in FIG. 27, and thus the redundant explanation for the presumption of the background color will be omitted. Hereinafter, there will be explained mainly a method of presuming the subject.

Figure 41:
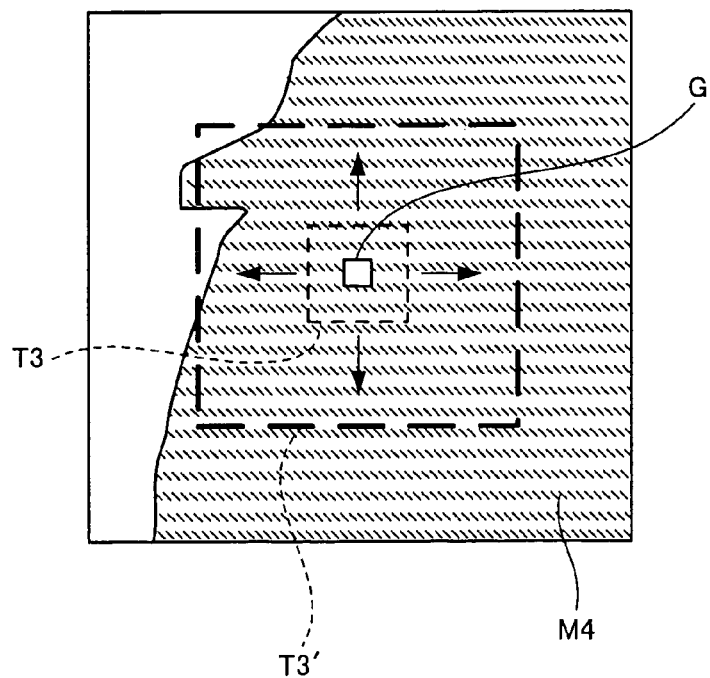
FIG. 41 is an illustration useful for understanding a state that when a subject color is estimated on a certain pixel in an area defined by a non-background mask, of the corrected follow light photographic image, a search range is set up on the pixel.

FIG. 41 is an illustration useful for understanding a state that when a subject color is estimated on a certain pixel in an area defined by a non-background mask, of the corrected follow light photographic image, a search range is set up on the pixel. FIG. 41 shows, by way of the example, a case where a combination area of the area defined by the subject mask M1' shown in FIG. 22 and the boundary area M3 is equivalent to an area defined by a non-background mask M4. The area defined by the non-background mask M4 corresponds to an example of "other areas excepting the background area in the photographic image" referred to in the present invention.

In order to set up a retrieval range on a certain pixel G in the area defined by the non-background mask M4, first, the retrieval range is gradually expanded starting from a square-like shaped predetermined initial range T3 on the pixel G. The expansion is stopped when the pixels in the area defined by the non-background mask M4 in the corrected follow light photographic image exceeds a predetermined number of pixels and are included in the retrieval range, and a retrieval range T3' at that time is set up as a retrieval range for the subject presumption.

When the retrieval range T3' is set up, the subsequent area in the corrected follow light photographic image is confirmed as an area used for presuming the subject color on the pixel G.

Figure 42:
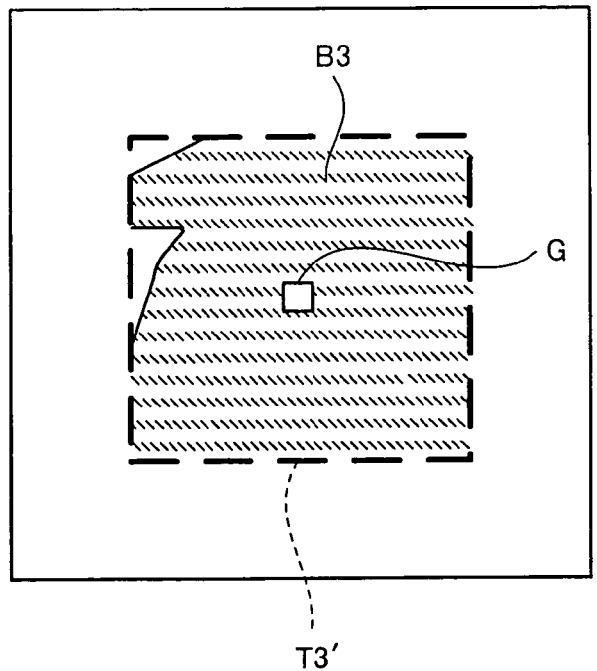
FIG. 42 is an illustration showing an example of an area used for estimating a subject color on a certain pixel.

FIG. 42 is an illustration showing an example of an area used for estimating a subject color on a certain pixel.

As seen from FIG. 42, as the area used for presuming the subject color on the pixel G, there is confirmed an area B3 in the corrected follow light photographic image, which is the area defined by the non-background area, and is in the retrieval range T3' set up in the manner as mentioned above.

Thus, when the area B3 used for presuming the subject color on the pixel G is confirmed, first, the color of the pixel G is confirmed, and then the subject color on the pixel G is retrieved, from among colors of a plurality of pixels in the area B3, in accordance with a retrieval method as set forth below.

Figure 43:
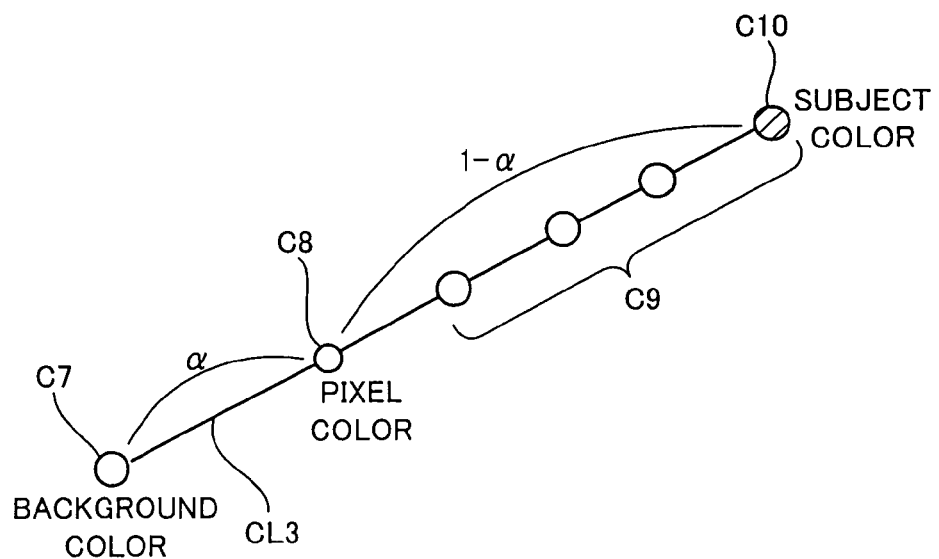
FIG. 43 is an illustration useful for understanding a method of searching a subject color on a certain pixel in an area defined by a non-background mask, of the corrected follow light photographic image.

FIG. 43 is an illustration useful for understanding a method of searching a subject color on a certain pixel in an area defined by a non-background mask, of the corrected follow light photographic image.

FIG. 43 shows, as to a certain pixel in a boundary area of the corrected follow light photographic image, a straight line CL3 coupling a background color C7 presumed with a color C8 of the pixel on the RGB color space.

The area defined by the non-background mask in the corrected follow light photographic image includes the boundary area as mentioned above. There is a possibility that the boundary area includes a portion that a background appears through a part of the subject at the time of photography, and as to the color of the pixel of such a portion, the background color is combined with the subject color into a combination color. In the event that the color of the pixel to be retrieved in the subject color is such a combination color, the color C8 of the pixel, which is the combination color, the background color C7 as the base of the color C8, and the subject color are lined up on the RGB color space.

Thus, there is first retrieved, from among colors of a plurality of pixels in the area B3, a color C9 lined up on the extended line of the straight line CL3. In the event that there exists a plurality of colors C9, there is adopted one color from among those colors C9, as the subject color.

The area defined by the non-background mask includes pixels having colors other than the subject colors, such as the pixel having the combination color, and the pixel having only the background. Hence, there is a high possibility that of the plurality of colors C9, the color farthest from the color C8 of the pixel is the subject color that is the base of the color C8 of the pixel together with the background color C7.

Thus, according to a method of retrieving the subject color from among the colors of the pixels in the area defined by the non-background mask, in the event that a plurality of colors C9 is lined up on the extended line of the straight line CL3, there is adopted the color farthest from the color C7 of the pixel, from among the plurality of colors C9, as a subject color C10 on the pixel.

When the subject color is presumed in the manner as mentioned above, as shown in FIG. 43, the ration of length of a line segment coupling on the RGB color space the background color C7 presumed by the background color presuming section 732a with the subject color C10 presumed by the subject color presuming section 732b to length of a line segment coupling the background color C7 with the color C8 of the pixel is computed in form of a combination ratio α where the color C8 of the pixel is combined with the background color C7 and the subject color C10.

According to the background replacement using only the background mask, processing from the set up of the retrieval range as mentioned above up to the computation of the combination ratio is executed on all the pixels in the area defined by the non-background mask in the corrected follow light photographic image.

When the presumption of the background color, the subject color and the combination ratio, as mentioned above, is completed, first, the area defined by the background mask in the corrected follow light photographic image is replaced by a different background of a customer's wish. Next, as to all the pixels in the area defined by the non-background mask in the corrected follow light photographic image, the combination color is determined in accordance with the method explained with reference to FIG. 31. Colors of all the pixels in the area defined by the non-background mask are replaced by the combination color to complete the background replaced image.

As to the pixels of the area occupied by only the subject in the area defined by the non-background mask, the combination ratio α is substantially "1". As a result, when the background is replaced, the color of the subject per se in the pixel is maintained. As to the pixels of the area occupied by only the background in the area defined by the non-background mask, the combination ratio α is substantially "0". As a result, when the background is replaced, the color of the pixel is completely replaced by a different background color.

Also the background replacement using only the background mask, which is explained with reference to FIG. 41 to FIG. 43, makes it possible, in a similar fashion to the image taking system 1, which is explained with reference to FIG. 1 to FIG. 36, to create a background replaced image wherein the background in the photographic image is naturally replaced by a background of a client wish.

For example, according to the background replacement using both the subject mask and the background mask, in the event that there is coming out of light emission color of the EL panel 130 in the area defined by the subject mask, there is a possibility, at the time of the background replacement, that coming out of light emission color of the EL panel 130 remains. According to the background replacement using only the background mask, however, it is possible to exactly estimate the subject color removing a color of coming out, since all the areas other than the area of the complete background color is the presumption object.

The above description is concerned with the embodiment in which the background replacement is carried out in accordance with either one of methods of the background replacement using both the subject mask and the background mask, and the background replacement using only the background mask. It is noted, however, that the present invention is not restricted to the present embodiment.

According to the background replacement using both the subject mask and the background mask, and the background replacement using only the background mask, it is possible to estimate the subject color in substantially similar fashion. However, the area B2, which is shown in FIG. 33 used for presumption of the subject color in the former method, is narrower in the range than the area B3, which is shown in FIG. 40 used for presumption of the subject color in the later method. Therefore, in some situation of the photographic image, according to the former method, it happens that there is detected no candidate of the subject color such as the colors C3 arranged on the extended line of the straight line CL1 shown in FIG. 34.

Accordingly, it is considered such a presumption method that first, the background replacement using both the subject mask and the background mask is adopted to perform the presumption of the subject color. In the event that there is detected no candidate of the subject color, the background replacement using only the background mask is adopted to perform the presumption of the subject color, so that the candidate of the subject color is detected from the area B3 shown in FIG. 40, which is larger in range than the area B2 shown in FIG. 33.

The accuracy of the presumption of the subject color according to the above-mentioned two presumption methods is substantially same as one another. In some situation of the photographic image, however, it happens that either one of the above-mentioned two presumption methods offers greater accuracy somewhat. Consequently, for example, it is considered that the above-mentioned two types of presumption methods are combined in the manner as set forth below to emphasize the presumption accuracy.

For example, in the event that the subject color and the combination ratio α are estimated in accordance with the above-mentioned two presumption methods, or in the event that only the combination ratio α, which is obtained in accordance with either one of the above-mentioned two presumption methods, is closer to "0" and "1", for some reason, there is a high possibility that accuracy of the presumption according to the presumption method is lower than accuracy of the presumption according to another presumption method. Accordingly, there is considered such a method that the subject color and the combination ratio α are estimated in accordance with the above-mentioned two presumption methods, and it is determined whether only one combination ratio α of two combination ratios α offers a predetermined first threshold close to "0" or a predetermined second threshold close to "1", and in the event that it is decided that only one combination ratio α of two combination ratios α offers the predetermined second threshold close to "1", the subject color associated with another combination ratio α is adopted.

Further, in order to obtain the presumption result with the average precision between the above-mentioned two presumption methods, there is considered a method in which the average color of two sorts of subject colors, which are presumed in accordance with the above-mentioned two presumption methods, is adopted as the subject colors.

According to the above-mentioned three ways of presumption methods, it is possible to emphasize the presumption accuracy as compared with a case where the subject color is estimated by either one of the background replacement using both the subject mask and the background mask and the background replacement using only the background mask.

Incidentally, the above-mentioned explanation is concerned with an example assuming that a background to be replaced by a customer's wish is one. It is acceptable, however, that a background replacing apparatus of the present invention is constructed, for example, in such a manner that the number of backgrounds to be replaced by a customer's wish is a plural and the background replacing apparatus is capable of effectively coping with the plurality of backgrounds to be replaced, as will be explained hereinafter.

Figure 44:
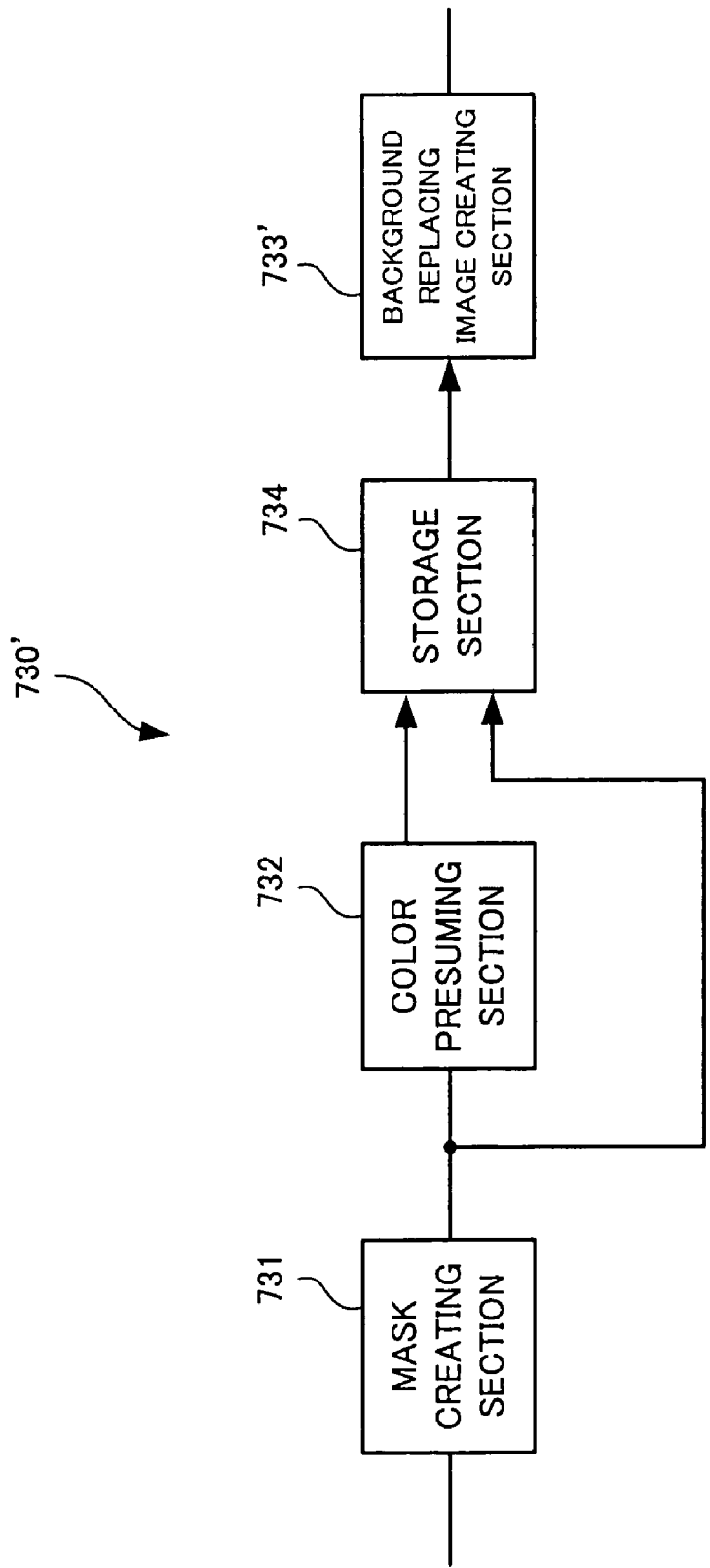
FIG. 44 is a view of a replacement processing section that is capable of effectively coping with the plurality of backgrounds to be replaced, which is different from the replacement processing section 730 shown in FIG. 15.

FIG. 44 is a view of a replacement processing section that is capable of effectively coping with the plurality of backgrounds to be replaced, which is different from the replacement processing section 730 shown in FIG. 15. In FIG. 44, the same parts are denoted by the same reference numbers as those of FIG. 15, and the redundant explanation will be omitted.

A replacement processing section 730' shown in FIG. 44 is constructed in such a manner that the replacement processing section 730 shown in FIG. 15 additionally includes a storage section 734 for storing the presumed subject color and the combination ratio α. The storage section 734 corresponds to an example of the storage section referred to in the present invention.

In the replacement processing section 730', the mask creating section 731 creates a background mask and a subject mask on a photographic image, and the color presuming section 732 presumes the subject color and the combination ratio α. The background mask, the subject mask, the subject color, and the combination ratio α are stored in the storage section 734. Further, in the replacement processing section 730', a background replacing image creating section 733' creates a background replacing image using the background mask, the subject mask, the subject color, and the combination ratio α stored in the storage section 734.

According to the replacement processing section 730' shown in FIG. 44, when once the background mask, the subject mask, the subject color, and the combination ratio α are determined, even if a plurality of backgrounds to be replaced is concerned, the background mask, the subject mask, the subject color, and the combination ratio α are applied to all the backgrounds to be replaced. Thus, it is possible, for example, to save trouble for determining the background mask, the subject mask, the subject color, and the combination ratio α, and thereby effectively creating the background replacing image.

Further according to the embodiment as mentioned above, as shown in FIG. 6, there is explained the color correcting section 724 for applying the color correcting processing to color of the effective image that is created in accordance with the follow light photographic image, of the image correcting section 720. However, the present invention is not restricted to the present embodiment. According to a background replacing apparatus of the present invention, it is acceptable that the replacement processing section applies the color correcting processing to the presumed subject color, but not to the color of the effective image, as will be explained hereinafter.

Figure 45:
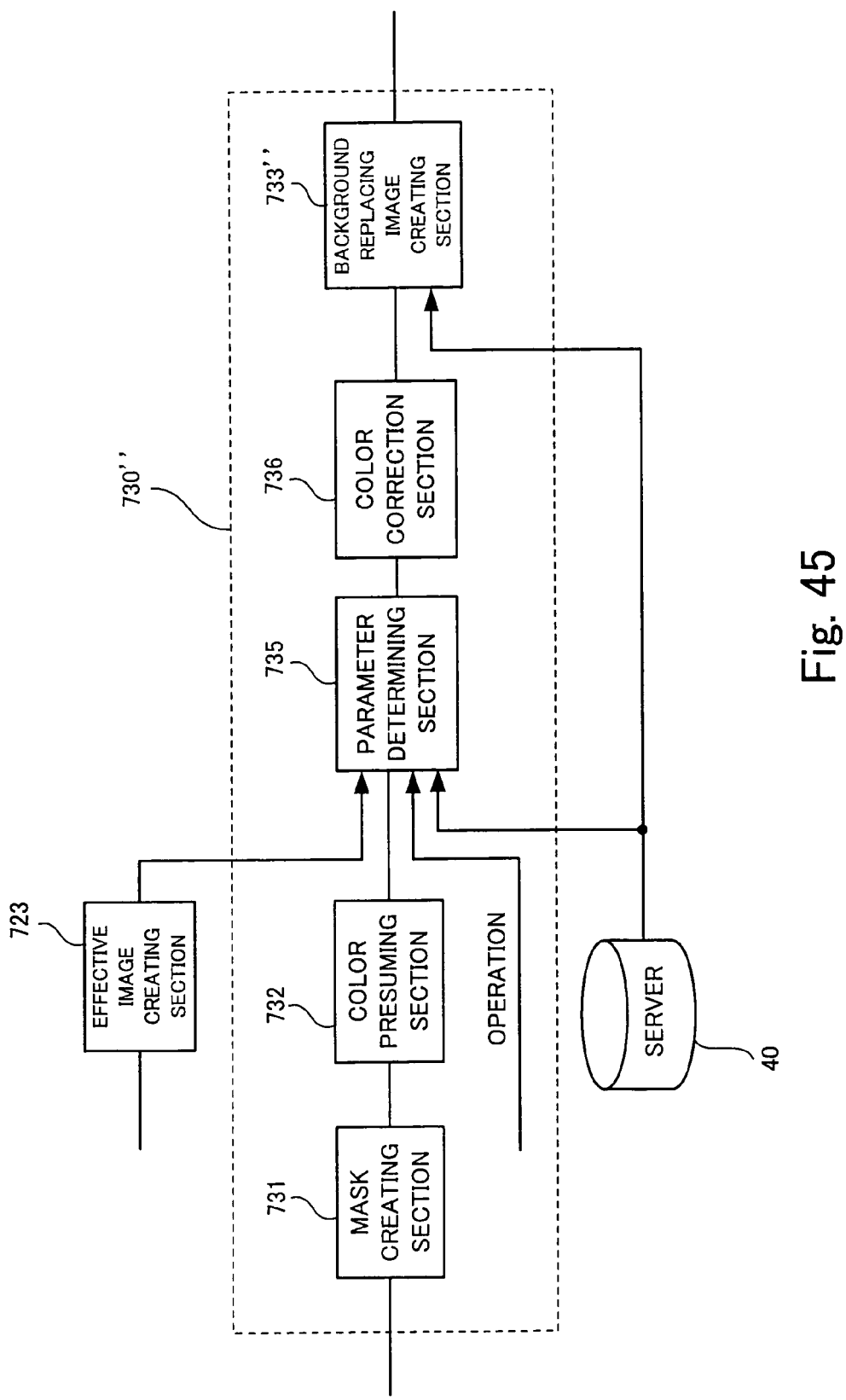
FIG. 45 is a view of a replacement processing section having a color correcting section for applying the color correcting processing to the presumed subject color, which is different from the replacement processing section 730 shown in FIG. 15.

FIG. 45 is a view of a replacement processing section having a color correcting section for applying the color correcting processing to the presumed subject color, which is different from the replacement processing section 730 shown in FIG. 15. In FIG. 45, the same parts are denoted by the same reference numbers as those of FIG. 15, and the redundant explanation will be omitted.

A replacement processing section 730" shown in FIG. 45 is constructed in such a manner that the replacement processing section 730 shown in FIG. 15 additionally includes a parameter determining section 735 for determining a correction parameter used in color correction for the subject color, and a color correction section 736 for applying the color correction to the subject color, using the correction parameter determined by the parameter determining section 735. The parameter determining section 735 shown in FIG. 45 corresponds to an example of the first parameter determining section, the second parameter determining section, the third parameter determining section, and the fourth parameter determining section referred to in the present invention. The color correction section 736 shown in FIG. 45 corresponds to an example of the first color correction section, the second color correction section, the third color correction section, and the fourth color correction section referred to in the present invention.

In the replacement processing section 730", the color correction section 736 performs a color correction addressed as a so-called set up in which the color shade and the white balance are corrected for a color of the area defined by the subject area and the presumed subject color to the color shade and the white balance which are generally deemed to be preferable for a person. The parameter determining section 735 determines a correction parameter (a set up parameter) which is used for the set up.

The parameter determining section 735 shown in FIG. 45 has a function of determining the set up parameter in accordance with the effective image created on the basis of the follow light photographic image in the effective image creating section 723, a function of determining the set up parameter in accordance with the portion other than the background of the image in which the color of the boundary area is replaced with the subject color presumed in the color presuming section 732, a function of determining the set up parameter to a parameter according to an operation, and a function of determining the set up parameter in accordance with a background for replacement. It is determined by an operator's operation through an operational screen (not illustrated) as to what function of the above-mentioned four types of functions is used to determine the set up parameter. The set up using the set up parameter, which is determined by the parameter determining section 735, is applied to the color of the area defined by the subject area and the presumed subject color, as mentioned above.

For example, in the photo-studio 10 shown in FIG. 1, it happens that in some situation of photography, the white balance at the time of photography by the digital camera 11 may be affected by the indigo blue which is the luminescent color of the EL panel 130. In this case, for example, a person's face may come out paler than life. However, according to the set up by the color correction section 736 shown in FIG. 45, it is possible to correct the color of the person's face to a preferable color.

As in the color correcting section 724 shown in FIG. 6, in the event that the color correcting processing is applied to the effective image that is created in accordance with the follow light photographic image, in some situation of the photographic image, it may happen that the presumption of the subject color is carried out incorrectly, for example, by the reason that the gradation of the photographic image is altered. Further, in the event that the set up is applied to the image after the background replacement, there is a possibility that a color of the background for replacement is also altered so that an image of background, which is different in color shade from a customer's wished background. According to the set up by the parameter determining section 735 and the color correction section 736, which are shown in FIG. 45, the set up is carried out after the presumption of the subject color and before the replacement of the background. Thus, it is possible to perform the set up without having an effect on the presumption of the subject color and the color of the background for the replacement, and thereby obtaining a high picture quality of image in which a background is replaced.

Further, according to the example shown in FIG. 45, applied to the background for the replacement, which is stored in the server 40, is relation information representative of a relative positional relation in an image between the subject and the background and a relative size of the subject to the background in the image. When a background replaced image creating section 733" of FIG. 45 creates a background replaced image using a background for replacement, which is a client's wished background, the background replaced image creating section 733" creates the background replaced image in such a manner that the relative relation in the background replaced image between the subject and the background is the same relative relation as the relative relation which is applied to a background for replacement, which is a client's wished background. This processing makes it possible to obtain a background replaced image enhanced in naturalness to look at in which for example, position and size of the subject in the background replaced image are natural ones to the background.

Next, there will be explained a second embodiment.

The second embodiment is different from the first embodiment in points such as the structure of the photo-studio of the image taking system, the photographic processing to be carried out in the photo-studio and the background replacement processing to be carried out in the personal computer. Hereinafter, there will be described different points from the first embodiment. In following figures, the same reference numbers as those of FIG. 1 to FIG. 37 denote the same parts, and the redundant description will be omitted.

Figure 46:
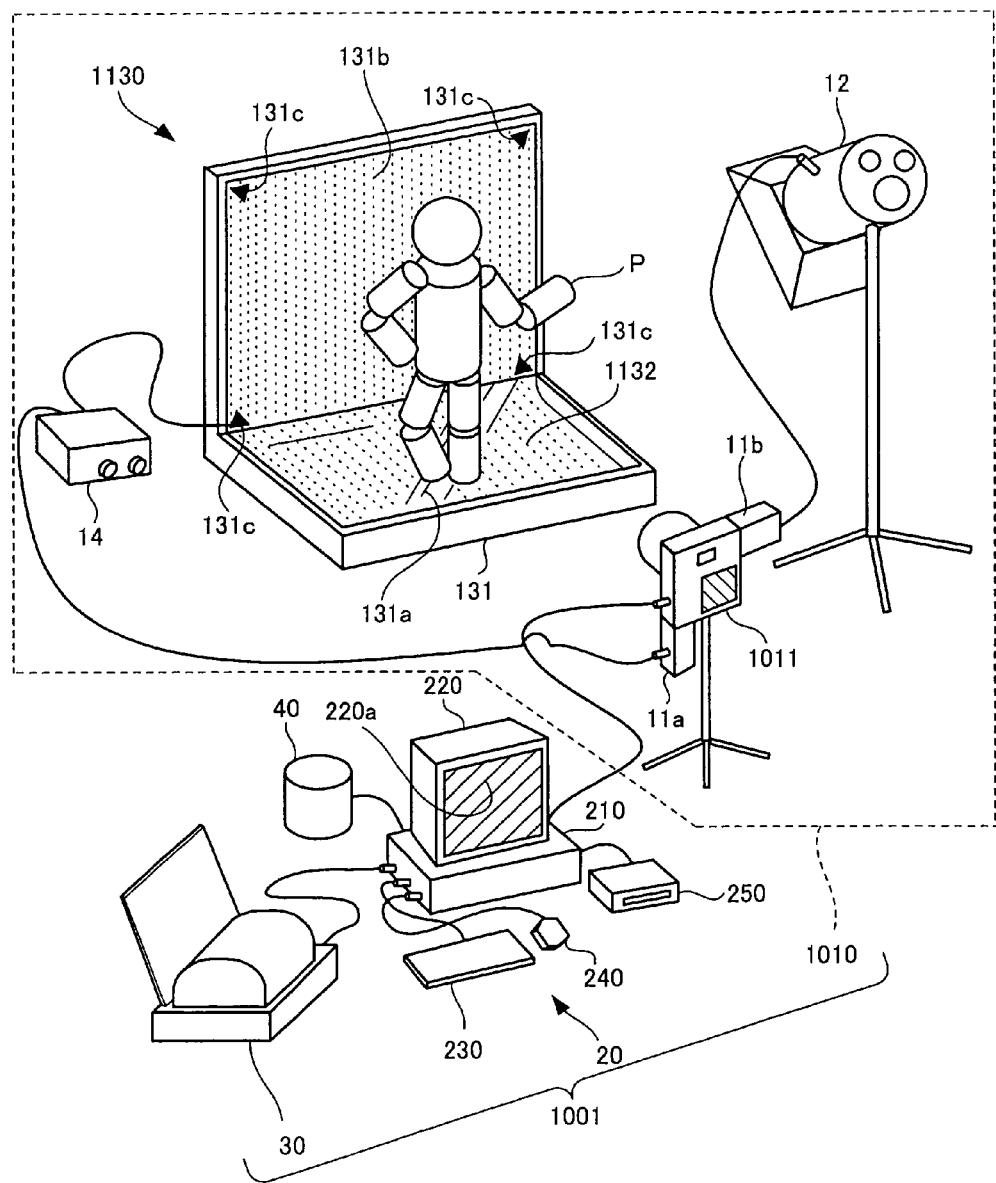
FIG. 46 is a construction view of an image taking system, to which a second embodiment of a background replacing apparatus of the present invention is applied.

FIG. 46 is a construction view of an image taking system, to which a second embodiment of a background replacing apparatus of the present invention is applied.

An image taking system 1001 shown in FIG. 38 comprises: a photo-studio 1010 for obtaining a photographic image through photography of the subject; a personal computer 20 that is operated in form of a second embodiment of a background replacing apparatus of the present invention, in which the subject of the photographic image is distinguished from the background, so that the background of the photographic image is replaced with a desired background to create a background replaced image; a printer 30; and a server 40. The photo-studio 1010 comprises a digital camera 1011, a flashlight emitting device 12, an EL (Electro-Luminescence) panel 1130, and a power source 14 for driving the EL panel.

The digital camera 1011 has a multi-page function, in which when an operator depresses a shutter button once, three times photography for a subject P is automatically carried out for a short time. A photographic image, which is obtained through a first photography, is temporarily stored in a memory of the digital camera 1011. In the image taking system 1001, the digital camera 1011 is connected to the personal computer 20, and at the time point that a third photography is completed, a photographic image, which is obtained through the third photography, is directly transmitted to the personal computer 20.

The digital camera 1011 is provided with a panel turn-on control circuit 11a and a flashlight control circuit 11b, which will be described later. The digital camera 1011 is connected via the panel turn-on control circuit 11a to the power source 14, and is also connected via the flashlight control circuit 11b to the flashlight emitting device 12. In the multi-page photography, the digital camera 1011 transmits, for every photography, first, to the power source 14 a panel turn-on instruction signal that instructs the power source 14 for the EL panel 1130 to turn on the EL panel 1130, and then transmits to the flashlight emitting device 12 a flashlight instruction signal that instructs the flashlight emitting device 12 to emit the flashlight. The panel turn-on control circuit 11a blocks the panel turn-on instruction signal, which is emitted from the digital camera 1011 for every time of a multi-page photography, at the time of a first photography, and permits the panel turn-on instruction signal to pass at the time of second and third photography. The flashlight control circuit 11b permits the flashlight instruction signal to pass at the time of first and second photography, and blocks the flashlight instruction signal at the time of the third photography. As a result, as to the multi-page photography: at the time of the first photography, there is performed only input of the flashlight instruction signal to the flashlight emitting device 12; at the time of the second photography, first, the panel turn-on instruction signal is inputted to the power source 14, and then the flashlight instruction signal is inputted to the flashlight emitting device 12; and at the time of the third photography, there is performed only input of the panel turn-on instruction signal to the power source 14.

Upon receipt of the flashlight instruction signal from the digital camera 1011, the flashlight emitting device 12 emits flashlight to the subject P. As mentioned above, the flashlight emitting device 12 receives the flashlight instruction signal only at the time of the first and second photography in the multi-page photography in the digital camera 1011. Thus, the flashlight emitting device 12 emits the flashlight at the time of the first and second photography only, and the flashlight emitting device 12 turns off at the time of the third photography.

The EL panel 1130 comprises: a cover member 131 having a loading plane 131a for loading with the subject P and a rear plane 131b located at the back of the subject P, which are transparent; and a dispersion type of EL device 1132 that is housed in the cover member 131. A power source 14 serves as a power source for applying a driving voltage to the dispersion type of EL device 1132. Further as mentioned above, the power source 14 receives the panel turn-on instruction signal only at the time of the second and third photography in the multi-page photography in the digital camera 1011. Thus, the power source 14 turns on the EL panel 1130 at the time of the second photography. When the power source 14 receives the panel turn-on instruction signal at the time of the third photography, the power source 14 maintains a turn-on of the EL panel 1130.

According to the general dispersion type of EL device, it is possible to adjust the luminescent color to various colors including white through further mixing of a plurality of fluorescent powders mutually different from one another in luminescent color at the time of the manufacture. To the contrary, according to the dispersion type of EL device 1132 of the present embodiment, the luminescent color is adjusted by the fluorescent powders of red. As a result, the color of the EL panel 1130 offers thin red at the time of the turn-off, and offers, at the time of light emission, blue that is adjusted in indigo blue which is the luminescent color of the dispersion type of EL device 1132.

According to the photo-studio 1010 of the present embodiment, photography by the digital camera 1011 is carried out, as mentioned above, in such a way that the first photography is carried out in the state that the EL panel 1130 turns off and the flashlight emitting device 12 emits flashlight, the second photography is carried out in the state that the EL panel 1130 turns on and the flashlight emitting device 12 emits flashlight, and the third photography is carried out in the state that the EL panel 1130 turns on and the flashlight emitting device 12 turns off. Further, according to the photo-studio 1010 of the present embodiment, the luminance of the flashlight emitted from the flashlight emitting device 12 is extremely higher as compared with luminance when the EL panel 1130 turns on. As a result, according to the second photography as well as the first photography, there is obtained a follow light photographic image, in which the subject P is clearly photographed, through photography in a follow light state that a flashlight, which is higher in luminance than the luminance of the EL panel 1130, is projected from the side of the digital camera 1011 to the subject P. Further, as mentioned above, the color of the EL panel 1130 offers thin red at the time of the turn-off, and offers blue at the time of light emission. As a result, as to the follow light photographic image associated with the first photography, the background offers thin red, and as to the follow light photographic image associated with the second photography, the background offers blue. Two follow light photographic images, which are mutually different in the background color, correspond to an example of the "plurality of photographic images generated through photography of a common subject under a plurality of photographic conditions mutually different in color of background". According to the third photography, there is obtained a back light photographic image, in which an image of the subject P is biased to the shadow side and an image of the EL panel 1130 is biased to the highlight side, through photography in a back light state that only light from the EL panel 1130 is projected from the back to the subject P. In this manner, according to the present embodiment, the multi-page photography of the digital camera 1011 makes it possible to obtain three photographic images of two follow light photographic images, which are mutually different in the background color, and one back light photographic image.

Next, there will be explained a flow of work in which a second embodiment of a background replacing method of the present invention, which is carried out by the image taking system 1001 shown in FIG. 46, is applied. In the following figures, the same reference numbers as those of FIG. 46 denotes the same parts.

Figure 47:
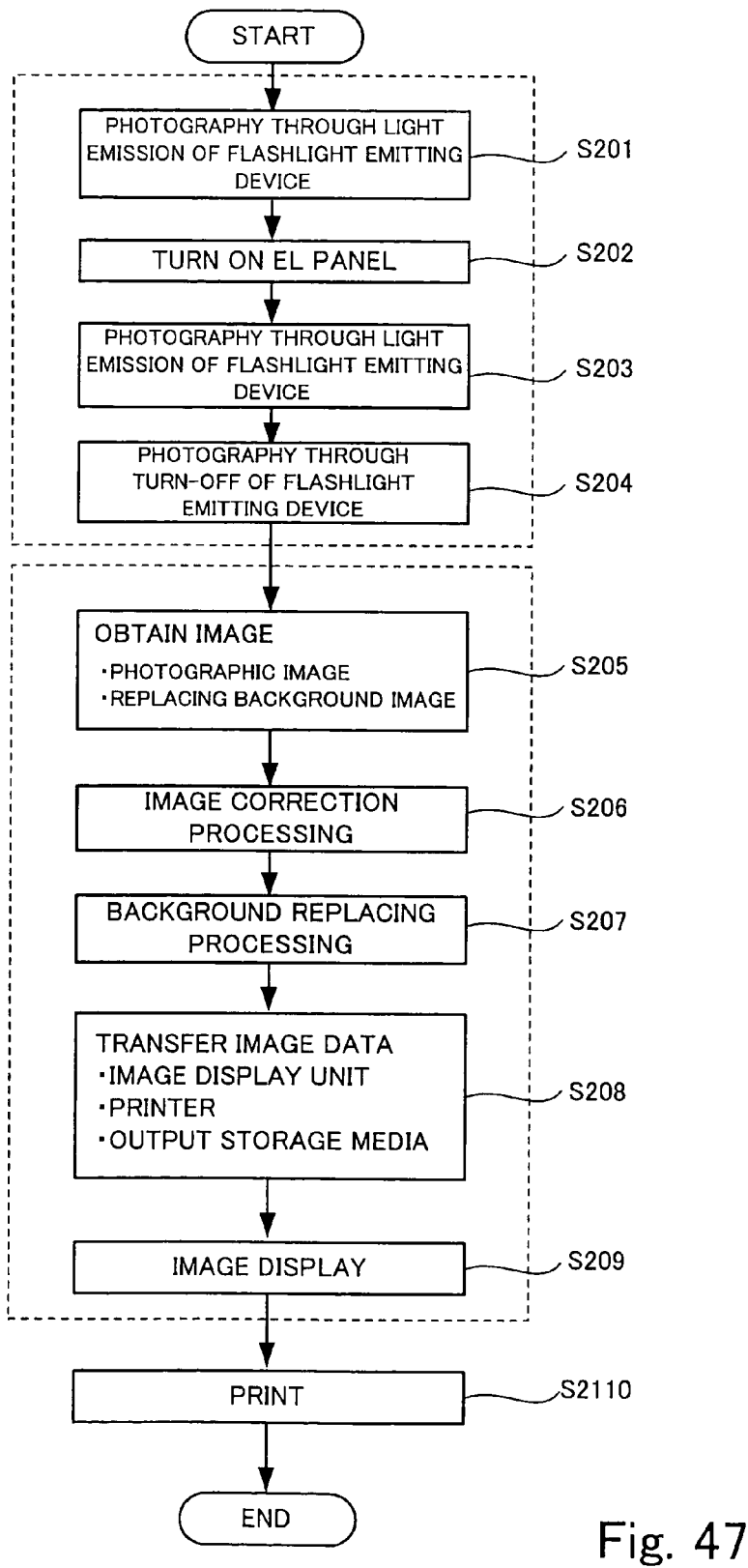
FIG. 47 is a flowchart useful for understanding a second embodiment of a background replacing method of the present invention, which is carried out by the image taking system shown in FIG. 46.

FIG. 47 is a flowchart useful for understanding a second embodiment of a background replacing method of the present invention, which is carried out by the image taking system shown in FIG. 46.

The work shown in the flowchart of FIG. 47 is carried out on the assumption that in the photo-studio 1010, the subject P, the digital camera 1011 and the flashlight emitting device 12 are arranged at their suitable positions, respectively, and the EL panel 1130 turns off.

When an operator depresses a shutter button of the digital camera 1011 after adjustments of focus and exposure, the photography for the subject P is carried out continuously three times.

First, in the first photography, the flashlight emitting device 12 is in response to the flash instruction signal transmitted from the digital camera 1011 to emit flashlight, so that photography for the subject P is carried out in the state of the follow light by the flashlight (step S201). At the time of the first photography, the EL panel 1130 turns off to offer the thin red.

In the second photography, first, the EL panel 1130 is in response to the panel turn-on instruction signal transmitted from the digital camera 1011 to turn on (step S202). Next, the flashlight emitting device 12 is in response to the flash instruction signal transmitted from the digital camera 1011 to emit flashlight, so that photography for the subject P is carried out in the state of the follow light by the flashlight (step S203). At the time of the second photography, the EL panel 1130 emits light with blue.

Subsequently, the third photography is carried out in a state that the flashlight emitting device 12 turns off, that is, in the back light state by the illumination of only the EL panel 1130 (step S204).

Three photographic images of two follow light photographic images mutually different in the background color and the back light photographic image, which are obtained through the step S202 to the step S204, respectively, are temporarily stored in a memory of the digital camera 1011.

Next, there will be explained processing following step S205 of the flowchart of FIG. 39. Of the processing, which will be described hereinafter, processing of the step S205 to the step S207 corresponds to the second embodiment of a background replacing method of the present invention.

When the third photography is carried out through the processing of the step S204 and the storage of the photographic image obtained through the third photography into the memory of the digital camera 1011 is completed, three photographic images obtained through three times photography, which are temporarily stored in the memory, are immediately transferred to the personal computer 20. In step S205, when a customer operates the personal computer 20, a desired background is read out from the server 40 or some input storage media. The obtaining processing for the photographic images and the backgrounds, which are executed in the step S205, corresponds to an example of the image obtaining step in the background replacing method of the present invention.

In step S206, the three photographic images are subjected to the image correction processing including the correction of the trapezoidal distortion.

In step S207, there is carried out a background replacing processing (it will be described later), in which a background replaced image is created in accordance with the corrected photographic images. Here, in the background replacing processing to be carried out in the step S207, examples of an area distinguishing process, a mixing state presuming process and a background replacing process in a background replacing method of the present invention are executed, respectively.

Details of the respective processing of the second embodiment of a background replacing method of the present invention from the step S205 to the step S207 will be described in conjunction with functions of the respective section of the second embodiment of a background replacing method of the present invention.

Next, image data representative of the background replaced image created in the background replacing processing (the step S207) is first transferred to the image display unit 220, and then transferred to at least one of the printer 30 and the output storage media of a customer's wish (step S208). In the image display unit 220, the background replaced image is displayed on the display screen 220a in accordance with the transferred image data (step S209). In the event that the image data is transferred to the printer 30, the printer 30 prints the background replaced image in accordance with the image data (step S210).

The processing of the step S205 to the step S209 including the second embodiment of the background replacing method of the present invention is executed in the personal computer 20.

Next, there will be described a second embodiment of a background replacing program related to the present invention, and a second embodiment of a background replacing program storage medium of the present invention.

Figure 48:
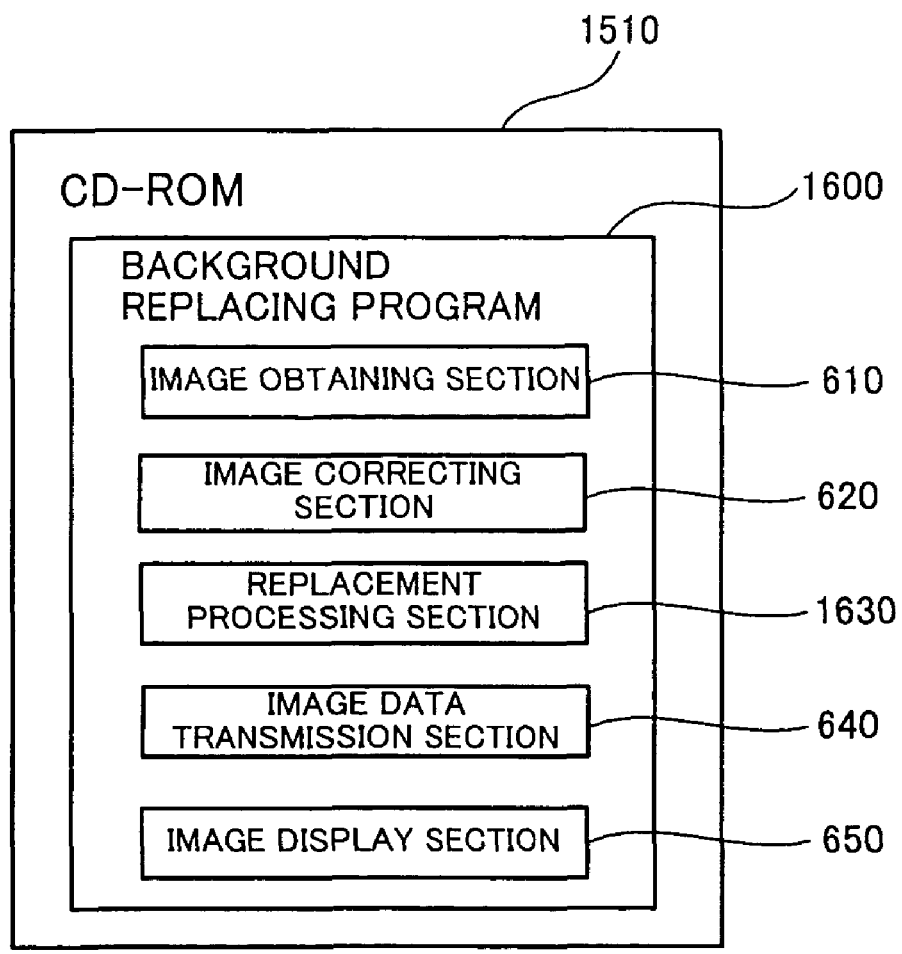
FIG. 48 is a view useful for understanding a second embodiment of a background replacing program storage medium of the present invention storing a second embodiment of a background replacing program related to the present invention.

FIG. 48 is a view useful for understanding a second embodiment of a background replacing program storage medium of the present invention storing a second embodiment of a background replacing program related to the present invention.

A CD-ROM 1510 shown in FIG. 48 stores therein a background replacing program 600, and corresponds to a second embodiment of a background replacing program storage medium of the present invention.

The background replacing program 600 comprises an image obtaining section 610, an image correcting section 620, a replacement processing section 1630, an image data transmission section 640, and an image display section 650.

As to details of every element of the background replacing program 1600, they will be described in conjunction with functions of respective sections of the background replacing apparatus of the present invention. In the following figures, the same reference numbers as those of FIG. 46 and FIG. 48 denote the same parts.

Figure 49:
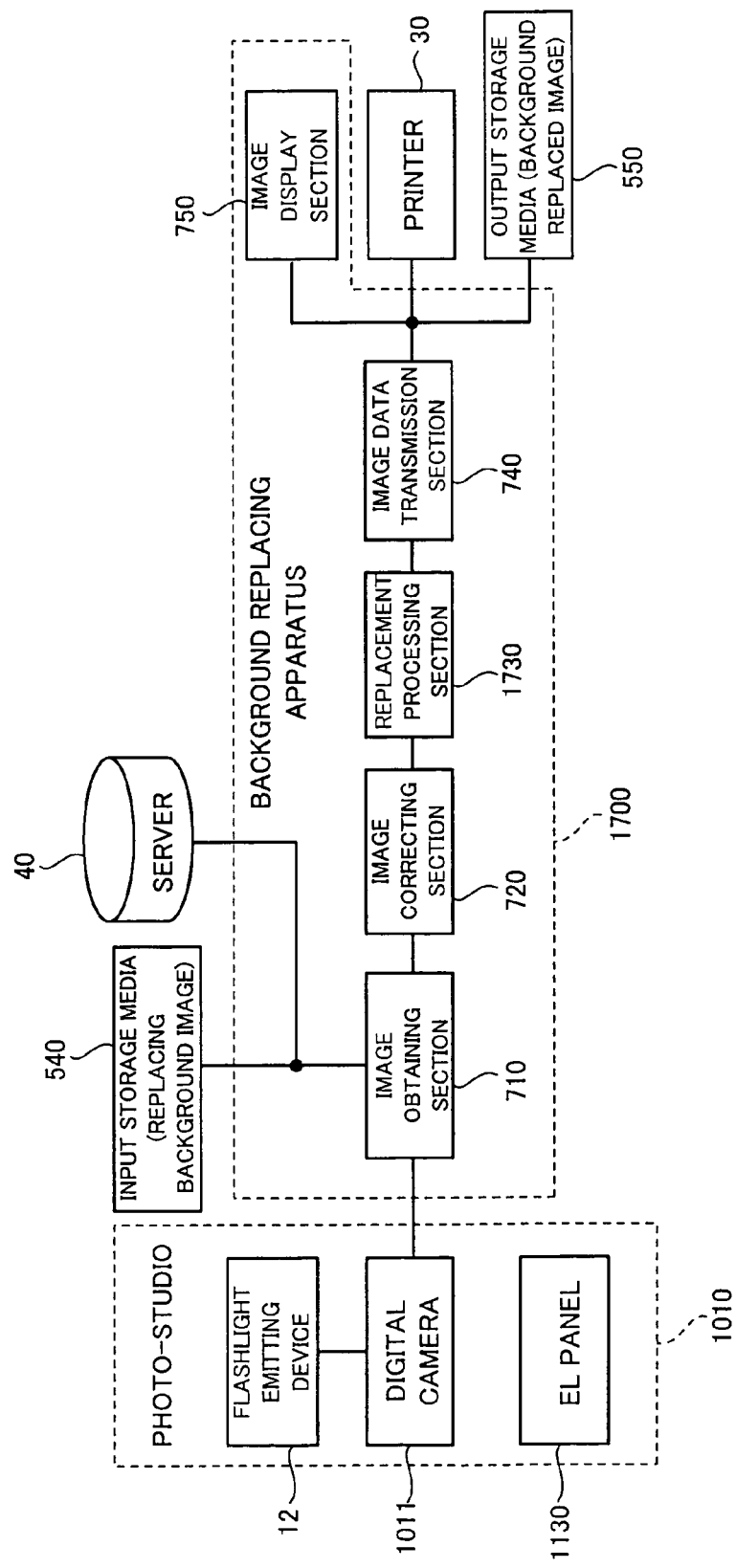
FIG. 49 is a functional block diagram of elements for operating the personal computer shown in FIG. 46 and FIG. 3 in form of a second embodiment of a background replacing apparatus of the present invention, when the background replacing program shown in FIG. 48 is installed in the personal computer shown in FIG. 46.

FIG. 49 is a functional block diagram of elements for operating the personal computer shown in FIG. 46 and FIG. 3 in form of a second embodiment of a background replacing apparatus of the present invention, when the background replacing program shown in FIG. 48 is installed in the personal computer shown in FIG. 46 and FIG. 3. FIG. 49 also shows: the photo-studio 1010 comprising the digital camera 1011, the flashlight emitting device 12, and the EL panel 1130; the printer 30; and the server 40.

According to a background replacing apparatus 1700 shown in FIG. 49, there is executed such background replacing processing that the digital camera 1011 of the photo-studio 1010 is used to obtain two follow light photographic images mutually different in the background color, which are photographed under the follow light, and a back light photographic image, which is photographed under the back light, and a subject and a background in a predetermined one of the two follow light photographic images are distinguished from one another in accordance with the back light photographic image, of those three photographic images, so that the background is replaced by a desired background. The background replacing apparatus 1700 comprises an image obtaining section 710, an image correcting section 720, a replacement processing section 1730, an image data transmission section 740, and an image display section 750.

Hereinafter, there will be explained the present embodiment on the assumption that the background replacing processing is carried out on the follow light photographic image that is thin red in the background color, that is, the follow light photographic image obtained through the first photography in the multi-page photography, of the two follow light photographic image as mentioned above. However, the present invention is not restricted to the present embodiment, and it is acceptable that the background replacing processing is carried out on the follow light photographic image that is blue in the background color, that is, the follow light photographic image obtained through the second photography in the multi-page photography.

The replacement processing section 1730 performs a background replacement processing in such a manner that a background replaced image is created in accordance with the three photographic images subjected to the image correcting processing by the image correcting section 720. The replacement processing section 1730 is substantially constructed in such a manner that the CPU 211 of the personal computer 20 operates in accordance with the replacement processing section 1630 of the background replacing program 1600. As to details of the replacement processing section 1730, it will be described later in conjunction with details of the replacement processing with reference to other figures. The replacement processing section 1730 corresponds to an example of one serving as the area discriminating section, the mixing state presuming section and the background replacing section of the background replacing apparatus of the present invention.

Next, hereinafter, there will be described details of the replacement processing section 1730 shown in FIG. 49.

The replacement processing section 1730 replaces the background of the corrected follow light photographic image associated with the first photography, of the two corrected follow light photographic images mutually different in the background color. At that time, the replacement processing section 1730 first discriminates each of the two corrected follow light photographic images among a subject area, a background area, and a boundary area interposed between the subject area and the background area. The replacement processing section 1730 retains the subject area of the corrected follow light photographic image associated with the first photography, and replaces the background area by another background of a customer's wish.

The replacement processing section 730 presumes, on the assumption that the whole pixels of the boundary area of the corrected follow light photographic image have the combination color as mentioned above, through using the two corrected follow light photographic images, the subject color (corresponding to an example of the subject color referred to in the present invention) that is the base of a combination of colors of the pixels, which is common between the two corrected follow light photographic images, and the combination ratio (corresponding to an example of the mixing ratio referred to in the present invention) of the subject color and the respective background color.

Thus, the replacement processing section 1730 replaces, as to the corrected follow light photographic image associated with the first photography, the colors of the pixels of the boundary area by a combination color in which the presumed subject color is combined with the different background color of the customer's wish at the presumed combination ratio.

Figure 50:
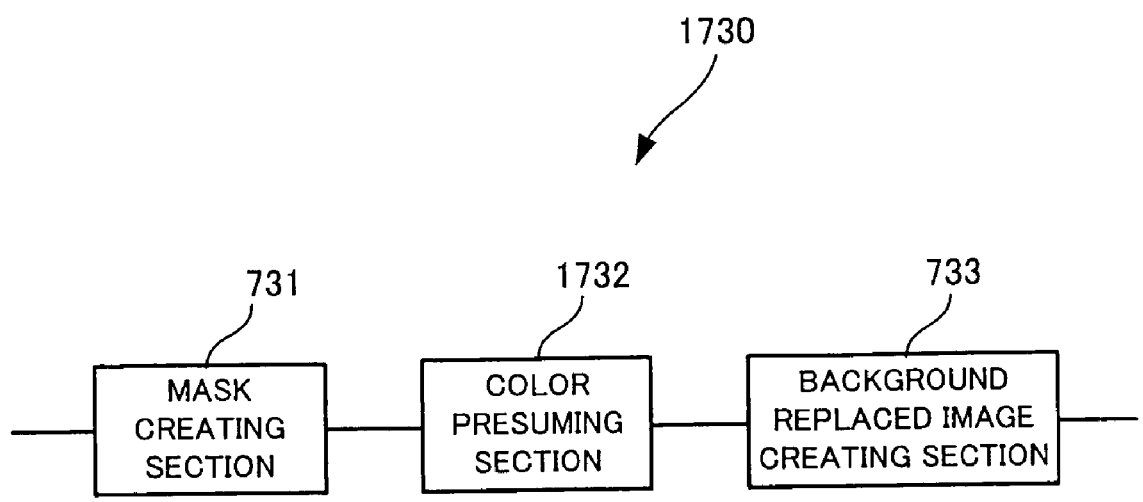
FIG. 50 is an explanatory view useful for understanding details of the replacement processing section shown in FIG. 49.

FIG. 50 is an explanatory view useful for understanding details of the replacement processing section shown in FIG.

49. In the following figures, the same reference numbers as those of FIG. 49 denotes the same parts.

The replacement processing section 1730 executes the above-mentioned background replacement processing. The replacement processing section 1730 comprises a mask creating section 731, a color presuming section 1732, and a background replaced image creating section 733. The mask creating section 731, the color presuming section 1732, and the background replaced image creating section 733 correspond to the examples of the area discriminating section, the mixing state presuming section, and the background replacing section, of the background replacing apparatus of the present invention, respectively. The mask creating section 731 executes an example of the area discriminating step of the background replacing method of the present invention. The color presuming section 1732 executes an example of the mixing state presuming step of the background replacing method of the present invention. The background replaced image creating section 733 executes an example of the background replacing step of the background replacing method of the present invention.

First, there will be explained outlines of those structural elements.

The mask creating section 731 creates, as to the corrected back light photographic image, a subject mask that defines a range in which only pixels of the subject color exist, and a background mask that defines a range in which only pixels of the background color exist. Those two masks are created with a gap in such a way that the pixels of the portion that the background appears through the subject, as shown in FIG. 14 for instance, are excluded from the ranges defined by those masks.

The color presuming section 1732 applies the subject mask and the background mask, which are created by the mask creating section 731, to the two corrected follow light photographic image which are mutually different in the background, and first, in the follow light photographic image, recognizes the gap provided between those two masks, that is, the boundary area. The color presuming section 1732 presumes, on the assumption that the colors of the whole pixels in the boundary area are the mixed color of the subject color and background color, and the mixing state is the same under the different background color, through using the two corrected follow light photographic images, the subject color that constitutes colors of the pixels, which is common between the two corrected follow light photographic images, and the combination ratio of the subject color and the background color.

The background replaced image creating section 733 retains, first, as to the corrected follow light photographic image associated with the first photography, the area defined by the subject mask, and replaces the area defined by the background mask with another background of a customer's wish. Next, the background replaced image creating section 733 determines, as to each pixel of the boundary area, a combination color through a combination of the color of the background of a customer's wish and the subject color presumed in the color presuming section 1732 at the combination ratio presumed in the color presuming section 1732, and replaces the color of the respective pixel. This feature makes it possible to create a background replaced image in which the background of the corrected follow light photographic image is naturally replaced with another background of a customer's wish.

The image data transmission section 740 of FIG. 49 transmits image data representative of the background replaced image thus created to output devices and the output storage media 550 of FIG. 49.

In a similar fashion to that of the first embodiment, according to the second embodiment too, the mask creating section 731 creates the subject mask M1' and the background mask M2' in accordance with a difference of luminous intensity between the background and the subject. This feature makes it possible to distinguish among the subject area, the background area and the boundary area in the photographic image. However, the area discriminating section referred to in the present invention is not restricted to the present embodiment. It is acceptable that the area discriminating section referred to in the present invention is one as set forth below.

Hereinafter, there will be explained another embodiment of the area discriminating section referred to in the present invention.

According to the another embodiment of the area discriminating section, the subject area, the background area and the boundary area in the photographic image are distinguished from one another in accordance with the amount of the change in color among a plurality of photographic images. The structure of the another embodiment of the area discriminating section is basically identical to that of the mask creating section 731 shown in FIG. 16. According to the histogram creating section 731*a* of FIG. 16, there is created the histogram as to luminous intensity of the pixels constituting the corrected back light photographic image. To the contrary, according to this another embodiment of the area discriminating section, there is created, in accordance with the above-mentioned two corrected follow light photographic images, the following histogram as to the amount of the change in color between those two photographic images.

First, in order to create the histogram as to the amount of the change in color, according to this another embodiment of the area discriminating section, assuming that one of the two corrected follow light photographic images is denoted as a first photographic image, and another is denoted as a second photographic image, the amount of the change in color-phase of the pixels constituting the first photographic image to the pixels of the associated positions in the second photographic image is adopted as a value representative of the amount of the change in color as mentioned above.

The histogram, which is created in accordance with this another embodiment, is a histogram in which the amount of the change in color-phase of the pixels constituting the first photographic image is divided into a large number of ranges, and the number of the pixels divided up onto each range is expressed by the frequency. The histogram of the change in color-phase is for example one wherein the horizontal axis H1_1 of the luminance histogram H1 shown in the part (a) of FIG. 17 is replaced by the amount of the change in color-phase. In the histogram of the change in color-phase, there appear two peaks on a portion wherein the amount of the change in color-phase is little and a portion wherein the amount of the change in color-phase is much. As mentioned above, the difference between the two corrected follow light photographic images is only the background color. Thus, the peak on the portion, wherein the amount of the change in color-phase is much, corresponds to the background area of the first photographic image, and the peak on the portion, wherein the amount of the change in color-phase is little, corresponds to the subject area of the first photographic image.

When the histogram of the change in color-phase is created as mentioned above, according to this another embodiment of the area discriminating section, in accordance with the same procedure as that for the mask creation by the mask creating section 731: the initial subject mask is set up in accordance with the peak on the portion wherein the amount of the change in color-phase is little; the initial background mask is set up in accordance with the peak on the portion wherein the amount of the change in color-phase is much; and both the initial masks are reduced to finally create the subject mask and the background mask, so that the use of those masks makes it possible to distinguish among the subject area, the background area and the boundary area, of the photographic image.

Thus, also according to the another embodiment of the area discriminating section as mentioned above, it is possible to distinguish among the subject area, the background area and the boundary area, of the photographic image. According to the present embodiment, the use of two photographic images for a mask creation may involve somewhat an increment of complication of processing. However, there is no need of the corrected back light photographic image, which is needed for a mask creation by the mask creating section 731. In effect, according to the present embodiment, there is no need of the photographic processing of the step S204 in the flowchart of FIG. 39. As a result, the present embodiment brings about such an advantage that a number of times for photography can be reduced as compared with the example of the processing shown in the flowchart of FIG. 47.

The explanation for the present embodiment will be terminated, and next there will be explained details of the color presuming section 1732 of the replacement processing section 1730.

Figure 51:
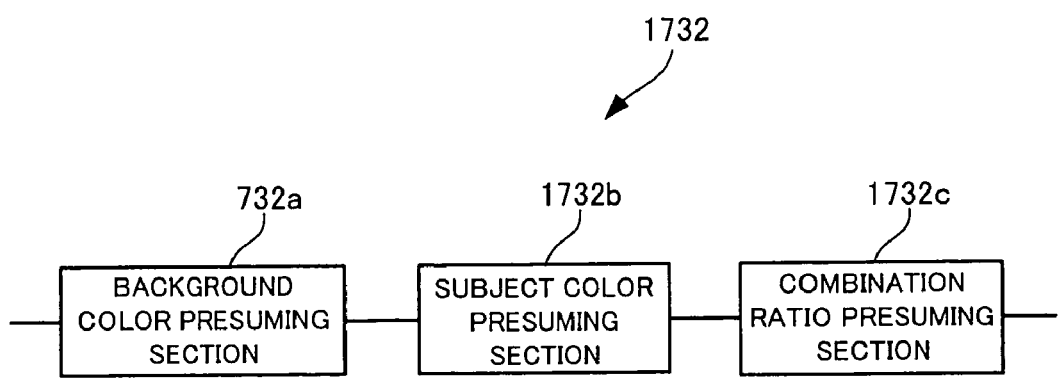
FIG. 51 is an explanatory view useful for understanding details of the color presuming section shown in FIG. 50.

FIG. 51 is an explanatory view useful for understanding details of the color presuming section shown in FIG. 50.

The color presuming section 1732 comprises a background color presuming section 732a, a subject color presuming section 1732b, and a combination ratio presuming section 1732c.

With respect to the background color presuming section 732a, it is the same as the first embodiment, and thus the redundant explanation will be omitted.

The background color presuming section 732a executes the presumption of the background color on each of two corrected follow light photographic images, which are mutually different in the background color.

Next, there will be explained the subject color presuming section 1732b shown in FIG. 51.

The subject color presuming section 1732b estimates a subject color that is the origin of colors of pixels in a boundary area, which is common between two corrected follow light photographic images that are mutually different in a background color, using the background colors determined by the background color presuming section 732a on each of the pixels in the boundary areas of the two corrected follow light photographic images, as follows.

Figure 52:
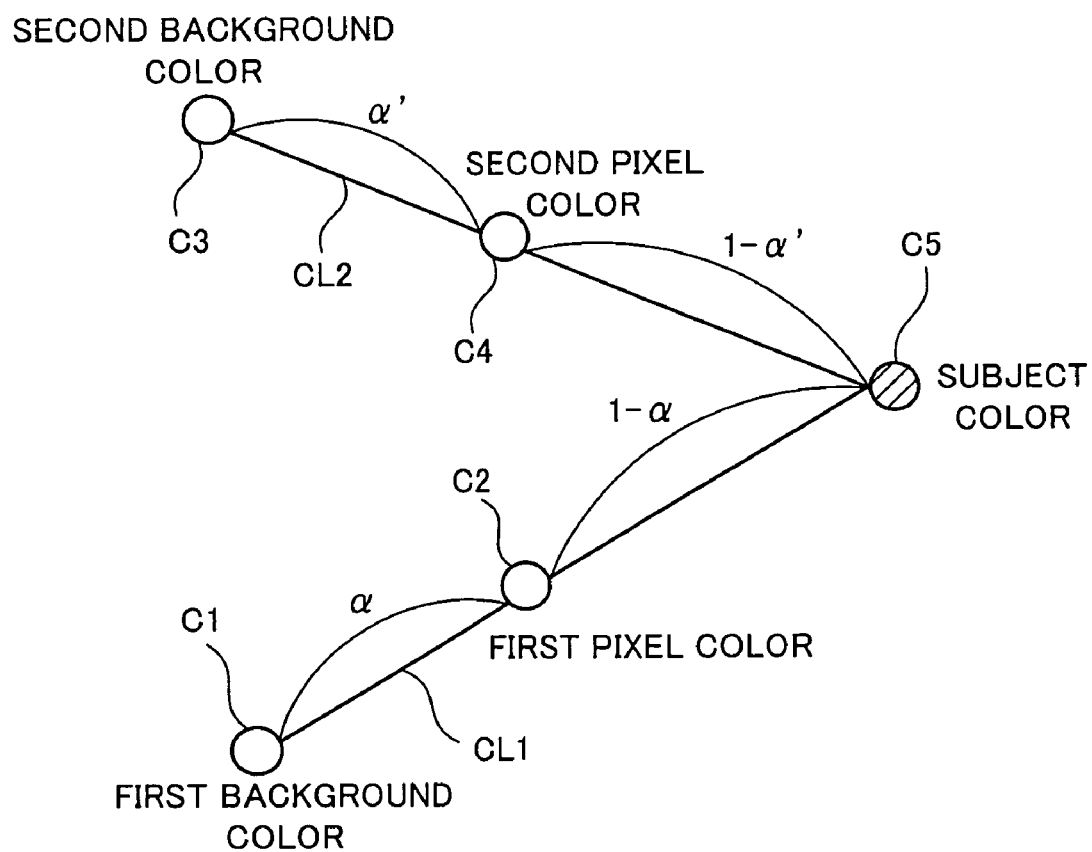
FIG. 52 is an illustration useful for understanding a method of estimating a subject color that is the origin of colors of pixels in a boundary area, which is common between the corrected follow light photographic images that are mutually different in a background color.

FIG. 52 is an illustration useful for understanding a method of estimating a subject color that is the origin of colors of pixels in a boundary area, which is common between the corrected follow light photographic images that are mutually different in a background color.

FIG. 52 shows, as to a certain pixel in the boundary area of the corrected follow light photographic image associated with the first photography, of the two corrected follow light photographic images, a straight line CL1 coupling between a first background color C1 presumed by the background color presuming section 732a of FIG. 51, and a color C2 (a first pixel color) of the pixel, on the RGB color space. Further, FIG. 52 shows, as to a pixel located at the position associated with said pixel in the corrected follow light photographic image associated with the second photography, a straight line CL2 coupling between a second background color C3 presumed by the background color presuming section 732a of FIG. 51, and a color C4 (a second pixel color) of the pixel, on the RGB color space.

As mentioned above, there is a possibility that the color of pixels in the boundary area is a combination color, in which at the time of the photography, the background appears through a part of the subject, so that the background color is combined to the subject color. In the event that a certain pixel color is such a combination color, the pixel color, the background color as the base of the pixel color, and the subject color are lined up on the RGB color space. At that time, the two corrected follow light photographic images are the common images excepting a point that they are mutually different in the background color, and thus the subject colors included in the pixels located at the mutually associated positions between the two corrected follow light photographic images are the common color. Consequently, two straight lines CL1 and CL2 shown in FIG. 52, which are associated with the two pixels located at the mutually associated positions between the two corrected follow light photographic images, respectively, intersect each other at a common subject color C5 included in those pixels.

The subject color presuming section 1732b shown in FIG. 51 determines the intersection of the two straight lines CL1 and CL2 as shown in FIG. 52, as the subject color C5 on all the pixel pairs in the boundary area, of the pixel pairs each consisting of two pixels located at the mutually associated positions between the two corrected follow light photographic images. Consequently, according to the second embodiment, the subject color C5 is uniquely determined, and there is no need of the retrieval as required for the first embodiment.

Here, there is terminated the explanation of the subject color presuming section 1732b shown in FIG. 51. Next, there will be explained the combination ratio presuming section 1732c shown in FIG. 51 in conjunction with FIG. 52.

The combination ratio presuming section 1732c computes, as shown in FIG. 52, with respect to the corrected follow light photographic image associated with the first photography, the ratio of the length of a line segment coupling on the RGB color space the first background color C1 presumed by the background color presuming section 732a with the subject color C5 presumed by the subject color presuming section 1732b to the length of a line segment coupling the first background color C1 with the first pixel color C2 of the pixel, in form of a combination ratio $\alpha$ where the first pixel color C2 of the pixel is combined with the first background color C1 and the subject color C5. Likely, also with respect to the corrected follow light photographic image associated with the second photography, the combination ratio presuming section 1732c computes the ratio of the length of a line segment coupling on the RGB color space the second background color C3 with the subject color C5 to the length of a line segment coupling the second background color C3 with the second pixel color C4 of the pixel, in form of a combination ratio $\alpha'$ where the second pixel color C4 of the pixel is combined with the second background color C3 and the subject color C5. In view of the fact that the first and second photography are carried out on a multi-page basis, it is considered that the states of mixing of the background color with the subject color in two corrected follow light photographic images are the same as one another, and thus the two combination ratios $\alpha'$ and $\alpha$ are substantially equal to one another. According to the present embodiment, as the photographic image, in which the background is directly replaced, there is adopted the corrected follow light photographic image associated with the first photography. Consequently, the above-mentioned computation is carried out on only the corrected follow light photographic image associated with the first photography.

The combination ratio presuming section 1732c performs the computation of the combination ratio α on all the pixel pairs in the boundary area of the two corrected follow light photographic images.

According to the second embodiment, as mentioned above, the use of the presumed subject color and the combination color makes it possible to create the natural background replaced image in a similar fashion to that of the first embodiment.

According to the embodiments of the present invention, as the example of the area discriminating section of the background replacing apparatus of the present invention, there is shown the mask creating section 731 that creates, as a histogram on luminous intensity of the pixels constituting the corrected back light photographic image, the histogram on the G-value, of the R-value, the G-value, and the B-value, which represent colors of the pixels. However, the present invention is not restricted to the present embodiments. It is acceptable that the area discriminating section of the background replacing apparatus of the present invention creates the histogram on the R-value, it is acceptable that the area discriminating section of the background replacing apparatus of the present invention creates the histogram on the B-value, or alternatively it is acceptable that the area discriminating section of the background replacing apparatus of the present invention creates the histogram on the luminance of the pixels.

According to the embodiments of the present invention, as the example of the area discriminating section of the background replacing apparatus of the present invention, there is shown the mask creating section 731 that creates, a mask for distinguishing a background area of a photographic image from other areas, in accordance with a single photographic image referred to a corrected back light photographic image. However, the present invention is not restricted to the present embodiments. It is acceptable that the area discriminating section of the background replacing apparatus of the present invention creates a mask for distinguishing a background area of a photographic image from other areas, in accordance with two photographic images that are mutually different in luminance and color of the background. In this case, there is used a mask for distinguishing a portion wherein the amount of the change in luminance and color is large relatively between the two photographic images, from other areas. Thus, it is possible to create a mask for distinguishing a background area of a photographic image from other areas.

According to the embodiments of the present invention, as the example of the mixing ratio determining section of the background replacing apparatus of the present invention, there is shown the color presuming section 732 in which as to a certain pixel in the boundary area, first, the subject color constituting the color of the pixel is presumed, and then there is presumed, as the combination ratio, the ratio of mutual distance among the background color, the color of the pixel, and the subject color, in the RGB color space. However, the present invention is not restricted to the present embodiment. It is acceptable that the mixing ratio determining section of the background replacing apparatus of the present invention determines, for example, as to a certain pixel in the boundary area, a combination ratio in accordance with a positional relation between the pixel and the subject area, in other words, determines a combination ratio in such a way that the further pixel from the subject area is concerned, the ratio of the inclusion of the subject color is more decreased.

According to the embodiments of the present invention, as to the example of the image revision section of the background replacing apparatus of the present invention, the embodiments of present invention particularly fail to refer to the input screen in which an operator inputs the revision value. It is acceptable that the input screen is such a type of input screen that an operator enters the numerical values through a keyboard. Alternatively, it is acceptable that the input screen is such a type of input screen that there is provided a set up bar for revision values, and an operator moves the set up bar through the mouse operation to enter the revision values.

According to the embodiments of the present invention, as the example of the image revision section of the background replacing apparatus of the present invention, there is shown the image revision section that executes only the image revision by the revision for the subject area and the background area. However, the present invention is not restricted to the present embodiment. It is acceptable that the image revision section of the background replacing apparatus of the present invention performs the revision for colors of the respective portions of the created background replaced image as well as the revision for the above-mentioned areas.

According to the embodiments of the present invention, as the example of the image revision section of the background replacing apparatus of the present invention, there is shown two image revision sections 760 and 810 in which the subject mask and background mask are narrowed to revise the background replaced image. However, the present invention is not restricted to the present embodiment. It is acceptable that the image revision section of the background replacing apparatus of the present invention expands the subject mask and background mask, and/or narrows the boundary area, to revise the background replaced image. This revision is effective to such an unnatural background replaced-image that the color of the background after the replacement is mixed up to a portion that the background is not seen originally. There is a possibility that such an unnatural background replaced-image occurs in the event that the background after the replacement has strong colors such as a high chroma saturation of color.

According to the embodiments of the present invention, as the example of the image taking system in which a plurality of photographic images is photographed, there is shown the image taking system 1 in which the flashlight emitting device 12 emits the flashlight at the time of the first photography, and the flashlight emitting device 12 turns off at the time of the second photography, so that the follow light photography and the back light photography are continuously performed in the named order. However, the present invention is not restricted to the present embodiment. It is acceptable that the image taking system of the present invention is one in which the follow light photography and the back light photography are continuously performed in reverse order to the named order. This type of image taking system can be constructed, for example, in such a manner that in the embodiment as mentioned above, an intercept circuit, wherein an instruction signal that instructs the flashlight emitting device to emit flashlight, which is transmitted from the digital camera to the flashlight emitting device whenever the first photography is carried out, is intercepted at the time of the first photography, and passes at the time of the second photography, is installed on the transmission line for the instruction signal, which connects the digital camera with the flashlight emitting device.

According to the embodiments of the present invention, as the example of the image taking system in which a plurality of photographic images is photographed, there is shown the image taking system 1 having the flashlight emitting device 12 in which when light emits once, it takes a lot of time for charge in the subsequent light emission, and when the photography is carried out continuously twice, the flashlight is emitted only at the time of first photography. However, the present invention is not restricted to the present embodiment. It is acceptable that the image taking system of the present invention is, for example, one having a high-speed type of flashlight emitting device in which in the event that it is permitted to take a very short time for charge and the photography is carried out continuously twice, it is allowed to emit the flashlight twice. It is noted, however, that such an image taking system also needs the intercept circuit for intercepting the unnecessary instruction signal.

What is claimed is:

1. A background replacing apparatus comprising:
    an image obtaining means for obtaining a plurality of photographic images generated through photography of a common subject under a plurality of photographic conditions;
    an area discriminating means for discriminating among a subject area, a background area, and a boundary area of each of the plurality of photographic images obtained by the image obtaining means;
    a mixing ratio determining means for determining a mixing ratio of a subject color to a background color in the boundary area; and
    a background replacing means for replacing a background of one of the plurality of photographic images obtained by the image obtaining means with a different background in accordance with three areas of the subject area, the background area, and the boundary area, which are discriminated by the area discriminating means, and the mixing ratio determined by the mixing ratio determining means.

2. A background replacing apparatus according to claim 1, wherein the area discriminating means discriminates among the subject area, the background area, and the boundary area of each of the plurality of photographic images in accordance with a predetermined different point between the subject and the background in the photographic conditions.

3. A background replacing apparatus according to claim 1, wherein the area discriminating means discriminates each of the plurality of photographic images between a subject-side area and a background-side area in accordance with a predetermined different point between the subject and the background in the photographic conditions, and at least one of the subject-side area and the background-side area is reduced so as to be treated as the subject area and the background area, and an area between the subject area and the background area is treated as the boundary area.

4. A background replacing apparatus according to claim 1, wherein the area discriminating means discriminates each of the plurality of photographic images between a subject-side area and a background-side area in accordance with a predetermined different point between the subject and the background in the photographic conditions, and the subject-side area is reduced so as to be treated as the subject area, and an area portion excepting the subject area, of the subject-side area before reduction, is treated as whole or part of the boundary area.

5. A background replacing apparatus according to claim 1, wherein the area discriminating means discriminates each of the photographic images between a subject-side area and a background-side area in accordance with a predetermined different point between the subject and the background in the photographic conditions, and the background-side area is reduced so as to be treated as the background area, and an area portion excepting the background area, of the background-side area before reduction, is treated as whole or part of the boundary area.

6. A background replacing apparatus according to claim 1, wherein the area discriminating means discriminates among the subject area, the background area, and the boundary area of each of the plurality of photographic images obtained by the image obtaining means, and
    the background replacing means replaces a background of a photographic image, which is different from the photographic image used for discrimination of areas by the area discriminating means, of the photographic images obtained by the image obtaining means.

7. A background replacing apparatus according to claim 1, wherein the mixing ratio determining means presumes the subject color and the mixing ratio in the boundary area of the photographic image; and
    the background replacing means replaces the background of the photographic image with the different background using the subject color and the mixing ratio, which are presumed by the mixing ratio determining means.

8. A background replacing apparatus according to claim 7, wherein the mixing ratio determining means presumes the subject color using colors in the subject area as candidates for the subject color.

9. A background replacing apparatus according to claim 7, wherein the mixing ratio determining means presumes the subject color and the mixing ratio on individual points in the boundary area, and presumes the subject color on assumption that the subject color lines up on a straight line basis with the background color and a color of the associated point in a predetermined color space.

10. A background replacing apparatus according to claim 7, wherein the mixing ratio determining means presumes the subject color and the mixing ratio on individual points in the boundary area, and presumes the subject color, using colors in the subject area as candidates for the subject color, in such a manner that of the candidates, a candidate, which lines up on a straight line basis with the background color and a color of the associated point in a predetermined color space, and is closest to the color of the associated point, is presumed as the subject color.

11. A background replacing apparatus according to claim 7, wherein the mixing ratio determining means presumes the subject color and the mixing ratio on individual points in the boundary area, and presumes the mixing ratio in accordance with a ratio of a mutual distance among the background color, a color of the associated point, and the subject color, in a predetermined color space.

12. A background replacing apparatus according to claim 7, wherein the background replacing means replaces the background of the photographic image with the different background in such a manner that a color of the different background and the subject color presumed by the mixing ratio determining means are mixed at the mixing ratio presumed by the mixing ratio determining means.

13. A background replacing apparatus according to claim 1, wherein the background replacing apparatus further comprises an image correcting means for correcting the area discriminated by the area discriminating means in response to an operation, and for causing the background replacing means to perform the background replacing based on a corrected area so that a background replaced image is corrected.

14. A background replacing apparatus according to claim 13, wherein the area discriminating means discriminates the photographic image between a subject-side area and a background-side area in accordance with a predetermined different point between the subject and the background in the photographic conditions, and the subject-side area and the background-side area are reduced by a predetermined reduction amount so as to be treated as the subject area and the background area, and the image correcting means alters the reduction amount on the area discriminating means in response to an operation, so that the subject area and/or the background area are corrected.

15. A background replacing apparatus according to claim 13, wherein the area discriminating means discriminates between the subject area and the background area in accordance with a discrimination basis based on a predetermined different point between the subject and the background in the photographic conditions, and the image correcting means alters the discrimination basis in response to an operation, so that the subject area and/or the background area are corrected.

16. A background replacing apparatus comprising:

an image obtaining means for obtaining a plurality of photographic images generated through photography of a common subject under a plurality of photographic conditions;

an area discriminating means for discriminating a background area of each of the plurality of photographic images obtained by the image obtaining section, from other areas in each of the plurality of photographic images;

a mixing state presuming means for presuming a mixing ratio of a subject color to a background color in the other areas, and the subject color; and a background replacing means for replacing a background of one of the plurality of photographic images obtained by the image obtaining means with a different background using the subject color and the mixing ratio, which are presumed by the mixing state presuming means.

17. A background replacing apparatus according to claim 16, wherein the mixing state presuming means presumes the subject color using colors in the subject area as candidates for the subject color.

18. A background replacing apparatus according to claim 16, wherein the mixing state presuming means presumes the subject color and the mixing ratio on individual points in other areas excepting the background area, and presumes the subject color on assumption that the subject color lines up on a straight line basis with the background color and a color of the associated point in a predetermined color space.

19. A background replacing apparatus according to claim 16, wherein the mixing state presuming means presumes the subject color and the mixing ratio on individual points in other areas excepting the background area, and presumes the subject color, using colors in other areas excepting the background area as candidates for the subject color, in such a manner that of the candidates, a candidate, which lines up on a straight line basis with the background color and a color of the associated point in a predetermined color space, and is farthest from the color of the associated point, is presumed as the subject color.

20. A background replacing apparatus according to claim 16, wherein the mixing state presuming means presumes the subject color and the mixing ratio on individual points in other areas excepting the background area, and presumes the mixing ratio in accordance with a ratio of a mutual distance among the background color, a color of the associated point, and the subject color, in a predetermined color space.

21. A background replacing apparatus according to claim 16, wherein the background replacing means replaces the background of the photographic image with the different background in such a manner that a color of the different background and the subject color presumed by the mixing state presuming means are mixed at the mixing ratio presumed by the mixing state presuming means.

22. A background replacing apparatus according to claim 16, wherein the area discriminating means discriminates a background area of the photographic image from other areas in accordance with a ratio of luminous intensity among the plural photographic images.

23. A background replacing apparatus according to claim 16, further comprising a storage means for storing the subject color and the mixing ratio, which are presumed by the mixing state presuming means, wherein the background replacing means replaces a background of the photographic image obtained by the image obtaining means with a different background using the subject color and the mixing ratio, which are stored in the storage means.

24. A background replacing apparatus according to claim 16, further comprising a first parameter determining means for determining a correction parameter to be used for a color correction for the subject color in accordance with an image of said other area in which a color is replaced by the subject color presumed in the mixing state presuming means, and a first color correcting means for applying the color correction to the subject color, which is presumed by the mixing state presuming means, using the correction parameter determined by the first parameter determining means, wherein the background replacing means replaces the background of the photographic image obtained by the image obtaining means with a different background using the subject color subjected to the color correction by the first color correcting means and the mixing ratio.

25. A background replacing apparatus according to claim 16, further comprising a second parameter determining means for determining a correction parameter to be used for a color correction for the subject color in accordance with the photographic image obtained by the image obtaining means, and a second color correcting means for applying the color correction to the subject color, which is presumed by the mixing state presuming means, using the correction parameter determined by the second parameter determining means, wherein the background replacing means replaces the background of the photographic image obtained by the image obtaining means with a different background using the subject color subjected to the color correction by the second color correcting means and the mixing ratio.

26. A background replacing apparatus according to claim 16, further comprising a third parameter determining means for determining a correction parameter to be used for a color correction for the subject color to a parameter according to an operation, and a third color correcting means for applying the color correction to the subject color, which is presumed by the mixing state presuming means, using the correction parameter determined by the third parameter determining means, wherein the background replacing means replaces the background of the photographic image obtained by the image obtaining means with a different background using the subject color subjected to the color correction by the third color correcting means and the mixing ratio.

27. A background replacing apparatus according to claim 16, further comprising a fourth parameter determining means for determining a correction parameter to be used for a color correction for the subject color to a parameter according to the different background, and
   a fourth color correcting means for applying the color correction to the subject color, which is presumed by the mixing state presuming means, using the correction parameter determined by the fourth parameter determining means,
   wherein the background replacing means replaces the background of the photographic image obtained by the image obtaining means with the different background using the subject color subjected to the color correction by the fourth color correcting means and the mixing ratio.

28. A background replacing apparatus according to claim 16, wherein the background replacing means replaces a background of the photographic image using, as the different background, a background to which relation information representative of a relative positional relation in an image between the subject and the background is applied, and performs an replacement in such a manner that the relative relation in the background replaced image between the subject and the background is the same relative relation as the relative relation represented by the relation information.

29. A background replacing apparatus comprising:
   an image obtaining means for obtaining a plurality of photographic images generated through photography of a common subject under a plurality of photographic conditions mutually different in color of the background;
   an area discriminating means for discriminating background area of each of the plurality of photographic images obtained by the imagine obtaining means, from other areas in each of the plurality of photographic images;
   a mixing state presuming means for presuming a mixing ratio of a subject color to a background color in the other areas, and the subject color in accordance with the plurality of photographic images; and
   a background replacing means for replacing a background of one of the plurality of photographic images obtained by the image obtaining means with a different background using the subject color and the mixing ratio, which are presumed by the mixing state presuming means.

30. A background replacing apparatus according to claim 29, wherein the mixing state presuming means presumes, on assumption that the plurality of photographic images are equal to each other in terms of mixing state of the subject color and the background color, the subject color and the mixing ratio.

31. A background replacing apparatus according to claim 19, wherein the mixing state presuming means presumes the subject color and the mixing ratio on individual points in other area excepting the background area, determines straight lines each coupling in a predetermined color space the background color with a color of the associated point in each of the plurality of photographic images generated through photography of the common subject under a plurality of photographic conditions mutually different in color of the background, and presumes a color corresponding to an intersection of the straight lines as the subject color.

32. A background replacing apparatus according to claim 29, wherein the image obtaining means obtains a plurality of photographic images generated through photography of the common subject under a plurality of photographic conditions mutually different in color-phase of the background.

33. A background replacing apparatus according to claim 29, wherein the area discriminating means discriminates between a subject area and a boundary area of other areas excepting the background area in the photographic image; and
   the mixing state presuming means presumes the subject color and the mixing ratio in the boundary area.

34. A background replacing apparatus according to claim 29, wherein the area discriminating means discriminates the background area of the photographic image obtained by the image obtaining means from other areas in accordance with an amount of the change in color among the plurality of photographic images.

35. A background replacing apparatus according to claim 29, wherein the area discriminating means discriminates the background area of the photographic image obtained by the image obtaining means from other areas in accordance with a difference of luminous intensity between the background and the subject.

36. A non-transitory computer-readable medium for storing a background replacing program that causes a computer to operate as a background replacing apparatus, when the background replacing program is incorporated into the computer and is executed, the apparatus comprising:
   an image obtaining means for obtaining a plurality of photographic images generated through photography of a common subject under a plurality of photographic conditions;
   an area discriminating means for discriminating among a subject area, a background area, and a boundary area of each of the plurality of photographic images obtained by the image obtaining means;
   a mixing ratio determining means for determining a mixing ratio of a subject color to a background color in the boundary area; and
   a background replacing means for replacing a background of one of the plurality of photographic images obtained by the image obtaining means with a different background in accordance with three areas of the subject area, the background area, and the boundary area, which are discriminated by the area discriminating means, and the mixing ratio determined by the mixing ratio determining means.

37. A non-transitory computer-readable medium for storing a background replacing program that causes a computer to operate as a background replacing apparatus, when the background replacing program is incorporated into the computer and is executed, the background replacing apparatus comprising:
   an image obtaining means for obtaining a plurality of photographic images generated through photography of a common subject under a plurality of photographic conditions;
   an area discriminating means for discriminating a background area of each of the plurality of photographic images obtained by the image obtaining means, from other areas in each of the plurality of photographic images;

a mixing state presuming means for presuming a mixing ratio of a subject color to a background color, in the other areas, and the subject color; and a background replacing means for replacing a background of one of the plurality of photographic images obtained by the image obtaining means with a different background using the subject color and the mixing ratio, which are presumed by the mixing state presuming means.

38. A non-transitory computer-readable medium for storing a background replacing program that causes a computer to operate as a background replacing apparatus, when the background replacing program is incorporated into the computer and is executed, the background replacing apparatus comprising:

an image obtaining means for obtaining a plurality of photographic images generated through photography of a common subject under a plurality of photographic conditions in which colors of backgrounds are different from one another;

an area discriminating means for discriminating a background area of each of the plurality of photographic images obtained by the image obtaining means, from other areas in each of the plurality of photographic images;

a mixing state presuming means for presuming a mixing ratio of a subject color and a background color in the other areas, and the subject color in accordance with the plurality of photographic images; and a background replacing means for replacing a background of one of the plurality of photographic images obtained by the image obtaining means with a different background using the subject color and the mixing ratio, which are presumed by the mixing state presuming means.

39. A background replacing method comprising:

obtaining a plurality of photographic images generated through photography of a common subject under a plurality of photographic conditions;

discriminating among a subject area, a background area, and a boundary area of each of the plurality of;

determining a mixing ratio of a subject color to a background color in the boundary area; and replacing a background of one of the plurality of photographic images with a different background in accordance with three areas of the subject area, the background area, and the boundary area, which are discriminated by the discriminating step, and the mixing ratio determined by the determining step.

40. A background replacing method comprising:

obtaining a plurality of photographic images generated through photography of a common subject under a plurality of photographic conditions;

discriminating a background area of each of the plurality of photographic images obtained by the image obtaining step, from other areas in each of the plurality of photographic images;

presuming a mixing ratio of a subject color to a background color in the other areas, and the subject color; and replacing a background of the photographic image obtained by the image obtaining step with a different background using the subject color and the mixing ratio, which are presumed by the mixing state presuming step.

41. A background replacing method comprising:

obtaining a plurality of photographic images generated through photography of a common subject under a plurality of photographic conditions;

discriminating a background area of each of the photographic images obtained in the image obtaining step from other areas in each of the plurality of photographic images;

presuming a mixing ratio of a subject color to a background color in the other areas, and the subject color, in accordance with the plurality of photographic images; and replacing a background of one of the plurality of photographic images obtained by the image obtaining step with a different background using the subject color and the mixing ratio, which are presumed by the mixing state presuming step.

* * * * *